(12) United States Patent
Takahashi et al.

(10) Patent No.: US 10,448,290 B2
(45) Date of Patent: Oct. 15, 2019

(54) USER EQUIPMENT, BASE STATION, AND CONNECTION ESTABLISHMENT METHOD

(71) Applicant: NTT DOCOMO, INC., Tokyo (JP)

(72) Inventors: Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/544,566

(22) PCT Filed: Oct. 31, 2016

(86) PCT No.: PCT/JP2016/082273
§ 371 (c)(1),
(2) Date: Jul. 19, 2017

(87) PCT Pub. No.: WO2017/077979
PCT Pub. Date: May 11, 2017

(65) Prior Publication Data
US 2018/0270716 A1    Sep. 20, 2018

(30) Foreign Application Priority Data

Nov. 5, 2015 (JP) .................................. 2015-218014
Jan. 7, 2016 (JP) .................................. 2016-002129
(Continued)

(51) Int. Cl.
*H04W 36/00* (2009.01)
*H04W 76/10* (2018.01)
(Continued)

(52) U.S. Cl.
CPC ....... *H04W 36/0033* (2013.01); *H04W 76/10* (2018.02); *H04W 76/19* (2018.02);
(Continued)

(58) Field of Classification Search
CPC .......................... H04W 72/0413; H04W 16/14
(Continued)

(56) References Cited

U.S. PATENT DOCUMENTS

| 2008/0242292 A1* | 10/2008 | Koskela | H04W 76/19 455/423 |
|---|---|---|---|
| 2016/0330748 A1* | 11/2016 | Bindrim | H04L 65/1013 |
| 2017/0181216 A1* | 6/2017 | Worrall | H04W 76/15 |

FOREIGN PATENT DOCUMENTS

| WO | 2014/183833 A1 | 11/2014 |
|---|---|---|
| WO | 2015/114695 A1 | 8/2015 |

OTHER PUBLICATIONS

International Search Report issued in PCT/JP2016/082273 dated Dec. 20, 2016 (7 pages).

(Continued)

*Primary Examiner* — Iqbal Zaidi
(74) *Attorney, Agent, or Firm* — Osha Liang LLP

(57) ABSTRACT

Provided is user equipment of a mobile communication system that supports a function for establishing a connection by reusing context information retained in each of the user equipment and a base station, the user equipment including a transmitter that transmits, to the base station, a first message indicating that the user equipment retains user equipment side context information; a receiver that receives, from the base station, a second message indicating that the base station retains base station side context information associated with the user equipment; and a connecting unit that establishes a connection with the base station using the user equipment side context information after receiving the second message.

5 Claims, 58 Drawing Sheets

(30) Foreign Application Priority Data

| Feb. 4, 2016 | (JP) | 2016-020321 |
|---|---|---|
| Mar. 9, 2016 | (JP) | 2016-046348 |
| Aug. 4, 2016 | (JP) | 2016-153979 |
| Aug. 25, 2016 | (JP) | 2016-165170 |

(51) Int. Cl.
  *H04W 76/28* (2018.01)
  *H04W 76/19* (2018.01)
  *H04W 76/25* (2018.01)
  *H04W 76/27* (2018.01)

(52) U.S. Cl.
  CPC ........... *H04W 76/25* (2018.02); *H04W 76/27* (2018.02); *H04W 76/28* (2018.02); *H04W 36/0022* (2013.01)

(58) Field of Classification Search
  USPC .................................................. 370/328–339
  See application file for complete search history.

(56) References Cited

OTHER PUBLICATIONS

Witten Opinion of the International Searching Authority issued in PCT/JP2016/082273 dated Dec. 20, 2016 (4 pages).

3GPP TS 36.413 V124.0; "3rd Generation Partnership Project; Technical Specification Group Radio Access Network; Evolved Universal Terrestrial Radio Access Network (E-UTRAN); S1 Application Protocol (S1AP) (Release 12)"; Dec. 2014 (300 pages).

Ericsson; "New WID proposal: Signalling Reduction for Idle-Active Transitions in LTE"; 3GPP TSG RAN Meeting #66, RP-142030; Maui, USA; Dec. 8-11, 2014 (6 pages).

3GPP TS 36331 V12.6.0; "3rd Generation Partnership Project; Technical Specification Group Radio Access Network; Evolved Universal Terrestrial Radio Access (E-UTRA); Radio Resource Control (RRC); Protocol specification (Release 12)"; Jun. 2015 (449 pages).

3GPP TS 36321 V127.0; "3rd Generation Partnership Project; Technical Specification Group Radio Access Network; Evolved Universal Terrestrial Radio Access (E-UTRA); Medium Access Control (MAC) protocol specification (Release 12)"; Sep. 2015 (77 pages).

3GPP TR 23.720 V1.2.0; "3rd Generation Partnership Project; Technical Specification Group Services and System Aspects; Architecture enhancements for Cellular Internet of Things (Release 13)"; Nov. 2015 (96 pages).

NTT DOCOMO, Inc.; "Work on user plane based solution with As Information stored in RAN"; 3GPP TSG-RAN WG2 #92-156424; Anaheim, USA; Nov. 16-20, 2015 (13 pages).

3GPP TS 36300 V13.1.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Sep. 2015 (254 pages).

3GPP TS 23.401 V13A.0; "3rd Generation Partnership Project; Technical Specification Group Services and System Aspects; General Packet Radio Service (GPRS) enhancements for Evolved Universal Terrestrial Radio Access Network (E-UTRAN) access (Release 13)"; Sep. 2015 (334 pages).

3GPP TR 23.720 V1.1.0; "3rd Generation Partnership Project; Technical Specification Group Services and System Aspects; Architecture enhancements for Cellular Internet of Things (Release 13)"; Oct. 2015 (90 pages).

3GPP TS 36.331 V12.7.0; "3rd Generation Partnership Project; Technical Specification Group Radio Access Network; Evolved Universal Terrestrial Radio Access (E-UTRA); Radio Resource Control (RRC); Protocol specification (Release 12)"; Sep. 2015 (453 pages).

3GPP TS 36.304 V12.6.0; "3rd Generation Partnership Project; Technical Specification Group Radio Access Network; Evolved Universal Terrestrial Radio Access (E-UTRA); User Equipment (UE) procedures in idle mode (Release 12)"; Sep. 2015 (38 pages).

JP Office Action of JP Application No. 2016-165170 dated Dec. 20, 2016.

Extended European Search Report issued in the counterpart European Patent Application No. 16862039.1, dated Sep. 20, 2018 (8 pages).

\* cited by examiner

FIG.10A

```
                        RRCConnectionRequest message
-- ASN1START

RRCConnectionRequest ::=           SEQUENCE {
    criticalExtensions                 CHOICE {
        rrcConnectionRequest-r8            RRCConnectionRequest-r8-IEs,
        criticalExtensionsFuture           SEQUENCE {}
    }
}

RRCConnectionRequest-r8-IEs ::=    SEQUENCE {
    ue-Identity                        InitialUE-Identity,
    establishmentCause                 EstablishmentCause,
    ue-ContextStoring-r13spare                            BIT STRING (SIZE (1)) ENUMERATED {true}
                       OPTIONAL
}

InitialUE-Identity ::=             CHOICE {
    s-TMSI                             S-TMSI,
    randomValue                        BIT STRING (SIZE (40))
}

EstablishmentCause ::=             ENUMERATED {
                                       emergency, highPriorityAccess, mt-Access, mo-Signalling,
                                       mo-Data, delayTolerantAccess-v1020, spare2, spare1}

-- ASN1STOP
```

FIG.10B

| RRCConnectionRequest field descriptions |
| --- |
| establishmentCause |
| Provides the establishment cause for the RRC connection request as provided by the upper layers. W.r.t. the cause value names: highPriorityAccess concerns AC11..AC15, 'mt' stands for 'Mobile Terminating' and 'mo' for 'Mobile Originating. |
| randomValue |
| Integer value in the range 0 to $2^{40} - 1$. |
| ue-ContextStoring |
| Indicates that the UE keeps the UE context established in the previous RRC connection. |
| ue-Identity |
| UE identity included to facilitate contention resolution by lower layers. |

FIG.11A

```
                         RRCConnectionSetup message
-- ASN1START

RRCConnectionSetup ::=              SEQUENCE {
    rrc-TransactionIdentifier           RRC-TransactionIdentifier,
    criticalExtensions                  CHOICE {
        c1                                  CHOICE {
            rrcConnectionSetup-r8               RRCConnectionSetup-r8-IEs,
            spare7 NULL,
            spare6 NULL, spare5 NULL, spare4 NULL,
            spare3 NULL, spare2 NULL, spare1 NULL
        },
        criticalExtensionsFuture            SEQUENCE {}
    }
}

RRCConnectionSetup-r8-IEs ::=       SEQUENCE {
    radioResourceConfigDedicated        RadioResourceConfigDedicated,
    nonCriticalExtension                RRCConnectionSetup-v8a0-IEs     OPTIONAL
}

RRCConnectionSetup-v8a0-IEs ::= SEQUENCE {
    lateNonCriticalExtension            OCTET STRING                    OPTIONAL,
    nonCriticalExtension                RRCConnectionSetup-v13xy-IEsSEQUENCE {}
    OPTIONAL
}

RRCConnectionSetup-v13xy-IEs ::= SEQUENCE {
    ue-ContextStored-r13                ENUMERATED {true}               OPTIONAL,
    ue-AuthenticationInfoReq-r13        ENUMERATED {true}               OPTIONAL,
    nonCriticalExtension                SEQUENCE {}                     OPTIONAL
}

-- ASN1STOP
```

FIG.11B

| RRCConnectionSetup field descriptions |
|---|
| *ue-AuthenticationInfoReq*<br>Query for the UE to retrieve the authentication information. |
| *ue-ContextStored*<br>Indicates that the eNB stores the corresponding UE context for the UE. If this field is present, the UE shall ignore the *radioRecourceConfigDedicated* field received in this message. |

FIG.12

```
                    RRCConnectionSetupComplete message
-- ASN1START

RRCConnectionSetupComplete ::=      SEQUENCE {
    rrc-TransactionIdentifier       RRC-TransactionIdentifier,
    criticalExtensions              CHOICE {
        c1                              CHOICE{
            rrcConnectionSetupComplete-r8       RRCConnectionSetupComplete-r8-IEs,
            spare3 NULL, spare2 NULL, spare1 NULL
        },
        criticalExtensionsFuture    SEQUENCE {}
    }
}

RRCConnectionSetupComplete-r8-IEs ::= SEQUENCE {
    selectedPLMN-Identity           INTEGER (1..maxPLMN-r11),
    registeredMME                   RegisteredMME                           OPTIONAL,
    dedicatedInfoNAS                DedicatedInfoNAS,
    nonCriticalExtension            RRCConnectionSetupComplete-v8a0-IEs OPTIONAL
}

RRCConnectionSetupComplete-v8a0-IEs ::= SEQUENCE {
    lateNonCriticalExtension        OCTET STRING                            OPTIONAL,
    nonCriticalExtension            RRCConnectionSetupComplete-v1020-IEs OPTIONAL
}

RRCConnectionSetupComplete-v1020-IEs ::= SEQUENCE {
    gummei-Type-r10                 ENUMERATED {native, mapped}             OPTIONAL,
    rlf-InfoAvailable-r10           ENUMERATED {true}                       OPTIONAL,
    logMeasAvailable-r10            ENUMERATED {true}                       OPTIONAL,
    rn-SubframeConfigReq-r10        ENUMERATED {required, notRequired}      OPTIONAL,
                                    RRCConnectionSetupComplete-v1130-Ies    OPTIONAL
}

RRCConnectionSetupComplete-v1130-IEs ::= SEQUENCE {
    connEstFailInfoAvailable-r11    ENUMERATED {true}                       OPTIONAL,
    nonCriticalExtension            RRCConnectionSetupComplete-v1250-IEs    OPTIONAL
}

RRCConnectionSetupComplete-v1250-IEs ::= SEQUENCE {
    mobilityState-r12               ENUMERATED {normal, medium, high, spare} OPTIONAL,
    mobilityHistoryAvail-r12        ENUMERATED {true}                       OPTIONAL,
    logMeasAvailableMBSFN-r12       ENUMERATED {true}                       OPTIONAL,
    nonCriticalExtension            RRCConnectionSetupComplete-v13xySEQUENCE {}
    OPTIONAL
}

RRCConnectionSetupComplete-v13xy-IEs ::= SEQUENCE {
    ue-AuthenticationToken-r13      BIT STRING (SIZE (40))                  OPTIONAL,
    ue-AuthenticationInfo-r13       shortMAC-I                              OPTIONAL
}

RegisteredMME ::=                   SEQUENCE {
    plmn-Identity                   PLMN-Identity                           OPTIONAL,
    mmegi                           BIT STRING (SIZE (16)),
    mmec                            MMEC
}

-- ASN1STOP
```

FIG.13A

```
                    RRCConnectionRelease message

-- ASN1START

RRCConnectionRelease ::=         SEQUENCE {
    rrc-TransactionIdentifier        RRC-TransactionIdentifier,
    criticalExtensions               CHOICE {
        c1                               CHOICE {
            rrcConnectionRelease-r8          RRCConnectionRelease-r8-IEs,
            spare3 NULL, spare2 NULL, spare1 NULL
        },
        criticalExtensionsFuture         SEQUENCE {}
```

```
        utra-TDD-r9
        ...,
        utra-TDD-r10                     CellInfoListUTRA-TDD-r10
                                                        OPTIONAL, -- Cond Redirection
    }
    nonCriticalExtension         RRCConnectionRelease-v1020-IEs    OPTIONAL
}

RRCConnectionRelease-v1020-IEs ::=   SEQUENCE {
    extendedWaitTime-r10                 INTEGER (1..1800)        OPTIONAL, -- Need ON
    nonCriticalExtension                 SEQUENCE {}              OPTIONAL
}

ReleaseCause ::=             ENUMERATED {loadBalancingTAUrequired,
                                         other, cs-FallbackHighPriority-v1020, spareUEcontextHolding-v13cy}

RedirectedCarrierInfo ::=    CHOICE {
    eutra                        ARFCN-ValueEUTRA,
    geran                        CarrierFreqsGERAN,
    utra-FDD                     ARFCN-ValueUTRA,
    utra-TDD                     ARFCN-ValueUTRA,
    cdma2000-HRPD                CarrierFreqCDMA2000,
    cdma2000-1xRTT               CarrierFreqCDMA2000,
    ...,
                                 CarrierFreqListUTRA-TDD-r10
```

```
                                        ...-foUTRA-r9)) OF CellInfoUTRA-FDD-r9
```

FIG.13B

| RRCConnectionRelease field descriptions |
|---|
| releaseCause<br>The *releaseCause* is used to indicate the reason for releasing the RRC Connection. The cause value *cs-FallbackHighPriority* is only applicable when *redirectedCarrierInfo* is present with the value set to *utra-FDD*, *utra-TDD* or *utra-TDD-r10*.<br>E-UTRAN should not set the *releaseCause* to *loadBalancingTAURequired* or to *cs-FallbackHighPriority* if the *extendedWaitTime* is present. <u>The value *ue-ContextHolding* indicates that the UE shall keep the UE context while the UE is in RRC_IDLE.</u> |

FIG.14A

```
                        RRCConnectionRelease message

-- ASN1START

RRCConnectionRelease ::=           SEQUENCE {
    rrc-TransactionIdentifier          RRC-TransactionIdentifier,
    criticalExtensions                 CHOICE {
        c1                                 CHOICE {
            rrcConnectionRelease-r8            RRCConnectionRelease-r8-IEs,
                                    spare1 NULL
    cellInfoList-r9
        geran-r9                       CellIn
        utra-FDD-r9                    CellInfoListUTRA-FDD
        utra-TDD-r9                    CellInfoListUTRA-TDD-r9,
        ...,
        utra-TDD-r10                   CellInfoListUTRA-TDD-r10
    }                                                          OPTIONAL,-- Cond Redirection
    nonCriticalExtension              RRCConnectionRelease-v1020-IEs     OPTIONAL
}

RRCConnectionRelease-v1020-IEs ::=  SEQUENCE {
    extendedWaitTime-r10               INTEGER (1..1800)    OPTIONAL,    -- Need ON
    nonCriticalExtension               RRCConnectionRelease-v13xy-IEsSEQUENCE-()
    OPTIONAL
}

RRCConnectionRelease-v13xy-IEs ::=  SEQUENCE {
    ue-ContextHolding-r13              ENUMERATED {true}    OPTIONAL,-- Need ON
    nonCriticalExtension               SEQUENCE {}          OPTIONAL
}

ReleaseCause ::=           ENUMERATED {loadBalancingTAUrequired,
                                       other, cs-FallbackHighPriority-v1020, spare1}

RedirectedCarrierInfo ::=   CHOICE {
    eutra                       ARFCN-ValueEUTRA,
    geran                       CarrierFreqsGERAN,
    utra-FDD                    ARFCN-ValueUTRA,
    utra-TDD                    ARFCN-ValueUTRA,
    cdma2000-HRPD               CarrierFreqCDMA2000,
```

FIG.14B

| RRCConnectionRelease field descriptions |
|---|
| *ue-ContextHolding* <br> Indicates to keep the UE context while the UE is in RRC_IDLE. |

FIG.15

5.3.3.3   Actions related to transmission of *RRCConnectionRequest* message

The UE shall set the contents of *RRCConnectionRequest* message as follows:

1> <u>if the UE supports the *RRCConnectionRequest-r13-IEs* and *criticalExtRRC-ConnEstReqAllowed* is included in *SystemInformationBlockType2*:</u>

2> <u>set the *RRCConnectionRequest-r13-IEs* in the *RRCConnectionRequest* message;</u>

1> else:

2>  <u>set the *RRCConnectionRequest-r8-IEs* in the *RRCConnectionRequest* message;</u>

1> set the *ue-Identity* as follows:

2> if upper layers provide an S-TMSI:

3> set the *ue-Identity* to the value received from upper layers;

2> else:

3> draw a random value in the range 0 .. $2^{40}$-1 and set the *ue-Identity* to this value;

NOTE 1:   Upper layers provide the S-TMSI if the UE is registered in the TA of the current cell.

1> set the *establishmentCause* in accordance with the information received from upper layers;

1 > <u>if the UE stores the valid AS configuration into *VarAS-Config*:</u>

2>  <u>set the *ue-Identity* to *UE-AS-ConfigIdentity*;</u>

The UE shall submit the *RRCConnectionRequest* message to lower layers for transmission.

The UE shall continue cell re-selection related measurements as well as cell re-selection evaluation. If the conditions for cell re-selection are fulfilled, the UE shall perform cell re-selection as specified in 5.3.3.5.

FIG.16A

```
-- ASN1START

RRCConnectionRequest ::=        SEQUENCE {
    criticalExtensions              CHOICE {
        rrcConnectionRequest-r8         RRCConnectionRequest-r8-IEs,
        criticalExtensionsFuture        RRCConnectionRequest-r13-IEsSEQUENCE { }
    }
}

RRCConnectionRequest-r8-IEs ::= SEQUENCE {
    ue-Identity                     InitialUE-Identity,
    establishmentCause              EstablishmentCause,
    spare                           BIT STRING (SIZE (1))
}

RRCConnectionRequest-r13-IEs ::=  SEQUENCE {
    ue-Identity-r13                     InitialUE-Identity-r13,
    establishmentCause-r13              EstablishmentCause
}

InitialUE-Identity ::=          CHOICE {
    s-TMSI                          S-TMSI,
    randomValue                     BIT STRING (SIZE (40))
}

InitialUE-Identity-r13 ::=       CHOICE {
    legacyInitialUE-Identity-r13        InitialUE-Identity,
    ue-AS-ConfigIdentity-r13            UE-AS-ConfigIdenity-r13
}

EstablishmentCause ::=          ENUMERATED {
                                    emergency, highPriorityAccess, mt-Access, mo-Signalling,
                                    mo-Data, delayTolerantAccess-v1020, spare2, spare1}

UE-AS-ConfigIdentity-r13 ::=     SEQUENCE {
    lastC-RNTI-13                       C-RNTI,
    lastPhysCellId-r13                  PhysCellId,
    lastShortMAC-I-r13                  ShortMAC-I
}

-- ASN1STOP
```

FIG.16B

| RRCConnectionRequest field descriptions |
|---|
| *establishmentCause* <br> Provides the establishment cause for the RRC connection request as provided by the upper layers. W.r.t. the cause value names: highPriorityAccess concerns AC11..AC15, 'mt' stands for 'Mobile Terminating' and 'mo' for 'Mobile Originating. |
| *randomValue* <br> Integer value in the range 0 to $2^{40} - 1$. |
| *ue-AS-ConfigIdentity* <br> Includes information to identify and authenticate the AS configuration stored by the UE and E-UTRAN, which consists of C-RNTI, PCI and ShortMAC-I used in the previous RRC connection. |
| *ue-Identity* <br> UE identity included to facilitate contention resolution by lower layers. |

FIG.17

| 5.3.3.4 Reception of the *RRCConnectionSetup* by the UE |
|---|

NOTE: Prior to this, lower layer signalling is used to allocate a C-RNTI. For further details see TS 36.321 [6];

The UE shall:

1> if the valid AS configuration is stored into *VarAS-Config*:

2 > if the *ue-AS-ConfigActivate* is set to *true* and *nextHopChainingCount* is included in the *RRCConnectionSetup* message:

3 > perform the radio resource configuration procedure in accordance with the *radioResourceConfigDedicated* stored into *VarAS-Config* and as specified in 5.3.10;

3 > perform the measurement configuration procedure in accordance with the *measConfig* stored into *VarAS-Config* as specified in 5.5.2;

3> update the $K_{eNB}$ key based on the $K_{ASME}$ key to which the current $K_{eNB}$ is associated, using the *nextHopChainingCount* value included in the *RRCConnectionSetup* message, as specified in TS 33.401 [32];

3> store the *nextHopChainingCount* value;

3> derive the $K_{RRCint}$ key associated with the previously configured integrity algorithm, as specified in TS 33.401 [32];

3> derive the $K_{RRCenc}$ key and the $K_{UPenc}$ key associated with the previously configured ciphering algorithm, as specified in TS 33.401 [32];

3> configure lower layers to activate integrity protection using the previously configured algorithm and the $K_{RRCint}$ key immediately, i.e., integrity protection shall be applied to all subsequent messages received and sent by the UE, including the message used to indicate the successful completion of the procedure;

3> configure lower layers to apply ciphering using the previously configured algorithm, the $K_{RRCenc}$ key and the $K_{UPenc}$ key immediately, i.e., ciphering shall be applied to all subsequent messages received and sent by the UE, including the message used to indicate the successful completion of the procedure ;

2> else:

3> release all the AS configuration stored into *VarAS-Config* ;

1> perform the radio resource configuration procedure in accordance with the received *radioResourceConfigDedicated* and as specified in 5.3.10 ;

FIG.18A

```
-- ASN1START

RRCConnectionSetup ::=              SEQUENCE {
    rrc-TransactionIdentifier           RRC-TransactionIdentifier,
    criticalExtensions                  CHOICE {
        c1                                  CHOICE {
            rrcConnectionSetup-r8               RRCConnectionSetup-r8-IEs,
            spare7 NULL,
            spare6 NULL, spare5 NULL, spare4 NULL,
            spare3 NULL, spare2 NULL, spare1 NULL
        },
        criticalExtensionsFuture            SEQUENCE {}
    }
}

RRCConnectionSetup-r8-IEs ::=       SEQUENCE {
    radioResourceConfigDedicated        RadioResourceConfigDedicated ,
    nonCriticalExtension                RRCConnectionSetup-v8a0-IEs     OPTIONAL
}

RRCConnectionSetup-v8a0-IEs ::= SEQUENCE {
    lateNonCriticalExtension            OCTET STRING                    OPTIONAL,
    nonCriticalExtension                RRCConnectionSetup-v13xy-IEsSEQUENCE {}
    OPTIONAL
}

RRCConnectionSetup-v13xy-IEs ::= SEQUENCE {
    ue-AS-ConfigActivate-r13            ENUMERATED {true}               OPTIONAL,    -- Need OP
    nextHopChainingCount-r13            NextHopChainingCount            OPTIONAL,    -- Cond AS
    nonCriticalExtension                SEQUENCE {}                     OPTIONAL
}

-- ASN1STOP
```

FIG.18B

| *RRCConnectionSetup* field descriptions |
|---|
| *ue-AS-ConfigActivate* |
| Indicates that the UE resumes to use the AS configuration stored in *VarAS-Config* specified in 7.1. |

| Conditional presence | Explanation |
|---|---|
| AS | The field is mandatory present, need ON, if *ue-AS-ConfigActivate* is present. Otherwise the field is not present. |

5.3.3.8 Reception of the *RRCConnectionReject* by the UE (Option 1: *when instruction to release supplemental AS configuration is given*)

The UE shall:

1> stop timer T300;

1> reset MAC and release the MAC configuration;

1> start timer T302, with the timer value set to the *waitTime*;

1> if the *extendedWaitTime* is present and the UE supports delay tolerant access:

2> forward the *extendedWaitTime* to upper layers;

1> if *deprioritisationReq* is included and the UE supports RRC Connection Reject with deprioritisation:

2> start or restart timer T325 with the timer value set to the *deprioritisationTimer* signalled;

2> store the *deprioritisationReq* until T325 expiry;

NOTE: The UE stores the deprioritisation request irrespective of any cell reselection absolute priority assignments (by dedicated or common signalling) and regardless of RRC connections in E-UTRAN or other RATs unless specified otherwise.

1> if *ue-AS-ConfigRelease* is included and the UE stores the AS configuration into *VarAS-Config* specified in 7.1:

2> release the AS configuration stored into *VarAS-Config*;

1> else if *ue-AS-ConfigRelease* is not included and the UE stores the AS configuration into *VarAS-Config*:

2> keep storing the AS configuration into *VarAS-Config*;

2> if *ue-AS-ConfigValidityTime* is included:

3> overwrite the AS configuration validity time with the received value in *ue-AS-ConfigValidityTime*;

1> inform upper layers about the failure to establish the RRC connection and that access barring for mobile originating calls, mobile originating signalling, mobile terminating access and mobile originating CS fallback is applicable, upon which the procedure ends;

5.3.3.8 Reception of the *RRCConnectionReject* by the UE  (Option 2: *when instruction to retain supplemental AS configuration is given*)

The UE shall:

1> stop timer T300;

1> reset MAC and release the MAC configuration;

1> start timer T302, with the timer value set to the *waitTime*;

1> if the *extendedWaitTime* is present and the UE supports delay tolerant access:

2> forward the *extendedWaitTime* to upper layers;

1> if *deprioritisationReq* is included and the UE supports RRC Connection Reject with deprioritisation:

2> start or restart timer T325 with the timer value set to the *deprioritisationTimer* signalled;

2> store the *deprioritisationReq* until T325 expiry;

NOTE:    The UE stores the deprioritisation request irrespective of any cell reselection absolute priority assignments (by dedicated or common signalling) and regardless of RRC connections in E-UTRAN or other RATs unless specified otherwise.

1> if *ue-AS-ConfigStoring* is included and the UE stores the AS configuration into *VarAS-Config* specified in 7.1:

2> keep the AS configuration stored into *VarAS-Config*;

2> if *ue-AS-ConfigValidityTime* is included:

3> overwrite the AS configuration validity time with the received value in *ue-AS-ConfigValidityTime*;

1> else if *ue-AS-ConfigStoring* is not included and the UE stores the AS configuration into *VarAS-Config*:

2> release the AS configuration into *VarAS-Config*;

1> inform upper layers about the failure to establish the RRC connection and that access barring for mobile originating calls, mobile originating signalling, mobile terminating access and mobile originating CS fallback is applicable, upon which the procedure ends;

FIG.21A

```
                    RRCConnectionReject message
-- ASN1START

RRCConnectionReject ::=             SEQUENCE {
    criticalExtensions                  CHOICE {
        c1                                  CHOICE {
            rrcConnectionReject-r8              RRCConnectionReject-r8-IEs,
            spare3 NULL, spare2 NULL, spare1 NULL
        },
        criticalExtensionsFuture            SEQUENCE {}
    }
}

RRCConnectionReject-r8-IEs ::=      SEQUENCE {
    waitTime                            INTEGER (1..16),
    nonCriticalExtension                RRCConnectionReject-v8a0-IEs    OPTIONAL
}

RRCConnectionReject-v8a0-IEs ::= SEQUENCE {
    lateNonCriticalExtension            OCTET STRING                        OPTIONAL,
    nonCriticalExtension                RRCConnectionReject-v1020-IEs   OPTIONAL
}

RRCConnectionReject-v1020-IEs ::= SEQUENCE {
    extendedWaitTime-r10                INTEGER (1..1800)               OPTIONAL,   -- Need ON
    nonCriticalExtension                RRCConnectionReject-v1130-IEs   OPTIONAL
}

RRCConnectionReject-v1130-IEs ::= SEQUENCE {
    deprioritisationReq-r11             SEQUENCE {
        deprioritisationType-r11            ENUMERATED {frequency, e-utra},
        deprioritisationTimer-r11           ENUMERATED {min5, min10, min15, min30}
    }                                                                   OPTIONAL,   -- Need ON
    nonCriticalExtension            RRCConnectionReject-v13xy-IEsSEQUENCE { }
        OPTIONAL
}

RRCConnectionReject-v13xy-IEs ::=   SEQUENCE {
    ue-AS-ConfigRelease-r13             ENUMERATED {true}           OPTIONAL,   -- Need OP
    ue-AS-ConfigValidityTime-r13            ENUMERATED {min5, min10, min20, min40,
                                                    hr1, hr3, hr6, hr12, day1,
                                                    day2, day 4, day8, day16,
                                                    day32, day64, day96} DEFAULT hr3,
    nonCriticalExtension                SEQUENCE {}                 OPTIONAL
}

-- ASN1STOP
```

FIG.21B

| RRCConnectionReject field descriptions |
|---|
| _ue-AS-ConfigRelease_ <br> Indicates to release the AS configuration stored into _VarAS-Config_ specified in 7.1. |
| _ue-AS-ConfigValidityTime_ <br> Indicates the updated maximum time that the UE considers stored the AS configuration into _VarAS-Config_ specified in 7.1 while in RRC_IDLE as valid. |

FIG.22A

```
                        RRCConnectionReject message
-- ASN1START

RRCConnectionReject ::=              SEQUENCE {
    criticalExtensions                   CHOICE {
        c1                                   CHOICE {
            rrcConnectionReject-r8               RRCConnectionReject-r8-IEs,
            spare3 NULL, spare2 NULL, spare1 NULL
        },
        criticalExtensionsFuture             SEQUENCE {}
    }
}

RRCConnectionReject-r8-IEs ::=       SEQUENCE {
    waitTime                             INTEGER (1..16),
    nonCriticalExtension                 RRCConnectionReject-v8a0-IEs    OPTIONAL
}

RRCConnectionReject-v8a0-IEs ::= SEQUENCE {
    lateNonCriticalExtension             OCTET STRING                    OPTIONAL,
    nonCriticalExtension                 RRCConnectionReject-v1020-IEs   OPTIONAL
}

RRCConnectionReject-v1020-IEs ::=    SEQUENCE {
    extendedWaitTime-r10                 INTEGER (1..1800)               OPTIONAL,    -- Need ON
    nonCriticalExtension                 RRCConnectionReject-v1130-IEs   OPTIONAL
}

RRCConnectionReject-v1130-IEs ::=    SEQUENCE {
    deprioritisationReq-r11              SEQUENCE {
        deprioritisationType-r11             ENUMERATED {frequency, e-utra},
        deprioritisationTimer-r11            ENUMERATED {min5, min10, min15, min30}
    }                                                                    OPTIONAL,    -- Need ON
    nonCriticalExtension                 RRCConnectionReject-v13xy-IEsSEQUENCE { }
        OPTIONAL
}

RRCConnectionReject-v13xy-IEs ::=    SEQUENCE {
    ue-AS-ConfigStoring-r13              ENUMERATED {true}               OPTIONAL,    -- Need OP
    ue-AS-ConfigValidityTime-r13         ENUMERATED {min5, min10, min20, min40,
                                                     hr1, hr3, hr6, hr12, day1,
                                                     day2, day 4, day8, day16,
                                                     day32, day64, day96}  DEFAULT hr3,
    nonCriticalExtension                 SEQUENCE {}                     OPTIONAL
}

-- ASN1STOP
```

FIG.22B

| RRCConnectionReject field descriptions |
|---|
| ue-AS-ConfigStoring <br> Indicates to keep the AS configuration stored into *VarAS-Config* specified in 7.1. |
| ue-AS-ConfigValidityTime <br> Indicates the updated maximum time that the UE considers stored the AS configuration into *VarAS-Config* specified in 7.1 while in RRC_IDLE as valid. |

FIG.23A

```
                               RRCConnectionRelease message

-- ASN1START

RRCConnectionRelease ::=             SEQUENCE {
                                       RRC-TransactionIdentifier,
      criticalExtensions
          c1
              rrcConnectionRelease-r8             RRCCo -- Regular non critical extensions
RRCConnectionRelease-v920-IEs ::=   SEQUENCE {
    cellInfoList-r9                         CHOICE {
        geran-r9                                 CellInfoListGERAN-r9,
        utra-FDD-r9                              CellInfoListUTRA-FDD-r9,
        utra-TDD-r9                              CellInfoListUTRA-TDD-r9,
        ...,
        utra-TDD-r10                             CellInfoListUTRA-TDD-r10
    }                                                              OPTIONAL, -- Cond Redirection
    nonCriticalExtension                RRCConnectionRelease-v1020-IEs    OPTIONAL
}

RRCConnectionRelease-v1020-IEs ::=  SEQUENCE {
    extendedWaitTime-r10                INTEGER (1..1800)             OPTIONAL, -- Need ON
    nonCriticalExtension                RRCConnectionRelease-v13xy-IEsSEQUENCE { }
    OPTIONAL
}

RRCConnectionRelease-v13xy-IEs ::=  SEQUENCE {
    ue-AS-ConfigDeactive-r13            ENUMERATED {true}     OPTIONAL, -- Need ON
    ue-AS-ConfigValidityTime-r13        ENUMERATED {min5, min10, min20, min40,
                                                    hr1, hr3, hr6, hr12, day1,
                                                    day2, day 4, day8, day16,
                                                    day32, day64, day96}  DEFAULT hr3,
    nonCriticalExtension                SEQUENCE {}          OPTIONAL
}

ReleaseCause ::=           ENUMERATED {loadBalancingTAUrequired,
                                       other, cs-FallbackHighPriority-v1020, spare1}

RedirectedCarrierInfo ::=           CHOICE {
    eutra                                ARFCN-ValueEUTRA,
    geran                                CarrierFreqsGERAN,
    utra-FDD                             ARFCN-ValueUTRA,
    utra-TDD                             ARFCN-ValueUTRA,
    cdma2000-HRPD                        CarrierFreqCDMA2000,
                                         CarrierFreqCDMA2000,
```

FIG.23B

| RRCConnectionRelease field descriptions |
|---|
| _ue-AS-ConfigDeactive_ <br> Indicates that the UE shall store the AS configuration into _VarAS-Config_ specified in 7.1 while in RRC_IDLE. |
| _ue-AS-ConfigValidityTime_ <br> Indicates the maximum time that the UE considers stored the AS configuration into VarAS-Config specified in 7.1 while in RRC_IDLE as valid. |

FIG.24

5.3.8.3    Reception of the *RRCConnectionRelease* by the UE

The UE shall:

1> delay the following actions defined in this sub-clause 60 ms from the moment the *RRCConnectionRelease* message was received or optionally when lower layers indicate that the receipt of the *RRCConnectionRelease* message has been successfully acknowledged, whichever is earlier;

1> if the RRCConnectionRelease message includes the idleModeMobilityControlInfo:

2> store the cell reselection priority information provided by the *idleModeMobilityControlInfo*;

2> if the *t320* is included:

3> start timer T320, with the timer value set according to the value of *t320*;

1> else:

2> apply the cell reselection priority information broadcast in the system information;

1> if *ue-AS-ConfigDeactive* is set to *true* in the *RRCConnectionRelease* message:

2> store the current *radioResourceConfigDedicated, securityAlgorithmConfig* and *measConfig* into *VarAS-Config*;

2> store the *physCellId* of the PCell into *VarAS-Config*;

2> store the current *ue-Identity* into *VarAS-Config*;

1> if the releaseCause received in the RRCConnectionRelease message indicates loadBalancingTAURequired:

2> perform the actions upon leaving RRC_CONNECTED as specified in 5.3.12, with release cause 'load balancing TAU required';

1> else if the releaseCause received in the RRCConnectionRelease message indicates cs-FallbackHighPriority:

2> perform the actions upon leaving RRC_CONNECTED as specified in 5.3.12, with release cause 'CS Fallback High Priority';

1> else:

2> if the *extendedWaitTime* is present and the UE supports delay tolerant access:

3> forward the *extendedWaitTime* to upper layers;

2> perform the actions upon leaving RRC_CONNECTED as specified in 5.3.12, with release cause 'other';

FIG.25

```
–          VarAS-Config
The UE variable VarAS-Config includes the AS configuration stored by the UE while in RRC_IDLE if asked by E-
UTRAN. The UE considers the stored AS configuration to be invalid after the hours indicated by ue-AS-
ConfigValidityTime from the moment when leaving RRC_CONNECTED.

VarAS-Config UE variable
-- ASN1START

VarAS-Config-r13 ::=          SEQUENCE {
    radioResourceConfigDedicated-r13    RadioResourceConfigDedicated,
    securityAlgorithmConfig-r13         SecurityAlgorithmConfig,
    measConfig-r13                      MeasConfig,
    nextHopChainingCount-r13            NextHopChainingCount,
    physCellId-r13                      PhysCellId,
    s-TMSI-r13                          S-TMSI,
    ue-Identity-r13                     C-RNTI,
}

-- ASN1STOP
```

FIG.28A

```
                        RRCConnectionRequest message

-- ASN1START

RRCConnectionRequest ::=          SEQUENCE {
    criticalExtensions                CHOICE {
        rrcConnectionRequest-r8           RRCConnectionRequest-r8-IEs,
        criticalExtensionsFuture          CHOICE {
            rrcConnectionRequest-r13          RRCConnectionRequest-r13-IEs,
            criticalExtensionsFuture          SEQUENCE {}
        }
    }
}

RRCConnectionRequest-r8-IEs ::=   SEQUENCE {
    ue-Identity                       InitialUE-Identity,
    establishmentCause                EstablishmentCause,
    spare                             BIT STRING (SIZE (1))
}

RRCConnectionRequest-r13-IEs ::=  SEQUENCE {
    ue-AS-ConfigIdentity-r13          UE-AS-ConfigIdentity-r13,
    establishmentCause-r13            EstablishmentCause,
    spare-r13                         BIT STRING (SIZE (8))         OPTIONAL
}

InitialUE-Identity ::=            CHOICE {
    s-TMSI                            S-TMSI,
    randomValue                       BIT STRING (SIZE (40))
}

EstablishmentCause ::=            ENUMERATED {
                                      emergency, highPriorityAccess, mt-Access, mo-Signalling,
                                      mo-Data, delayTolerantAccess-v1020, mo-VoiceCall-v1280,
spare1}

UE-AS-ConfigIdentity-r13 ::=      SEQUENCE {
    lastShortMAC-I-r13                ShortMAC-I,
    shortResumeIdentity-r13           BIT STRING (SIZE (24))
}

-- ASN1STOP
```

FIG.28B

| RRCConnectionRequest field descriptions |
|---|
| *establishmentCause*<br>Provides the establishment cause for the RRC connection request as provided by the upper layers. W.r.t. the cause value names: highPriorityAccess concerns AC11..AC15, 'mt' stands for 'Mobile Terminating' and 'mo' for 'Mobile Originating. |
| *randomValue*<br>Integer value in the range 0 to $2^{40} - 1$. |
| *ue-AS-ConfigIdentity*<br>Includes information to identify and authenticate the AS configuration stored by the UE and E-UTRAN, which consists of C-RNTI, PCI and ShortMAC-I used in the previous RRC connection. |
| *shortResumeIdentity*<br>A 24 bit length identifier to identify the AS configuration for the UE and the eNB at which the AS configuration is stored for the UE. |
| *ue-Identity*<br>UE identity included to facilitate contention resolution by lower layers. |

FIG.29A

– *RRCConnectionSetup*

The *RRCConnectionSetup* message is used to establish SRB1 and, if supported, to resume *radioResourceConfigDedicated* including SRB2 and DRB(s), *measConfig* and security keys stored in RRC_IDLE.

Signalling radio bearer: SRB0

RLC-SAP: TM

Logical channel: CCCH

Direction: E-UTRAN to UE

*RRCConnectionSetup message*

```
-- ASN1START

RRCConnectionSetup ::=          SEQUENCE {
    rrc-TransactionIdentifier       RRC-TransactionIdentifier,
    criticalExtensions              CHOICE {
        c1                              CHOICE {
            rrcConnectionSetup-r8           RRCConnectionSetup-r8-IEs,
            spare7 NULL,
            spare6 NULL, spare5 NULL, spare4 NULL,
            spare3 NULL, spare2 NULL, spare1 NULL
        },
        criticalExtensionsFuture        SEQUENCE {}
    }
}

RRCConnectionSetup-r8-IEs ::=   SEQUENCE {
    radioResourceConfigDedicated    RadioResourceConfigDedicated,
    nonCriticalExtension            RRCConnectionSetup-v8a0-IEs         OPTIONAL
}

RRCConnectionSetup-v8a0-IEs ::= SEQUENCE {
    lateNonCriticalExtension        OCTET STRING                        OPTIONAL,
    nonCriticalExtension            RRCConnectionSetup-v13xy-IEsSEQUENCE {}
    OPTIONAL
}

RRCConnectionSetup-v13xy-IEs ::= SEQUENCE {
    ue-AS-ConfigActivate-r13        ENUMERATED {true}                   OPTIONAL,  -- Need OP
    nextHopChainingCount-r13        NextHopChainingCount                OPTIONAL,  -- Cond AS
    requestLongResumeIdentity-r13   ENUMERATED {true}                   OPTIONAL,  -- Need ON
    nonCriticalExtension            SEQUENCE {}                         OPTIONAL
}

-- ASN1STOP
```

FIG.29B

| RRCConnectionSetup field descriptions |
|---|
| requestLongResumeIdentity <br> Indicates that the UE is requested to provide *longResumeIdentity*. |
| ue-AS-ConfigActivate <br> Indicates that the UE resumes to use the AS configuration stored in *VarAS-Config* specified in 7.1. |

| Conditional presence | Explanation |
|---|---|
| AS | The field is mandatory present, need ON, if *ue-AS-ConfigActivate* is present. Otherwise the field is not present. |

FIG.30A

```
                    RRCConnectionSetupComplete message

-- ASN1START

RRCConnectionSetupComplete ::=      SEQUENCE {
    rrc-TransactionIdentifier          RRC-TransactionIdentifier,
    criticalExtensions                 CHOICE {
        c1                                CHOICE{
            rrcConnectionSetupComplete-r8    RRCConnectionSetupComplete-r8-IEs,
            spare3 NULL, spare2 NULL, spare1 NULL
        },
                                          SEQUENCE {}

RRCConnectionSetupComplete-v1130-IEs ::=
    connEstFailInfoAvailable-r11       ENUMERATED {true},
    nonCriticalExtension               RRCConnectionSetupComplete-v1250-IEs
}

RRCConnectionSetupComplete-v1250-IEs ::= SEQUENCE {
    mobilityState-r12                  ENUMERATED {normal, medium, high, spare} OPTIONAL,
    mobilityHistoryAvail-r12           ENUMERATED {true}                  OPTIONAL,
    logMeasAvailableMBSFN-r12          ENUMERATED {true}                  OPTIONAL,
    nonCriticalExtension               RRCConnectionSetupComplete-v13xy-IEsSEQUENCE {}
        OPTIONAL
}

RRCConnectionSetupComplete-v13xy-IEs ::= SEQUENCE {
    longResumeIdentity-r13             BIT STRING (SIZE (40))             OPTIONAL,
    nonCriticalExtension               SEQUENCE {}                        OPTIONAL
}

RegisteredMME ::=                   SEQUENCE {
    plmn-Identity                      PLMN-Identity                      OPTIONAL,
    mmegi                              BIT STRING (SIZE (16)),
    mmec                               MMEC
}

-- ASN1STOP
```

FIG.30B

| RRCConnectionSetupComplete field descriptions |
|---|
| *gummei-Type*<br>This field is used to indicate whether the GUMMEI included is native (assigned by EPC) or mapped (from 2G/3G identifiers). |
| *longResumeIdentity*<br>A 40 bit length identifier to identify the AS configuration for the UE and the eNB at which the AS configuration is stored for the UE. |
| *mmegi*<br>Provides the Group Identity of the registered MME within the PLMN, as provided by upper layers, see TS 23.003 [27]. |
| *mobilityState*<br>This field indicates the UE mobility state (as defined in TS 36.304 [4, 5.2.4.3]) just prior to UE going into RRC_CONNECTED state. The UE indicates the value of *medium* and *high* when being in Medium-mobility and High-mobility states respectively. Otherwise the UE indicates the value *normal*. |
| *registeredMME*<br>This field is used to transfer the GUMMEI of the MME where the UE is registered, as provided by upper layers. |
| *rn-SubframeConfigReq*<br>If present, this field indicates that the connection establishment is for an RN and whether a subframe configuration is requested or not. |
| *selectedPLMN-Identity*<br>Index of the PLMN selected by the UE from the *plmn-IdentityList* included in SIB1. 1 if the 1st PLMN is selected from the *plmn-IdentityList* included in SIB1, 2 if the 2nd PLMN is selected from the *plmn-IdentityList* included in SIB1 and so on. |

FIG.31A

```
                    RRCConnectionRequest message

-- ASN1START

RRCConnectionRequest ::=        SEQUENCE {
    criticalExtensions              CHOICE {
        rrcConnectionRequest-r8         RRCConnectionRequest-r8-IEs,
        criticalExtensionsFuture        CHOICE {
            rrcConnectionRequest-r13        RRCConnectionRequest-r13-IEs,
            criticalExtensionsFuture        SEQUENCE {}
        }
    }
}

RRCConnectionRequest-r8-IEs ::= SEQUENCE {
    ue-Identity                     InitialUE-Identity,
    establishmentCause              EstablishmentCause,
    spare                           BIT STRING (SIZE (1))
}

RRCConnectionRequest-r13-IEs ::= SEQUENCE {
    ue-AS-ConfigIdentity-r13        UE-AS-ConfigIdentity-r13,
    establishmentCause-r13          EstablishmentCause,
    spare-r13                       BIT STRING (SIZE (8))            OPTIONAL
}

InitialUE-Identity ::=          CHOICE {
    s-TMSI                          S-TMSI,
    randomValue                     BIT STRING (SIZE (40))
}

EstablishmentCause ::=          ENUMERATED {
                                    emergency, highPriorityAccess, mt-Access, mo-Signalling,
                                    mo-Data, delayTolerantAccess-v1020, mo-VoiceCall-v1280,
spare1}

UE-AS-ConfigIdentity-r13 ::=    SEQUENCE {
    shortResumeIdentity-r13         BIT STRING (SIZE (40))
}

-- ASN1STOP
```

FIG.31B

| RRCConnectionRequest field descriptions |
|---|
| *establishmentCause*<br>Provides the establishment cause for the RRC connection request as provided by the upper layers. W.r.t. the cause value names: highPriorityAccess concerns AC11..AC15, 'mt' stands for 'Mobile Terminating' and 'mo' for 'Mobile Originating. |
| *randomValue*<br>Integer value in the range 0 to $2^{40} - 1$. |
| *ue-AS-ConfigIdentity*<br>Includes information to identify and authenticate the AS configuration stored by the UE and E-UTRAN, which consists of C-RNTI, PCI and ShortMAC-I used in the previous RRC connection. |
| *shortResumeIdentity*<br>A 40 bit length identifier to identity the AS configuration for the UE and the eNB at which the AS configuration is stored, and to authenticate the corresponding UE. |
| *ue-Identity*<br>UE identity included to facilitate contention resolution by lower layers. |

FIG.32A

```
                    RRCConnectionSetupComplete message

-- ASN1START

RRCConnectionSetupComplete ::=     SEQUENCE {
    rrc-TransactionIdentifier         RRC-TransactionIdentifier,
    criticalExtensions                CHOICE {
        c1                                CHOICE{
            rrcConnectionSetupComplete-r8      RRCConnectionSetupComplete-r8-IEs,
            spare3 NULL, spare2 NULL, spare1 NULL
        },
                                    SEQUENCE {}
```

```
RRCConnectionSetupComplete-v1130-IEs ::=
    connEstFailInfoAvailable-r11       ENUMERATED {true},
    nonCriticalExtension               RRCConnectionSetupComplete-v1250-IEs
}

RRCConnectionSetupComplete-v1250-IEs ::= SEQUENCE {
    mobilityState-r12                  ENUMERATED {normal, medium, high, spare} OPTIONAL,
    mobilityHistoryAvail-r12           ENUMERATED {true}               OPTIONAL,
    logMeasAvailableMBSFN-r12          ENUMERATED {true}               OPTIONAL,
    nonCriticalExtension               RRCConnectionSetupComplete-v13xy-IEsSEQUENCE {}
        OPTIONAL
}

RRCConnectionSetupComplete-v13xy-IEs ::= SEQUENCE {
    longResumeIdentity-r13             BIT STRING (SIZE (56))          OPTIONAL,
    nonCriticalExtension               SEQUENCE {}                     OPTIONAL
}

RegisteredMME ::=                  SEQUENCE {
    plmn-Identity                      PLMN-Identity                   OPTIONAL,
    mmegi                              BIT STRING (SIZE (16)},
    mmec                               MMEC
}

-- ASN1STOP
```

FIG.32B

| RRCConnectionSetupComplete field descriptions |
|---|
| gummei-Type <br> This field is used to indicate whether the GUMMEI included is native (assigned by EPC) or mapped (from 2G/3G identifiers). |
| longResumeIdentity <br> A 56 bit length identifier to identify the AS configuration for the UE and the eNB at which the AS configuration is stored and to authenticate UE. |
| mmegi <br> Provides the Group Identity of the registered MME within the PLMN, as provided by upper layers, see TS 23.003 [27]. |
| mobilityState <br> This field indicates the UE mobility state (as defined in TS 36.304 [4, 5.2.4.3]) just prior to UE going into RRC_CONNECTED state. The UE indicates the value of *medium* and *high* when being in Medium-mobility and High-mobility states respectively. Otherwise the UE indicates the value *normal*. |
| registeredMME <br> This field is used to transfer the GUMMEI of the MME where the UE is registered, as provided by upper layers. |
| rn-SubframeConfigReq <br> If present, this field indicates that the connection establishment is for an RN and whether a subframe configuration is requested or not. |
| selectedPLMN-Identity <br> Index of the PLMN selected by the UE from the *plmn-IdentityList* included in SIB1. 1 if the 1st PLMN is selected from the *plmn-IdentityList* included in SIB1, 2 if the 2nd PLMN is selected from the *plmn-IdentityList* included in SIB1 and so on. |

FIG.33A

```
                    RRCConnectionRequest message

-- ASN1START

RRCConnectionRequest ::=            SEQUENCE {
    criticalExtensions                  CHOICE {
        rrcConnectionRequest-r8             RRCConnectionRequest-r8-IEs,
        criticalExtensionsFuture            CHOICE {
            rrcConnectionRequest-r13            RRCConnectionRequest-r13-IEs,
            criticalExtensionsFuture            SEQUENCE {}
        }
    }
}

RRCConnectionRequest-r8-IEs ::=     SEQUENCE {
    ue-Identity                         InitialUE-Identity,
    establishmentCause                  EstablishmentCause,
    spare                               BIT STRING (SIZE (1))
}

RRCConnectionRequest-r13-IEs ::=    SEQUENCE {
    ue-AS-ConfigIdentity-r13            UE-AS-ConfigIdentity-r13,
    establishmentCause-r13              EstablishmentCause,
    spare-r13                           BIT STRING (SIZE (8))                OPTIONAL
}

InitialUE-Identity ::=              CHOICE {
    s-TMSI                              S-TMSI,
    randomValue                         BIT STRING (SIZE (40))
}

EstablishmentCause ::=              ENUMERATED {
                                        emergency, highPriorityAccess, mt-Access, mo-Signalling,
                                        mo-Data, delayTolerantAccess-v1020, mo-VoiceCall-v1280, spare1}

UE-AS-ConfigIdentity-r13 ::=        SEQUENCE {
    lastShortMAC-I-r13                  ShortMAC-I,
    resumeIdentity-LSB-r13              BIT STRING (SIZE (24))
}

-- ASN1STOP
```

FIG.33B

| RRCConnectionRequest field descriptions |
|---|
| establishmentCause<br>Provides the establishment cause for the RRC connection request as provided by the upper layers. W.r.t. the cause value names: highPriorityAccess concerns AC11..AC15, 'mt' stands for 'Mobile Terminating' and 'mo' for 'Mobile Originating. |
| randomValue<br>Integer value in the range 0 to $2^{40} - 1$. |
| ue-AS-ConfigIdentity<br>Includes information to identify and authenticate the AS configuration stored by the UE and E-UTRAN, which consists of C-RNTI, PCI and ShortMAC-I used in the previous RRC connection. |
| resumeIdentity-LSB<br>A least significant 24 bits of resume identity to identity the AS configuration for the UE and the eNB at which the AS configuration is stored for the UE. |
| ue-Identity<br>UE identity included to facilitate contention resolution by lower layers. |

FIG.34A

```
                    RRCConnectionSetupComplete message

-- ASN1START

RRCConnectionSetupComplete ::=        SEQUENCE {
    rrc-TransactionIdentifier           RRC-TransactionIdentifier,
    criticalExtensions                  CHOICE {
        c1                                CHOICE{
            rrcConnectionSetupComplete-r8       RRCConnectionSetupComplete-r8-IEs,
            spare3 NULL, spare2 NULL, spare1 NULL
        },
                                          SEQUENCE {}

RRCConnectionSetupComplete-v1130-IEs ::= SEQ
    connEstFailInfoAvailable-r11        ENUMERATED {true}
    nonCriticalExtension                RRCConnectionSetupComplete-v1250-IEs
}

RRCConnectionSetupComplete-v1250-IEs ::= SEQUENCE {
    mobilityState-r12                   ENUMERATED {normal, medium, high, spare} OPTIONAL,
    mobilityHistoryAvail-r12            ENUMERATED {true}                        OPTIONAL,
    logMeasAvailableMBSFN-r12           ENUMERATED {true}                        OPTIONAL,
    nonCriticalExtension                RRCConnectionSetupComplete-v13xy-IEsSEQUENCE {}
        OPTIONAL
}

RRCConnectionSetupComplete-v13xy-IEs ::= SEQUENCE {
    resumeIdentity-MSB-r13              BIT STRING (SIZE (16))          OPTIONAL,
    nonCriticalExtension                SEQUENCE {}                     OPTIONAL
}

RegisteredMME ::=                     SEQUENCE {
    plmn-Identity                       PLMN-Identity                            OPTIONAL,
    mmegi                               BIT STRING (SIZE (16)),
    mmec                                MMEC
}

-- ASN1STOP
```

FIG.34B

| RRCConnectionSetupComplete field descriptions |
|---|
| *gummei-Type* <br> This field is used to indicate whether the GUMMEI included is native (assigned by EPC) or mapped (from 2G/3G identifiers). |
| <u>*resumeIdentity-MSB*</u> <br> <u>A most sifnificant 16 bits of resume identity to identity the AS configuration for the UE and the eNB at which the AS configuration is stored for the UE.</u> |
| *mmegi* <br> Provides the Group Identity of the registered MME within the PLMN, as provided by upper layers, see TS 23.003 [27]. |
| *mobilityState* <br> This field indicates the UE mobility state (as defined in TS 36.304 [4, 5.2.4.3]) just prior to UE going into RRC_CONNECTED state. The UE indicates the value of *medium* and *high* when being in Medium-mobility and High-mobility states respectively. Otherwise the UE indicates the value *normal*. |
| *registeredMME* <br> This field is used to transfer the GUMMEI of the MME where the UE is registered, as provided by upper layers. |
| *rn-SubframeConfigReq* <br> If present, this field indicates that the connection establishment is for an RN and whether a subframe configuration is requested or not. |
| *selectedPLMN-Identity* <br> Index of the PLMN selected by the UE from the *plmn-IdentityList* included in SIB1. 1 if the 1st PLMN is selected from the *plmn-IdentityList* included in SIB1, 2 if the 2nd PLMN is selected from the *plmn-IdentityList* included in SIB1 and so on. |

FIG.35A

RRCConnectionRequest message

```
-- ASN1START

RRCConnectionRequest ::=           SEQUENCE {
    criticalExtensions                 CHOICE {
        rrcConnectionRequest-r8            RRCConnectionRequest-r8-IEs,
        criticalExtensionsFuture           CHOICE {
            rrcConnectionRequest-r13           RRCConnectionRequest-r13-IEs,
            criticalExtensionsFuture           SEQUENCE {}
        }
    }
}

RRCConnectionRequest-r8-IEs ::=    SEQUENCE {
    ue-Identity                        InitialUE-Identity,
    establishmentCause                 EstablishmentCause,
    spare                              BIT STRING (SIZE (1))
}

RRCConnectionRequest-r13-IEs ::=   SEQUENCE {
    ue-AS-ConfigIdentity-r13           UE-AS-ConfigIdentity-r13,
    establishmentCause-r13             EstablishmentCause,
    spare-r13                          BIT STRING (SIZE (8))                    OPTIONAL
}

InitialUE-Identity ::=             CHOICE {
    s-TMSI                             S-TMSI,
    randomValue                        BIT STRING (SIZE (40))
}

EstablishmentCause ::=             ENUMERATED {
                                       emergency, highPriorityAccess, mt-Access, mo-Signalling,
                                       mo-Data, delayTolerantAccess-v1020, mo-VoiceCall-v1280, spare1}

UE-AS-ConfigIdentity-r13 ::=       SEQUENCE {
    resumeIdentity-LSB-r13             BIT STRING (SIZE (40))
}

-- ASN1STOP
```

FIG.35B

| RRCConnectionRequest field descriptions |
| --- |
| *establishmentCause* <br> Provides the establishment cause for the RRC connection request as provided by the upper layers. W.r.t. the cause value names: highPriorityAccess concerns AC11..AC15, 'mt' stands for 'Mobile Terminating' and 'mo' for 'Mobile Originating. |
| *randomValue* <br> Integer value in the range 0 to $2^{40} - 1$. |
| *ue-AS-ConfigIdentity* <br> Includes information to identify and authenticate the AS configuration stored by the UE and E-UTRAN, which consists of resume identity and ShortMAC-I used in the previous RRC connection. |
| *resumeIdentity-LSB* <br> A least significant 40 bits of resume identity to identity the AS configuration for the UE and the eNB at which the AS configuration is stored, and to authenticate the corresponding UE. |
| *ue-Identity* <br> UE identity included to facilitate contention resolution by lower layers. |

FIG.36A

```
                    RRCConnectionSetupComplete message
-- ASN1START

RRCConnectionSetupComplete ::=      SEQUENCE {
    rrc-TransactionIdentifier           RRC-TransactionIdentifier,
    criticalExtensions                  CHOICE {
        c1                                  CHOICE{
            rrcConnectionSetupComplete-r8       RRCConnectionSetupComplete-r8-IEs,
            spare3 NULL, spare2 NULL, spare1 NULL
        },
                                            SEQUENCE {}

RRCConnectionSetupComplete-v1130-IEs ::=
    connEstFailInfoAvailable-r11        ENUMERATED {true}
    nonCriticalExtension                RRCConnectionSetupComplete-v1250-IEs
}

RRCConnectionSetupComplete-v1250-IEs ::= SEQUENCE {
    mobilityState-r12                   ENUMERATED {normal, medium, high, spare}   OPTIONAL,
    mobilityHistoryAvail-r12            ENUMERATED {true}                          OPTIONAL,
    logMeasAvailableMBSFN-r12           ENUMERATED {true}                          OPTIONAL,
    nonCriticalExtension                RRCConnectionSetupComplete-v13xy-IEsSEQUENCE {}
        OPTIONAL
}

RRCConnectionSetupComplete-v13xy-IEs ::= SEQUENCE {
    resumeIdentity-MSB-r13              BIT STRING (SIZE (16))          OPTIONAL,
    nonCriticalExtension                SEQUENCE {}                     OPTIONAL
}

RegisteredMME ::=                   SEQUENCE {
    plmn-Identity                       PLMN-Identity                   OPTIONAL,
    mmegi                               BIT STRING (SIZE (16)),
    mmec                                MMEC
}

-- ASN1STOP
```

FIG.36B

| RRCConnectionSetupComplete field descriptions |
|---|
| *gummei-Type*<br>This field is used to indicate whether the GUMMEI included is native (assigned by EPC) or mapped (from 2G/3G identifiers). |
| <u>*resumeIdentity-MSB*</u><br><u>A most significant 16 bits of resume identity to identity the AS configuration for the UE and the eNB at which the AS configuration is stored and to authenticate UE.</u> |
| *mmegi*<br>Provides the Group Identity of the registered MME within the PLMN, as provided by upper layers, see TS 23.003 [27]. |
| *mobilityState*<br>This field indicates the UE mobility state (as defined in TS 36.304 [4, 5.2.4.3]) just prior to UE going into RRC_CONNECTED state. The UE indicates the value of *medium* and *high* when being in Medium-mobility and High-mobility states respectively. Otherwise the UE indicates the value *normal*. |
| *registeredMME*<br>This field is used to transfer the GUMMEI of the MME where the UE is registered, as provided by upper layers. |
| *rn-SubframeConfigReq*<br>If present, this field indicates that the connection establishment is for an RN and whether a subframe configuration is requested or not. |
| *selectedPLMN-Identity*<br>Index of the PLMN selected by the UE from the *plmn-IdentityList* included in SIB1. 1 if the 1st PLMN is selected from the *plmn-IdentityList* included in SIB1, 2 if the 2nd PLMN is selected from the *plmn-IdentityList* included in SIB1 and so on. |

FIG.42A

| 6.2.1 | MAC header for DL-SCH, UL-SCH and MCH |
|---|---|

The MAC header is of variable size and consists of the following fields:

- LCID: The Logical Channel ID field identifies the logical channel instance of the corresponding MAC SDU or the type of the corresponding MAC control element or padding as described in tables 6.2.1-1, 6.2.1-2 and 6.2.1-4 for the DL-SCH, UL-SCH and MCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. A UE of Category 0 [12] shall indicate CCCH using LCID "01011"; a UE supporting data transfer via SRB [TS36.300] only shall indicate CCCH using LCID "01100"; a UE supporting data transfer via DRB [TS36.300] only shall indicate CCCH using LCID "01101"; a UE supporting both data transfer via SRB and data transfer via DRB shall indicate CCCH using LCID "01110"; otherwise the UE shall indicate CCCH using LCID "00000". The LCID field size is 5 bits;

FIG.42B

Table 6.2.1-2 Values of LCID for UL-SCH

| Index | LCID values |
|---|---|
| 00000 | CCCH |
| 00001-01010 | Identity of the logical channel |
| 01011 | CCCH |
| <u>01100</u> | <u>CCCH</u> |
| <u>01101</u> | <u>CCCH</u> |
| <u>01110</u> | <u>CCCH</u> |
| ~~01100~~<u>01111</u>-10101 | Reserved |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

FIG.43

---
5.2.4.XX    Cell reselection when storing UE AS context

For UEs storing UE AS context and *resumeIdentify* as specified in TS 36.331 [3], upon cell reselection to another RAT, the UE discards the stored UE AS context and *resumeIdentity* until RRC connection is established to another RAT.

---
5.2.4.XX    Cell reselection when storing UE AS context

For UEs storing UE AS context and *resumeIdentify* as specified in TS 36.331 [3], if the UE performs intra and inter-frequncy cell reselection within E-UTRAN, the UE keeps the stored UE AS context and *resumeIdentity* no matter if *up-CIoT-EPS-Optimisation* is broadcast in *SystemInformationBlockType2*. If the UE performs cell reselection to another RAT, the UE discards the stored UE AS context and *resumeIdentity*.

---

USER EQUIPMENT, BASE STATION, AND CONNECTION ESTABLISHMENT METHOD

TECHNICAL FIELD

The present invention relates to a technique in which each of user equipment UE and a base station eNB in a mobile communication system retains a UE context.

BACKGROUND ART

In an LTE system, as a connected state of user equipment UE (which is referred to as a "UE," hereinafter) with a base station eNB (which is referred to as an "eNB," hereinafter), there are two states, that is, a radio resource control (RRC) idle state (RRC Idle) and an RRC connected state (RRC_Connected).

When the UE is connected to a network, a UE context is generated by a mobility management entity (MME) on a core NW side, and in the RRC connected state, the UE context is retained in a UE and an eNB, to which the UE is connected. The UE context is information including bearer-related information, security-related information, etc.

When the UE performs transition between the RRC idle state and the RRC connected state, signaling of call control including that of the core NW side frequently occurs, so that the problem is how to reduce the signaling.

For example, when the UE transitions from the RRC connected state to the RRC idle state, signaling illustrated in FIG. 1 occurs (e.g., Non-Patent Document 1). The case of FIG. 1 is a case in which an eNB 2 detects that communication of a UE 1 is not performed for a predetermined time, disconnects a connection with the UE 1, and transitions to the RRC idle state.

In FIG. 1, the eNB 2 transmits a UE context release request to an MME 3 (step 1). The MME 3 transmits a bearer release request (Release Access Bearers Request) to a serving gateway (S-GW 4) (step 2), and the S-GW 4 transmits a bearer release response (Release Access Bearers Response) to the MME 3 (step 3).

The MME 3 transmits a UE context release command to the eNB 2 (step 4). The eNB 2 transmits an RRC connection release to the UE 1 (step 5) so as to cause the UE 1 to release the UE context to transition to the RRC idle state. Further, the eNB 2 releases the UE context and transmits a UE context release complete to the MME 3 (step 6).

PRIOR ART DOCUMENT

Non-Patent Document

Non-Patent Document 1: 3GPP TS 36.413 V 12.4.0 (2014-12)
Non-Patent Document 2: 3GPP TSG RAN Meeting #66 RP-142030 Maui, USA, 8-th to 11-th, Dec. 2014
Non-Patent Document 3: 3GPP TS 36.331 V 12.6.0 (2015-06)
Non-Patent Document 4: 3GPP TS 36.321 V 12.7.0 (2015-09)
Non-Patent Document 5: 3GPP TR 23.720 V1.2.0 (2015-11)

SUMMARY OF THE INVENTION

Problem To Be Solved By The Invention

In a signaling procedure illustrated in FIG. 1, signaling frequently occurs at the time of the RRC connection release, and even when the UE transitions from the RRC idle state to the RRC connected state again, signaling frequently occurs.

In order to reduce the signaling when the UE performs transition between the RRC idle state and the RRC connected state, a study of a method has been started such that, when the UE performs transition of the RRC connected state→the RRC idle state→the RRC connected state within the same eNB, the UE context is kept retaining in each of the eNB and the UE so as to reuse the UE context (Non-Patent Document 2). An example of a procedure considered in the method is described with reference to FIG. 2.

The state illustrated in (1) of FIG. 2 is a state in which the UE 1 is in the RRC connected state, and a S1-C connection and a S1-U connection (S1-C/U in FIG. 2) for the UE 1 are established on the core NW side. The S1-C connection is an S1 connection in which a C-plane signal is transmitted, and the S1-U connection is an S1 connection passing through a U-plane.

The UE 1 transitions from the state illustrated in (a) to the RRC idle state in accordance with a RRC connection release as illustrated in (b) and (c). At this time, the UE context for the UE 1 is retained in the eNB 2, the UE context for the eNB 2 is also retained in the UE 1, and the S1-C/U connections for the UE 1 are also maintained. Then, as illustrated in (d), when the UE 1 transitions to the RRC connected state, the eNB 2 and the UE 1 reuse the retained UE context, and thus the RRC connection is established while reducing the signaling.

Here, (d) of FIG. 2 illustrates an example in which the UE 1 and the eNB 2 establish the RRC connection using the retained UE contexts, but generally, a plurality of UEs resides in a cell subordinate to the eNB, and the eNB does not recognize whether each UE retains a UE context usable for the connection with the eNB.

For example, when a UE 6 retaining the UE context used for the connection with an eNB B moves to an eNB_A in the RRC idle state as illustrated in FIG. 3, it is unclear to the eNB_A whether the UE 6 retains the UE context usable for the connection with the eNB_A.

In this regard, for example, it is considered that the eNB_A makes an attempt to perform a connection procedure reusing the UE context under the assumption that all UEs residing in the cell of the eNB_A retain the UE context for the eNB_A. However, in this case, the connection procedure with the UE retaining no UE context for the eNB_A fails, a normal connection procedure in which the UE context is not reused is performed, and thus latency may occur.

The present invention has been achieved in light of the foregoing, and an object is to provide a technique for allowing a base station to determine whether user equipment retains context information in a mobile communication system in which a function for performing connection establishment by reusing context information retained in each of the user equipment and the base station is supported.

Means for Solving Problem

According to an embodiment of the present invention, there is provided user equipment of a mobile communication system that supports a function for establishing a connection by reusing context information retained in each of the user equipment and a base station, the user equipment including a transmitter that transmits, to the base station, a first message indicating that the user equipment retains user equipment side context information; a receiver that receives, from the base station, a second message indicating that the base station retains base station side context information associated with the user equipment; and a connecting unit that establishes a connection with the base station using the user equipment side context information after receiving the second message.

According to an embodiment of the present invention, there is provided a base station of a mobile communication system that supports a function for establishing a connection by reusing context information retained in each of user equipment and the base station, the base station including a receiver that receives, from the user equipment, a first message indicating that the user equipment retains user equipment side context information; a transmitter that transmits, to the user equipment, a second message indicating that the base station retains base station side context information associated with the user equipment, in response to receiving the first message; and a connecting unit that establishes, after the second message is transmitted, a connection with the user equipment using the base station side context information.

According to an embodiment of the present invention, there is provided a connection establishment method to be performed by user equipment of a mobile communication system that supports a function for performing connection establishment by reusing context information retained in each of the user equipment and a base station, the connection establishment method including a transmission step of transmitting, to the base station, a first message indicating that the user equipment retains user equipment side context information; a reception step of receiving, from the base station, a second message indicating that the base station retains base station side context information associated with the user equipment; and a connection step of establishing, after receiving the second message, a connection with the base station using the user equipment side context information.

According to an embodiment of the present invention, there is provided a connection establishment method executed by a base station of a mobile communication system that supports a function for establishing a connection by reusing context information retained in each of user equipment and the base station, the connection establishment method including a reception step of receiving, from the user equipment, a first message indicating that the user equipment retains user equipment side context information; a transmission step of transmitting, to the user equipment, a second message indicating that the base station retains base station side context information associated with the user equipment, in response to receiving the first message; and a connection step of establishing, after the second message is transmitted, a connection with the user equipment using the base station side context information.

Advantage Of The Invention

According to the embodiment of the present invention, a technique is provided that allows a base station to determine whether user equipment retains context information in a mobile communication system in which a function for performing connection establishment by reusing context information retained in each of the user equipment and the base station is supported.

BRIEF DESCRIPTION OF DRAWINGS

FIG. 10A is a diagram illustrating a first specification modification of an RRC connectionRequest message;

FIG. 10B is a diagram illustrating a first specification modification of an RRC connectionRequest message;

FIG. 11A is a diagram illustrating a first specification modification of an RRC connectionSetup message;

FIG. 11B is a diagram illustrating a first specification modification of an RRC connectionSetup message;

FIG. 12 is a diagram illustrating first specification modification of an RRC connectionSetupComplete message;

FIG. 13A is a diagram illustrating a first specification modification of an RRC connectionRelease message;

FIG. 13B is a diagram illustrating a first specification modification of an RRC connectionRelease message;

FIG. 14A is a diagram illustrating a second specification modification of an RRC connectionRelease message;

FIG. 14B is a diagram illustrating a second specification modification of an RRC connectionRelease message;

FIG. 15 is a diagram illustrating a specification modification related to an operation at the time of transmission of an RRC connectionRequest message;

FIG. 16A is a diagram illustrating a second specification modification of the RRC connectionRequest message;

FIG. 16B is a diagram illustrating a second specification modification of the RRC connectionRequest message;

FIG. 17 is a diagram illustrating a specification modification related to an operation when the RRC connectionSetup message is received;

FIG. 18A is a diagram illustrating a second specification modification of the RRC connectionSetup message;

FIG. 18B is a diagram illustrating a second specification modification of the RRC connectionSetup message;

FIG. 19 is a diagram illustrating specification modification of a UE operation when an RRC connection Reject corresponding to an option 1 is received;

FIG. 20 is a diagram illustrating a specification modification of a UE operation when an RRC connection Reject corresponding to an option 2 is received;

FIG. 21A is a diagram illustrating a specification modification of the RRC connection Reject message corresponding to the option 1;

FIG. 21B is a diagram illustrating the specification modification of the RRC connection Reject message corresponding to the option 1;

FIG. 22A is a diagram illustrating a specification modification of the RRC connection Reject message corresponding to the option 2;

FIG. 22B is a diagram illustrating the specification modification of the RRC connection Reject message corresponding to the option 2;

FIG. 23A is a diagram illustrating a third specification modification of the RRC connectionRelease message;

FIG. 23B is a diagram illustrating the third specification modification of the RRC connectionRelease message;

FIG. 24 is a diagram illustrating a specification modification related to an operation when the RRC connectionRelease message is received;

FIG. 25 is a diagram illustrating a specification modification related to variables for UE context retention;

FIG. 28A is a diagram illustrating a third specification modification of the RRC connectionRequest message;

FIG. 28B is a diagram illustrating the third specification modification of the RRC connectionRequest message;

FIG. 29A is a diagram illustrating a third specification modification of the RRC connectionSetup message;

FIG. 29B is a diagram illustrating the third specification modification of the RRC connectionSetup message;

FIG. 30A is a diagram illustrating a second specification modification of the RRC connectionSetupComplete message;

FIG. 30B is a diagram illustrating the second specification modification of the RRC connectionSetupComplete message;

FIG. 31A is a diagram illustrating a fourth specification modification of the RRC connectionRequest message;

FIG. 31B is a diagram illustrating the fourth specification modification of the RRC connectionRequest message;

FIG. 32A is a diagram illustrating a third specification modification of the RRC connectionSetupComplete message;

FIG. 32B is a diagram illustrating the third specification modification of the RRC connectionSetupComplete message;

FIG. 33A is a diagram illustrating a fifth specification modification of the RRC connectionRequest message;

FIG. 33B is a diagram illustrating the fifth specification modification of the RRC connectionRequest message;

FIG. 34A is a diagram illustrating a fourth specification modification of the RRC connectionSetupComplete message;

FIG. 34B is a diagram illustrating the fourth specification modification of the RRC connectionSetupComplete message;

FIG. 35A is a diagram illustrating a sixth specification modification of the RRC connectionRequest message;

FIG. 35B is a diagram illustrating the sixth specification modification of the RRC connectionRequest message.

FIG. 36A is a diagram illustrating a fifth specification modification of the RRC connectionSetupComplete message;

FIG. 36B is a diagram illustrating the fifth specification modification of the RRC connectionSetupComplete message;

FIG. 42A is a diagram illustrating a specification modification related to LCID;

FIG. 42B is a diagram illustrating a specification modification related to LCID;

FIG. 43 is a diagram illustrating a specification modification related to retention of a UE context;

FIG. 44 is a diagram illustrating specification modification related to retention of a UE context;

EMBODIMENTS OF THE INVENTION

Hereinafter, exemplary embodiments of the present invention is described with reference to the appended drawings. Further, embodiments to be described below are merely examples, and an embodiment to which the present invention is applied is not limited to the following embodiments. For example, in the present embodiment, description will proceed with an LTE system, but the present invention can be applied without being limited to LTE. Further, in this specification and claims set forth below, a term "LTE" is not limited to a specific Rel (release) of 3GPP unless otherwise specified.

(Overall System Configuration)

Figure 1:
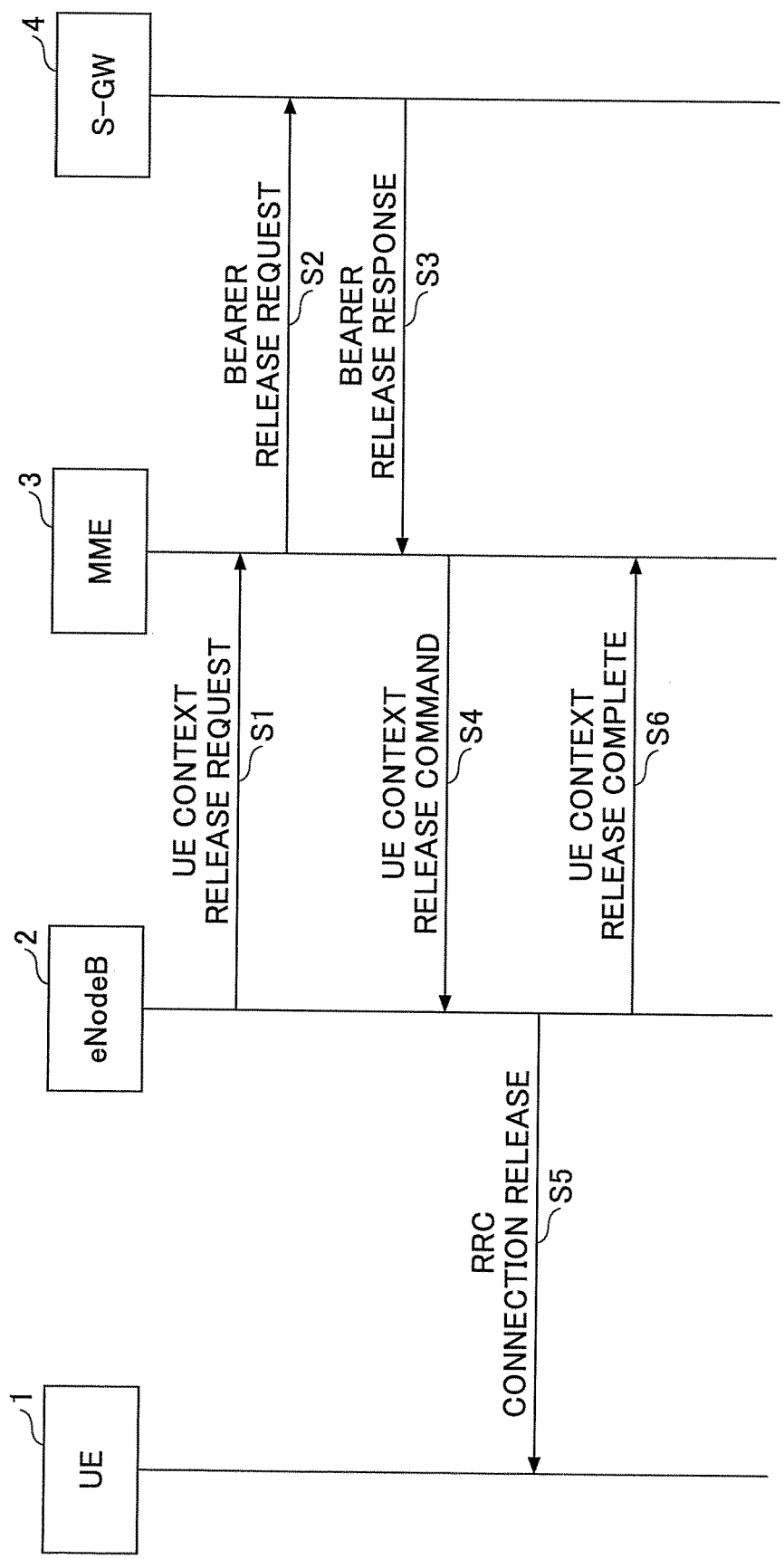
FIG. 1 is a diagram illustrating an example of a signaling sequence when transition to the RRC idle state is performed.
Figure 2:
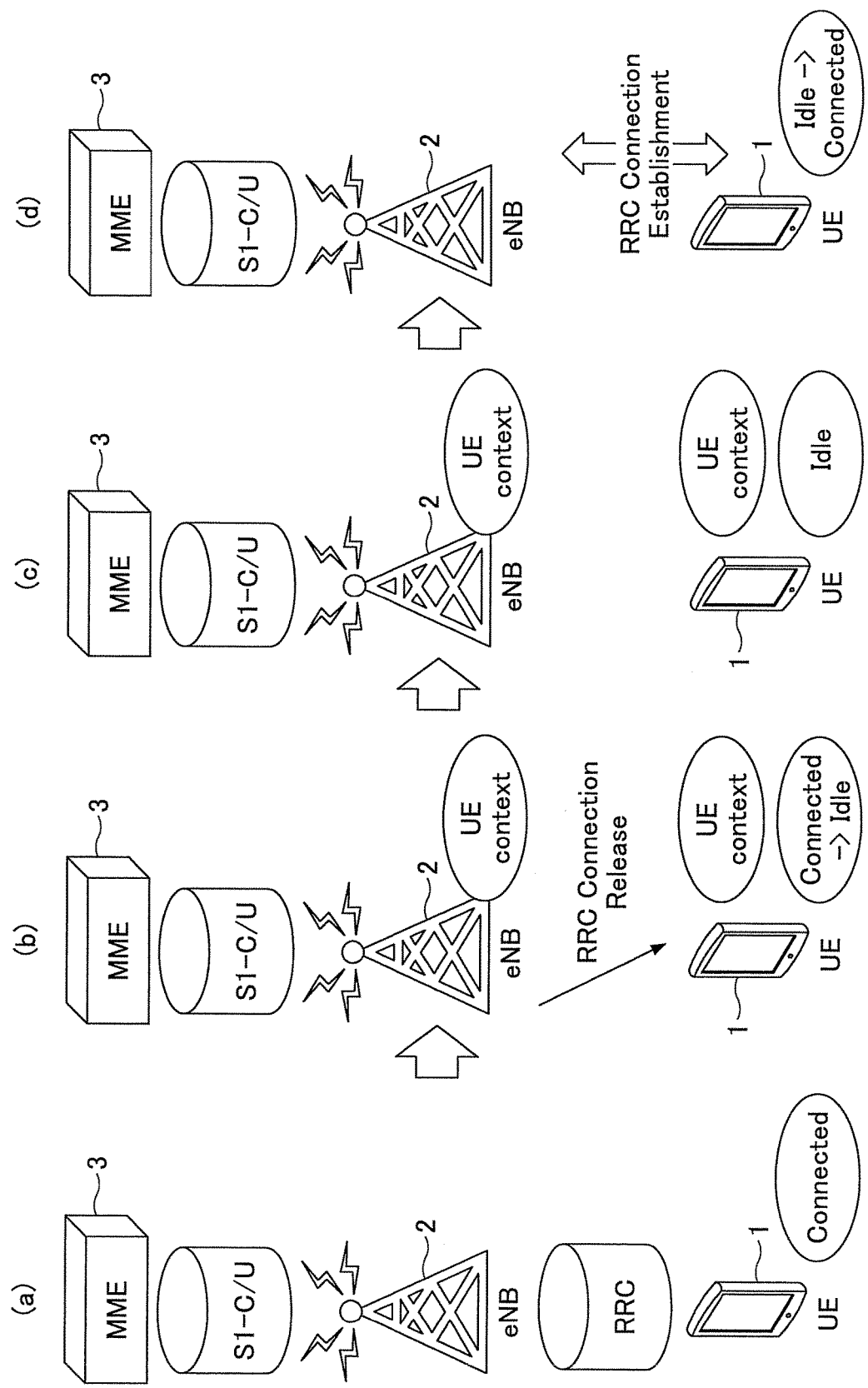
FIG. 2 is a diagram for describing an example of a process of retaining a UE context.
Figure 3:
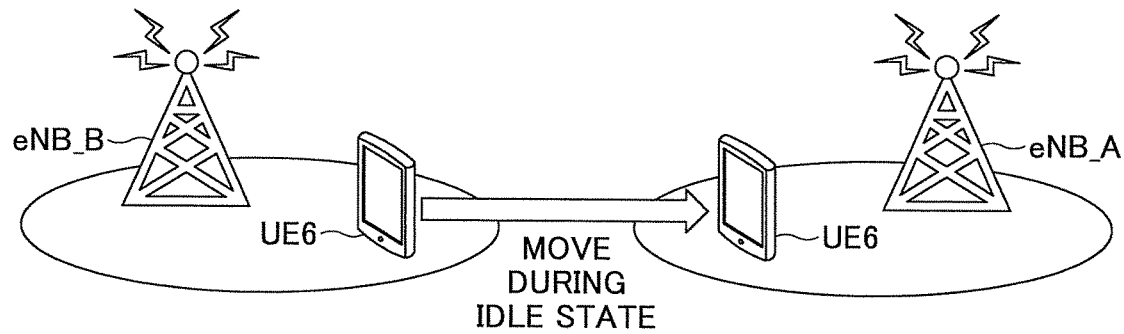
FIG. 3 is a diagram for describing a problem.
Figure 4:
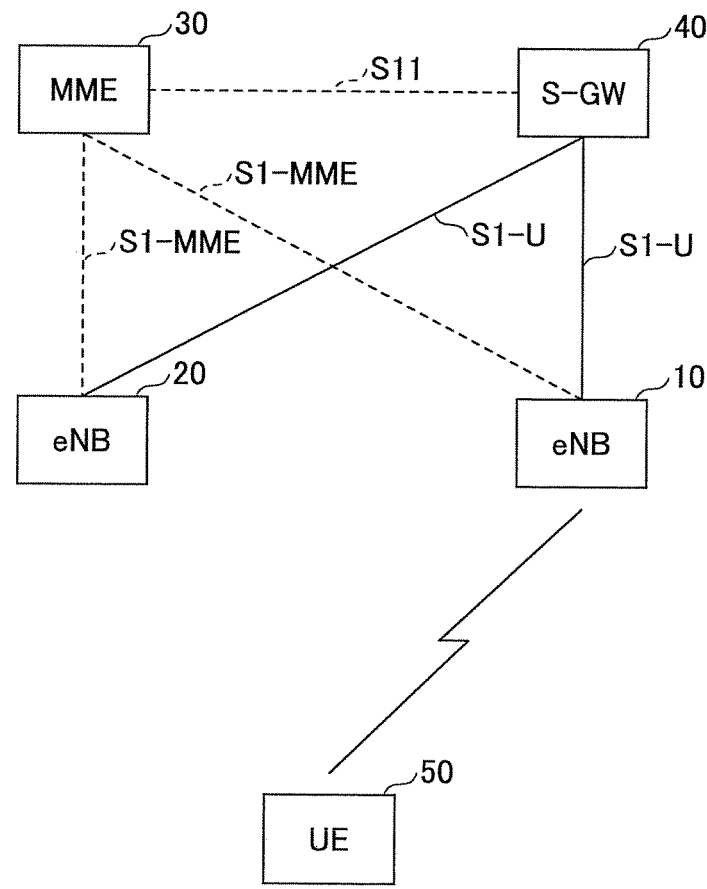
FIG. 4 is a configuration diagram of a communication system according to an embodiment of the present invention.

FIG. 4 is a diagram illustrating an exemplary configuration of a communication system according to an embodiment of the present invention. As illustrated in FIG. 4, a communication system of the present embodiment includes an eNB 10, an eNB 20, an MME 30, an S-GW 40, and a UE 50. FIG. 4 illustrates only parts related to the present embodiment in connection with the core network (EPC).

The UE 50 is user equipment such as a mobile phone. Each of the eNBs 10 and 20 is a base station. The MME 30 is a node device that accommodates an eNB and performs location registration, paging, mobility control such as handover, bearer establishment/deletion, and the like. The S-GW 40 is a node device that relays user data (U-plane data). A system including the MME 30 and the S-GW 40 is referred to as a communication control device. The MME 30 and the S-GW 40 may be configured as a single device and may be referred to as a communication control device.

As illustrated in FIG. 4, the MME 30 and the eNBs 10 and 20 are connected via an S1 MME interface, and the S-GW 40 and the eNBs 10 and 20 are connected via an S1-U interface. Dotted connecting lines indicate control signal interfaces, and solid connecting lines indicate user data transfer interfaces.

The present embodiment is under the assumption of a scheme in which as described above, even when the UE 50 transitions from the RRC connected state to the RRC idle state within the same eNB, the UE context of the UE 50 is retained in the eNB, and the UE context related to the connection with the eNB is also retained in the UE 50. As described above, the number of signals can be reduced through this scheme.

(Overall Sequence Example)

First, as a sequence example of the entire communication system according to the present embodiment, a scheme of performing paging from the MME 30 when there is an incoming call to the UE 50 in the RRC idle state. More specifically, a processing sequence when the UE 50 is connected to the eNB 10 to enter the RRC connected state, enters the RRC idle state in the cell subordinate to the eNB 10, and then receives an incoming call in the same cell is described with reference to FIG. 5.

Figure 5:
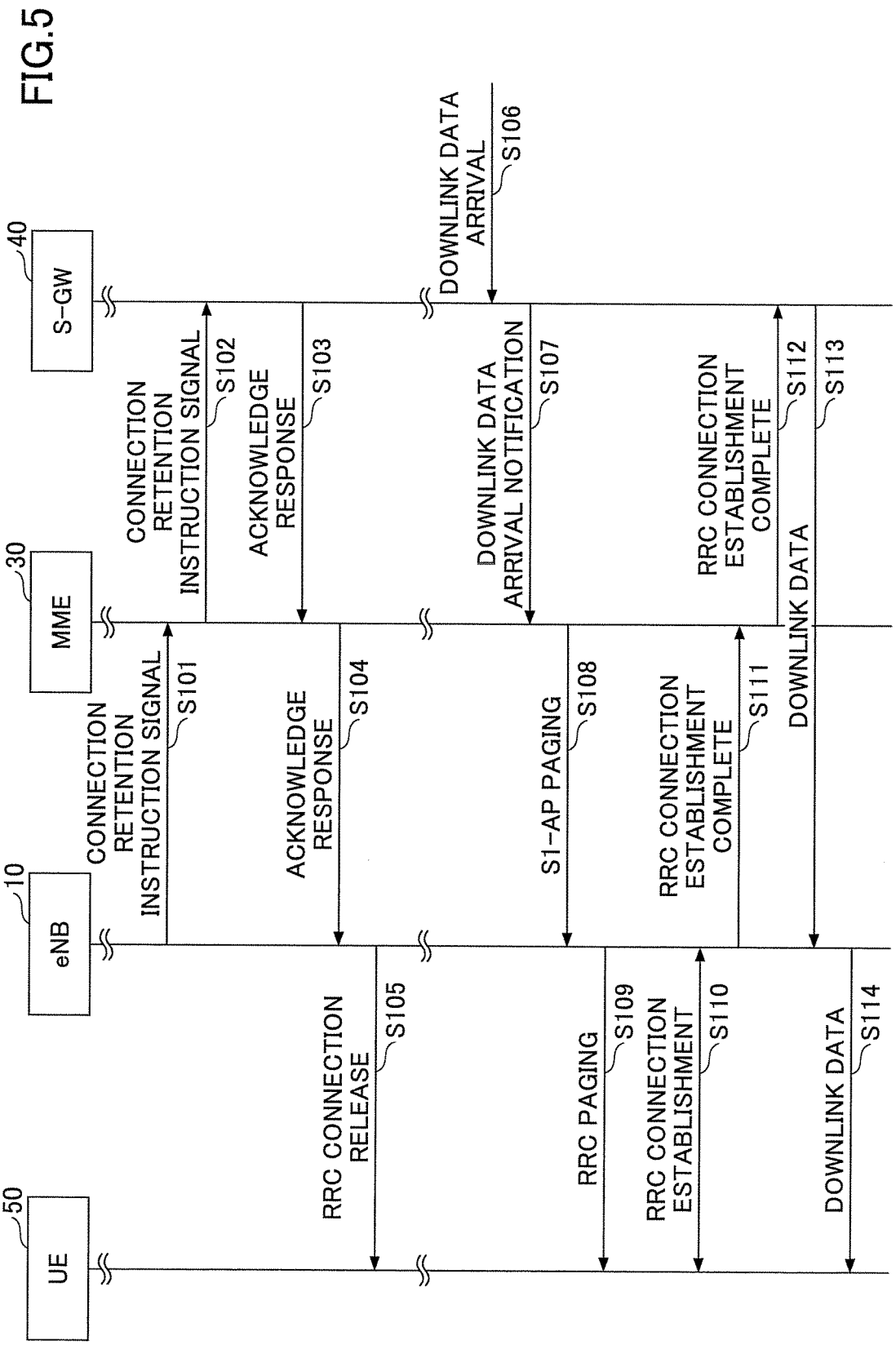
FIG. 5 is a diagram illustrating an example of a processing sequence of the entire system according to the present embodiment.

The process of FIG. 5 is under the assumption that the UE 50 is in the RRC connected state in the cell of the eNB 10, and the S1-C/U connection related to the UE 50 is established. In FIG. 5, the S1-C connection includes a connection between the eNB 10 and the MME 30 and a connection between the MME 30 and the S-GW 40, and the S1-U connection includes a connection between the eNB 10 and the S-GW 40. When the connection is established, transmission and reception of a signal (data) related to the UE 50 can be performed between corresponding node devices without performing a connection setup procedure such as a connection establishment signal.

Before the procedure of FIG. 5 is described, an overview of an example of a procedure when the UE 50 is initially connected to the eNB 10 is described (Non-Patent Document 3). At the time of random access of the UE 50, the eNB 10 transmits an RRC Connection Setup to the UE 50, causes the UE 50 to enter the RRC connected state, and receives an RRC Connection Setup Complete from the UE 50. Thereafter, the eNB 10 receives an Initial Context Setup Request from the MME 30, transmits an RRC Security Mode Command to the UE 50, receives an RRC Security Mode Complete from the UE 50, transmits an RRC Connection Reconfiguration to the UE 50, receives an RRC Connection Reconfiguration Complete from the UE 50, and transmits an Initial Context Setup Response to the MME 30. Through this procedure, the UE context is established and retained in the UE 50 and the eNB 10.

As illustrated in FIG. 5, in the RRC connected state, the eNB 10 transmits a connection retention instruction signal to the MME 30 (step 101). Further, the MME 30 transmits the connection retention instruction signal to the S-GW 40 (step 102).

The connection retention instruction signal is a signal for giving an instruction to retain downlink data in the S-GW 40 when there is an incoming call to the UE 50 while maintaining the S1-C/U connection related to the UE 50 and perform paging from the MME 30.

The S-GW 40 that has received the connection retention instruction signal transmits an acknowledge response indicating that the instruction has been confirmed to the MME 30 (step 103), and the MME 30 transmits an acknowledge response to the eNB (step 104).

The transmission of the connection retention instruction signal related to the UE 50 from the eNB 10 to the MME 30 may be triggered, for example, when an event of causing the UE 50 to transition to the RRC idle state occurs in the eNB 10 or may be performed directly after the UE 50 initially enters the RRC connected state under the control of the eNB 10, and the S1-C/U connection related to the UE 50 is established.

The event of causing the transition to the RRC idle state is, for example, a case in which it is detected that communication with the UE 50 (uplink and downlink user data communication) has not occurred for a certain period of time due to expiration of a predetermined timer (for example, a UE inactivity timer) but is not limited thereto.

In FIG. 5, the case in which it is detected that communication with the UE 50 (uplink and downlink user data communication) has not occurred for a certain period of time is assumed to be a trigger, and after steps 101 to 104, an RRC connection release is transmitted to the UE 50 to cause the UE 50 to transition to the RRC idle state (step 105).

In the present embodiment, even when the UE 50 transitions to the RRC idle state, the UE context established at the time of RRC connection is retained in each of the UE 50 and the eNB 10.

Thereafter, downlink data destined for the UE 50 occurs, and the downlink data arrives at the S-GW (step 106). Here, the S1-U connection has been established, but the S-GW 40 retains the downlink data in a buffer without transferring the downlink data to the eNB 10 on the basis of the connection retention instruction signal received in step 102.

The S-GW 40 transmits a downlink data arrival notification to the MME 30 (step 107), and the MME 30 transmits an S1-AP paging signal destined for the UE 50 to the eNB 10 (step 108). The paging is similar to an existing paging and transmitted to each eNB in a tracking area of the UE 50, but transmission to the eNB 10 is illustrated in FIG. 5.

The eNB 10 that has received the S1-AP paging signal transmits an RRC paging signal to the UE 50 subordinate thereto (step 109).

The UE 50 that has received the RRC paging signal performs an RRC connection establishment procedure and establishes the RRC connection (step 110). Thereafter, the eNB 10 transmits an RRC connection establishment complete which is a signal indicating that the establishment of the RRC connection has been completed to the MME 30 (step 111). The eNB 10 can determine that the RRC connection with the UE 50 has been established, for example, that the eNB 10 has received the RRC Connection Setup Complete from the UE 50.

The MME 30 transmits the RRC connection establishment complete signal to the S-GW 40 (step 112). As a result, the S-GW 40 determines that the RRC connection has been established between the UE 50 and the eNB 10, and starts transfer of the retained downlink data to the eNB 10 using the S1-U connection related to the UE 50 which is already established (Step 113). The downlink data is transferred from the eNB 10 to the UE 50 (step 114). As described above, the transmission of the downlink data to the UE 50 is started.

The RRC connection establishment procedure in step 110 in FIG. 5 is described later in detail. In the RRC connection establishment procedure, since the UE context established and retained at the time of RRC connection in each of the UE 50 and the eNB 10 is used, the RRC connection establishment can be performed without performing transmission and reception of messages such as the RRC Security Mode Command, the RRC Security Mode Complete, the RRC Connection Reconfiguration, and the RRC Connection Reconfiguration Complete.

Here, the UE context retrained in each of the UE 50 and the eNB 10 includes, for example, an RRC configuration, a bearer configuration (including RoHC state information and the like), an AS security context (Access Stratum Security Context), L2/L1 parameters (the MAC configuration, the PHY configuration, and the like), and the like.

Further, the UE 50 and the eNB 10 may retrain the same information as the UE context, and the UE 50 may retrain only information of the UE context that is necessary for the connection with the eNB 10, and the eNB 10 may retain only information of the UE context necessary for the connection with the UE 50.

More specifically, in the RRC idle state, for example, each of the UE 50 and the eNB 10 retains RadioResourceConfigDedicated information carried through the RRC Connection Setup, capability information carried through the RRC Connection Setup Complete, and security-related information (key information or the like), security-related information carried through the RRC Security Mode Command, configuration information carried through the RRC Connection Reconfiguration, and the like as the UE context. These are merely examples, and information retained as the UE context is not limited thereto, and information may be retrained additionally, or some pieces of the information may not be retained.

Since the UE 10 and the eNB 10 retain such information, when transition from the RRC idle state to the RRC connected state is performed, the RRC connection establishment can be performed without performing transmission and reception of messages such as the RRC Security Mode Command, the RRC Security Mode Complete, the RRC Connection Reconfiguration, and the RRC Connection Reconfiguration Complete.

Further, in the present embodiment, the eNB 10 retains the UE context in a storage unit in association with an identifier (UE identifier) of the UE corresponding to the UE context. There is no limitation to a type of UE identifier, but in the present embodiment, an SAE temporary mobile subscriber identity (S-TMSI) is used as the UE identifier as an example.

Figure 6:
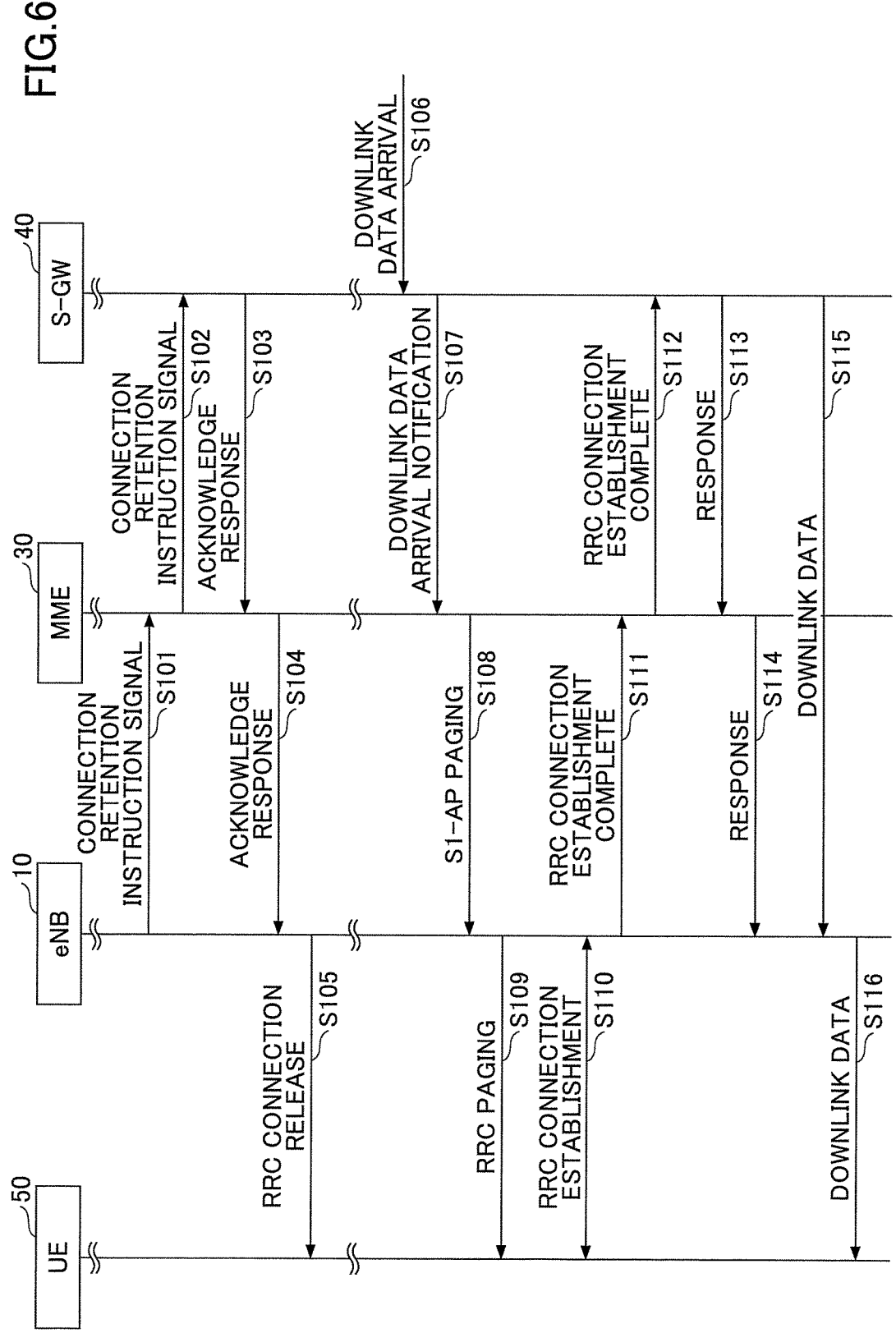
FIG. 6 is a diagram illustrating another example of the processing sequence of the entire system according to the present embodiment.

FIG. 6 is a diagram illustrating another example of the processing sequence of the entire system according to the present embodiment. FIG. 6 illustrates a processing sequence when the UE 50 is connected to the eNB 10 to enter the RRC connected state, enters the RRC idle state in the cell subordinate to the eNB 10, and then receives an incoming call in the same cell, similarly to the example of FIG. 5. However, the sequence illustrated in FIG. 6 is different from that of FIG. 5 in that there are sequences of step 113 and step 114. The difference with FIG. 5 is mainly described below.

Through the process of step 110, the UE 50 transitions from the RRC idle state to the RRC connected state. At this time, the UE contexts retained in the UE 50 and the eNB 10 change from a deactive state to an active state. In other words, through the process of step 110, the UE contexts retained in the UE 50 and the eNB 10 are activated.

In step 111, the eNB 10 transmits the RRC connection establishment complete which is a signal indicating that the establishment of the RRC connection has been completed to the MME 30. The signal of the RRC connection establishment complete may be a signal indicating that the UE context of the UE 50 has been activated. The MME 30 transmits the RRC connection establishment complete signal to the S-GW 40 (step 112).

Then, in the example illustrated in FIG. 6, in step 113, the S-GW 40 transmits a response signal with respect to the RRC connection establishment complete signal to the MME 30. Further, in step 114, the MME 30 transmits the response signal with respect to the RRC connection establishment complete signal of step 111 to the eNB 10. The response signal in step 114 may be a signal of Ack with respect to the signal indicating that the UE context has been activated.

Thereafter, similarly to the example of FIG. 5, the S-GW 40 starts transfer of the retained downlink data to the eNB 10 (step 115). The downlink data is transferred from the eNB 10 to the UE 50 (step 116). As described above, the transmission of the downlink data to the UE 50 is started.

(Example of RRC Connection Establishment Procedure)

Next, the RRC connection establishment procedure between the UE 50 and the eNB 10 according to the present embodiment is described with reference to a sequence of FIG. 7. In the sequence illustrated in FIG. 7, the process of step 110 in FIGS. 5 and 6 is assumed, but the present invention is not limited thereto. For example, the sequence illustrated in FIG. 7 may be the RRC connection establishment procedure at the time of call origination from the UE 50.

Figure 7:
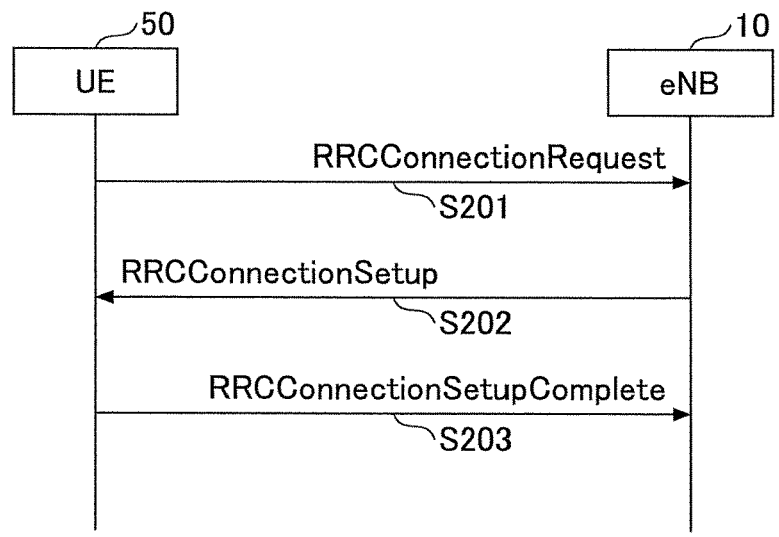
FIG. 7 is a diagram for describing a connection establishment procedure according to the present embodiment.

It is assumed that before the sequence illustrated in FIG. 7, a Random Access Preamble is transmitted from the UE 50 to the eNB 10, and a Random Access Response is transmitted from the eNB 10 to the UE 50.

In step 201, the UE 50 transmits the RRC Connection Request message (RRC connection request) to the eNB 10 through resources allocated by the UL grant included in the Random Access Response. In the present embodiment, in step 201, the UE 50 gives a notification indicating that the UE 50 retains the UE context using a spare bit (1 bit) in the RRC Connection Request message to the eNB 10. For example, when the bit is set (1), it indicates that the UE 50 retains the UE context. The information indicating that the UE 50 retains the UE context is referred to as "UE context retention information."

Further, in addition to the above bit, a UE identifier (specifically, the S-TMSI) identifying the UE 50 is included in the RRC Connection Request message. The S-TMSI is a temporary identifier of the UE 50 generated from an identifier specific to the UE 50 and output from the MME 30 at the time of location registration of the UE 50 or the like. In the present embodiment, it is assumed that the UE 50 and each eNB are assumed to retrain the S-TMSI identifying the UE 50.

The eNB 10 that has received the RRC Connection Request message in step 201 reads the UE context retention information and the UE identifier from the message, recognizes that the UE 50 identified by the UE identifier retains the UE context, and searches for the UE context corresponding to the UE identifier among a plurality of retained UE contexts from the storage unit. In other words, a UE identifier matching process is performed.

In step 202, When the UE context corresponding to the UE identifier is detected as a result of search, the eNB 10 gives a notification indicating that the eNB 10 retains the UE context of the UE 50 to the UE 50 through the RRC Connection Setup message (RRC connection establishment message) and requests the UE 50 to transmit information for authentication of the UE 50.

The UE 50 that has received the RRC Connection Setup message including the information indicating that the UE context of the UE 50 is retained continuously uses the retained UE context (the bearer, the security key, the configuration, and the like).

Further, the RadioResourceConfigDedicated included in the RRC Connection Setup message includes parameter values related to the bearer, the MAC configuration, the PHY configuration, and the like, but the UE 50 that has received the RRC Connection Setup message including the above notification and request in step 202 ignores parameter values notified of through the RadioResourceConfigDedicated and continuously uses the parameter values of the retained UE context. The parameter values which are notified of may be used without ignoring the parameter values notified of through the RadioResourceConfigDedicated. As a result, when the parameter values which are already retained are changed by the eNB 10, the change can be reflected.

Next, in step 203, the UE 50 includes authentication information such as an Authentication token, a shortMAC-I, and the like in the RRC Connection Setup Complete message, and transmits the resulting RRC Connection Setup Complete message to the eNB 10. The authentication information such as the Authentication token and the short MAC-I is information used for the eNB 10 to authenticate the UE 50.

The eNB 10 that has received the RRC Connection Setup Complete message authenticates that the UE 50 is a correct UE corresponding to the UE context searched using the UE identifier using the authentication information included in the message. Thereafter, the UE 50 and the eNB 10 establish (resume) a connection using the retained UE contexts. Further, when the connection is established (resumed) using the retained UE context, step 203 need not be necessarily performed, and step 203 may not be performed.

(Example of RRC Connection Release Procedure)

In the present embodiment, when the UE 50 receives the RRC Connection Release message from the eNB 10 and performs transition to the RRC idle state, the UE context may be constantly retrained, or the UE context may be retrained only when information for giving an instruction to retain the UE context is included in the RRC Connection Release message. An example of the latter is described below.

Figure 8:
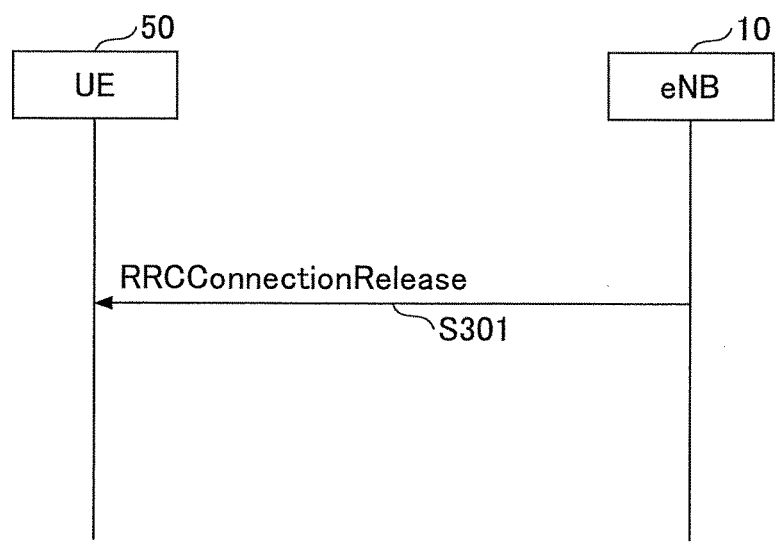
FIG. 8 is a diagram for describing a connection release procedure according to the present embodiment.

As illustrated in FIG. 8, when the eNB 10 causes the UE 50 to transition to the RRC idle state, the eNB 10 transmits the RRC Connection Release message to the UE 50 (step 301).

The RRC Connection Release message includes instruction information (indication) for instructing the UE 50 to continuously retain the UE context in the RRC idle state. For the instruction information, a new indication may be included in the message, or a spare bit of an existing release cause may be used. A specific example is described later.

When the instruction information is detected from the RRC Connection Release message, the UE 50 continuously retrains the UE context at the time of transition of the RRC idle state (the bearer information, the security information, and the like) in the RRC idle state.

(Another Example of Processing Sequence of Entire System)

In the examples illustrated in FIGS. 5 and 6, the UE 10 performs transition between the RRC connected state and the RRC idle state under the same eNB 10, but here, as another example, a process sequence when the UE 50 is connected to the eNB 10 to enter the RRC connected state and enters the RRC idle state in the cell subordinate to the eNB 10, and thereafter, the UE 50 moves to a cell subordinate to the eNB 20 and receives an incoming call is described with reference to FIG. 9.

Figure 9:
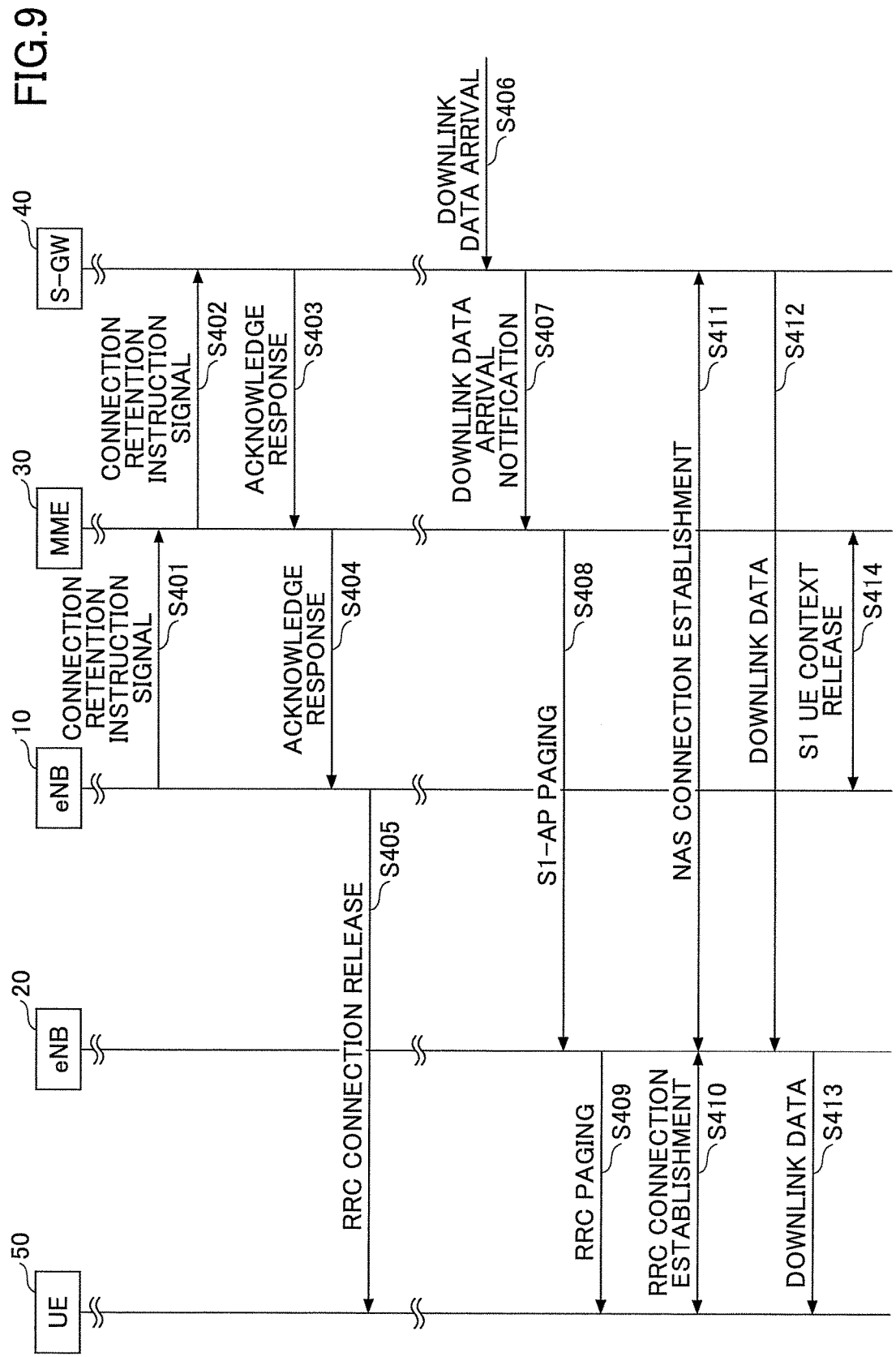
FIG. 9 is a diagram illustrating another example of the processing sequence of the entire system.

Further, the example of FIG. 9 is also under the assumption that the UE 50 is in the RRC connected state in the cell of the eNB 10, and the connection of the S1-C/U is established.

Similarly to the examples of FIGS. 5 and 6, the eNB 10 transmits the connection retention instruction signal to the MME 30 (step 401). Further, the MME 30 transmits the connection retention instruction signal to the S-GW 40 (step 402).

As described above, the connection retention instruction signal is a signal for giving an instruction to retain downlink data in the S-GW 40 when there is an incoming call to the UE 50 while maintaining the S1-C/U connection related to the UE 50 and perform paging from the MME 30.

The S-GW 40 that has received the connection retention instruction signal transmits an acknowledge response to the MME 30 (step 403), and the MME 30 transmits an acknowledge response to the eNB 10 (step 404).

After steps 401 to 404, the eNB 10 transmits the RRC connection release to the UE 50, and causes the UE 50 to transition to the RRC idle state (step 405). After this, the UE 50 moves to the cell subordinate to the eNB 20. The RRC Connection Release message includes an instruction to retention the UE context, and the UE 50 retains the UE context. However, the UE context is information used for the connection with the eNB 10.

Thereafter, the downlink data destined for the UE 50 occurs, and the downlink data arrives at the S-GW 40 (step 406). Here, the S1-U connection has been established, but the S-GW 40 retains the downlink data in a buffer without transferring the downlink data to the eNB 10 on the basis of the connection retention instruction signal received in step 402.

The S-GW 40 transmits a downlink data arrival notification to the MME 30 (step 407), and the MME 30 transmits an S1-AP paging signal destined for the UE 50 to the eNB 10 (step 408). The paging is similar to an existing paging and transmitted to each eNB (each of one or more eNBs) in a tracking area of the UE 50, but transmission to the eNB 20 is illustrated in FIG. 9.

The eNB 10 that has received the S1-AP paging signal transmits an RRC paging signal to the UE 50 subordinate thereto (step 409).

The UE 50 that has received the RRC paging signal performs an RRC connection establishment procedure and establishes the RRC connection (step 410). Further, the NAS connection procedure is performed between the eNB 20 and the core NW side (the S-GW 40 in FIG. 9), and the S1-C/U connection for the eNB 20 is established (step 411).

Since the connection between the UE 50 and the S-GW 40 is accordingly established, the S-GW 40 starts transmission of the downlink data to the UE (steps 412 and 413). Further, the UE context between the eNB 10 and the MME 30 is released, and the S1-C/U connection for the eNB 10 is released (step 414).

In the above example, in the RRC connection establishment procedure of step 410, the UE 50 transmits the message of step 201 of FIG. 7, but since the eNB 20 determines that the UE context corresponding to the UE 50 is not retained, a normal RRC connection procedure is performed. Alternatively, when the eNB 20 determines that the UE context corresponding to the UE 50 is not retained, the eNB 20 may acquire the UE context of the UE 50 from the eNB 10 on the basis of a PCI (a cell ID identifying the eNB 10 of the cell for which the UE 50 retains the UE context) or the like reported from the UE 50 through the message in the RRC connection establishment procedure and perform the RRC connection using the UE context.

(Specification Modifications)

Next, description examples (excerpts) of the 3GPP specification (3GPP TS 36.331 and Non-Patent Document 3) when various kinds of notifications described with reference to FIGS. 7 and 8 are given are illustrated in FIGS. 10 to 14. In FIG. 10 to FIG. 14, parts changed from Non-Patent Document 3 are underlined. Points in which the parts changed from Non-Patent Document 3 are underlined are similarly in the drawings of other specification modifications.

FIG. 10A illustrates an example of the RRC Connection Request message transmitted from the UE 50 in step 201 of FIG. 7. As illustrated in FIG. 10A, ue-ContextStoring (for example, one bit) is added. As illustrated in FIG. 10B, ue-ContextStoring is information indicating that the UE 50 retains the UE context used in a previous RRC connection. Further, as illustrated in FIG. 10A, the S-TMSI is included.

FIG. 11A illustrates an example of the RRC Connection Setup message transmitted from the eNB 10 in step 202 of FIG. 7. As illustrated in FIG. 11A, ue-ContextStored and ue-AuthenticationlnfoReq are added.

As illustrated in FIG. 11B, ue-AuthenticationlnfoReq is information for requesting the UE to transmit the authentication information. ue-ContextStored is information indicating that the eNB retains the UE context of the UE which is the target of the RRC Connection Setup. When the presence of this information (field) is detected, the UE ignores a radioRecourceConfigDedicated field notified of through the RRC Connection Setup message. As described above, the parameter values which are notified of through this may be applied without ignoring the radioRecourceConfigDedicated field.

FIG. 12 illustrates an example of the RRC Connection Setup Complete message transmitted from the UE 50 in step 203 of FIG. 7. As illustrated in FIG. 12, ue-AuthenticationToken and ue-AuthenticationlnfoReq which are the authentication information are added.

FIGS. 13 to 14 illustrate examples 1 and 2 of the RRC Connection Release message transmitted from the eNB 10 in step 301 of FIG. 8.

FIGS. 13A and 13B illustrate an example (example 1) of giving a UE context retention instruction using a Cause value. In this case, as illustrated in FIG. 13A, UEcontextHolding is added in ReleaseCause. As illustrated in FIG. 13B, a value of ue-Context Holding indicates an instruction to cause the UE to continuously retain the UE context in the RRC idle state.

FIGS. 14A and 14B illustrate an example (example 2) of giving a UE context retention instruction using a new indication. As illustrated in FIG. 14A, ue-Context Holding is added as the new indication. As illustrated in FIG. 14B, ue-Context Holding indicates an instruction to cause the UE to continuously retain the UE context in the RRC idle state.

(First Modification: Another Example of RRC Connection Establishment Procedure and RRC Connection Release Procedure)

The RRC connection establishment procedure between the UE 50 and the eNB 10 according to the present embodiment has been described with reference to the sequence of FIG. 7 together with the content of the signal, but another example of the RRC connection establishment procedure is described as a first modification. The RRC connection release procedure is described in connection with another example of the content of the signal. Before the first modification, the example described with reference to the sequence of FIG. 7 is referred to as a "basic example" for the sake of convenience.

<RRC Connection Establishment Procedure of First Modification>

Since a sequence of the RRC connection establishment procedure of the first modification is the same as the sequence illustrated in FIG. 7, the RRC connection establishment procedure of the first modification is described with reference to FIG. 7. Even in the first modification, in the sequence illustrated in FIG. 7, the process of step 110 in FIGS. 5 and 6 is assumed, but the preset invention is not limited thereto. For example, the sequence illustrated in FIG. 7 may be in the RRC connection establishment procedure at the time of call origination from the UE 50.

It is assumed that before the sequence illustrated in FIG. 7, a Random Access Preamble is transmitted from the UE 50 to the eNB 10, and a Random Access Response is transmitted from the eNB 10 to the UE 50.

In step 201, the UE 50 transmits the RRC Connection Request message (RRC connection request) to the eNB 10 through resources allocated by the UL grant included in the Random Access Response. In the first modification, in step 201, when the UE 50 retains the UE context, the UE 50 includes the authentication information in the RRC Connection Request message and transmits the resulting RRC Connection Request message. The authentication information is information used for the eNB 10 to authenticate the UE 50 and includes, for example, the C-RNTI, the PCI, and the ShortMAC-I used in the previous RRC connection.

This authentication information is an example of the UE context retention information for giving a notification indicating that the UE 50 retains the UE context to the eNB 10.

The eNB 10 that has received the RRC Connection Request message in step 201 performs authentication of the UE 50 using the authentication information, and when it is detected that the authentication succeeds, and the UE context of the UE 50 is retained, the eNB 10 transmits the RRC Connection Setup message (RRC connection establishment message) including information for giving an instruction to activate the UE context retained in the UE 50 to the UE 50 (step 202). For example, the above detection can be performed by searching for the UE context corresponding to the UE-specific identifier (for example, the S-TMSI, the C-RNTI, and the shortMAC-I) from a plurality of UE contexts retained in the eNB 10 from the storage unit. The information for giving the instruction to activate the UE context is an example of the context retention information indicating that the eNB 10 retains the UE context of the UE 50.

When the authentication fails, the eNB 10 transmits the RRC Connection Reject message of rejecting the RRC connection to the UE 50. When it is unable to detect that the eNB 10 retains the UE context of the UE 50 although the authentication succeeds, the eNB 10 transmits the RRC Connection Setup message (RRC connection establishment message) including no information for giving the instruction to activate the UE context retained in the UE 50 to the UE 50.

The UE 50 that has received the RRC Connection Setup message including the information for giving the instruction to activate the UE context activates the retained UE context (the bearer, the security key, the configuration, and the like). The activating is activating the retained UE context and includes, for example, a setting of various kinds of radio resources, a measurement setting, an authentication key update process, and the like. The activation process is not limited to a specific process.

Further, the RadioResourceConfigDedicated included in the RRC connection Setup message may include parameter values related to the bearer, the MAC configuration, the PHY configuration, and the like, but the UE 50 that has received the RRC Connection Setup message including the activation instruction in step 202 applies parameter values which are notified of through the RadioResourceConfigDedicated. The application is performed, for example, in accordance with "5.3.10 Radio resource configuration" in Non-Patent Document 3. In other words, a setting is performed on the basis of information included in the RadioResourceConfigDedicated.

As an example, when the UE 50 retains information "A" in the RadioResourceConfigDedicated at the time of previous RRC connection as part of the UE context and receives information "B" through the RadioResourceConfigDedicated in step 202, the UE 50 can use the information "B" in addition to the information "A."

Further, when the UE 50 retains information "A" in the RadioResourceConfigDedicated at the time of previous RRC connection as part of the UE context and receives "A'" which is the same in a type as "A" but differs in a value, "A" which is retained is updated with (changed to) "A'" received in step 202.

In other words, through the above process, it is possible to set a parameter difference between information of the stored RadioResourceConfigDedicated and information of the RadioResourceConfigDedicated received in Step 202. It is referred to as "delta configuration."

Then, in step 203, the UE 50 transmits the RRC Connection Setup Complete message to the eNB 10.

<Specification Modification of First Modification>

Next, description examples (excerpt) of the 3GPP specification (3GPP TS 36.331, Non-Patent Document 3) in the first modification are illustrated in FIGS. 15 to 25. In FIG. 15 to FIG. 25, parts changed from Non-Patent Document 3 are underlined.

FIG. 15 illustrates a modified example of the specification in which the operation of the UE 50 when transmitting the RRC Connection Request message from the UE 50 in step 201 of FIG. 7 is specified.

In FIG. 15, "1>if the UE supports the RRC connection-Request-r13-IEs and criticalExtRRC-ConnEstRegAllowed is included in SystemInformationBlockType2:" and "2> set the RRC connectionRequest-r13-IEs in the RRCconnection-Request message;" indicate that the UE 50 transmits the message when both the UE 50 and the eNB 10 support "RRC connectionRequest-r13-IEs" (the message of carrying the authentication information in the first modification). criticalExtRRC-ConnEstRegAllowed indicating that the eNB 10 supports "RRC connectionRequest-r13-IEs" is broadcasted from the eNB 10 to the UE 50 through an SIB 2.

"1>if the UE stores the valid AS configuration into VarAS-Config:" and "2>set the ue-Identity to UE-AS-ConfigIdentity;" indicate that the authentication information (UE-AS-ConfigIdentity) is included in ue-Identity (ue-Identity-r13 to be described later) when the UE 50 retains a legitimate UE context (AS configuration). As a result, the authentication information is transmitted to the eNB 10 through the RRC Connection Request message. VarAS-Config is a variable that stores the UE context (AS configuration).

FIG. 16A illustrates an example of the RRC Connection Request message transmitted from the UE 50 in step 201 of FIG. 7. As illustrated in FIG. 16A, "UE-AS-ConfigIdenity" which is the authentication information is added. As illustrated in FIG. 16B, "UE-AS-ConfigIdenity" includes information for identifying and authenticating the AS configuration (the UE context) retained in the UE 50 and the E-UTRAN (that is, the eNB 10). This information includes, for example, the C-RNTI, the PCI, and the ShortMAC-I at the time of previous RRC connection.

FIG. 17 illustrates a modification example of the specification in which the operation when the UE 50 receives the RRC Connection Setup message transmitted from the eNB 10 in step 202 of FIG. 7 is specified.

In FIG. 17, as stated in "1>if the valid AS configuration is stored into VarAS-Config:" and "2>if the ue-AS-ConfigActivate is set to true and nextHopChainingCount is included in the RRC connectionSetup message:" when the RRC Connection Setup message is received, the UE 50 operating according to the specification first checks whether or not the UE context (valid AS configuration) is retained, and determines whether or not an instruction to activate the UE context is given (ue-AS-ConfigActivate is set to true), and nextHopChainingCount is included in the RRC Connection Setup message when the UE context is retained. NextHopChainingCount is a value used for updating an authentication key.

When it is determined that "an instruction to activate the UE context is given (ue-AS-ConfigActivate is set to true), and nextHopChainingCount is included," the authentication in the eNB 10 is determined to succeed, and the retained UE context is activated.

Specifically, first, as stated in "3>perform the radio resource configuration procedure in accordance with the radioResourceConfigDedicated stored into VarAS-Config and as specified in 5.3.10;" radio resource configuration is performed in accordance with the radioResourceConfigDedicated (radio resource configuration information) retained in VarAS-Config.

Then, as stated in "3>perform the measurement configuration procedure in accordance with the measConfig stored into VarAS-Config as specified in 5.5.2," measurement configuration is performed in accordance with retained measConfig (measurement configuration information. Further, the security key is updated through the process from "3>update the KeNB key on the basis of the KASME key to which the current KeNB is associated, using the nextHopChainingCount value included in the RRC connectionSetup message, as specified in TS 33.401 [32];" to "3>configure lower layers to apply ciphering using the previouSly configured algorithm, the KRRCenc key and the KUPenc key immediately, i.e., ciphering shall be applied to all subsequent messages received and sent by the UE, including the message used to indicate the successful complete of the procedure."

On the other hand, even when the UE 50 retains the UE context, if a determination result of whether or not "an instruction to activate the UE context is given (ue-AS-ConfigActivate is set to true), and nextHopChainingCount is included" is NO (for example, when ue-AS-ConfigActivate is not received), it can be determined that the eNB 10 does not retain the UE context. Then, as stated in "2>else: 3>Release all the AS configuration stored into VarAS-Config;" the UE 50 releases the retained UE context. For example, the "release" indicates deletion of the retained UE context.

When the determination result of whether or not "an instruction to activate the UE context is given (ue-AS-ConfigActivate is set to true) is Yes or NO, RadioResourceConfigDedicated received through the RRC connection-Setup message is applied as stated in "1>perform the radio resource configuration procedure in accordance with the received radioResourceConfigDedicated and as specified in 5.3.10;" Thus, it is possible to perform the above delta configuration.

FIG. 18A illustrates an example of the RRC Connection Setup message transmitted from the eNB 10 in step 202 of FIG. 7. As illustrated in FIG. 18A, ue-AS-ConfigActivate and nextHopChainingCount are added. As illustrated in FIG. 18B, ue-AS-ConfigActivate indicates that the UE 50 resumes the use of the retained UE context.

As described above, when the authentication is NG, the eNB 10 transmits the RRC Connection Reject message to the UE 50. Further, regardless of whether or not the authentication is NG, the eNB 10 may reject the RRC Connection, for example, due to congestion and then transmit the RRC connection Reject message to the UE 50.

In the first modification, the UE 50 that has received the RRC connection Reject message performs, for example, the following option 1 or option 2 operation.

Option 1: the UE 50 performs the release when an instruction to release the AS configuration (UE context) is given through the RRC connection Reject. Otherwise (when there is no release instruction), the AS configuration is retained.

Option 2: the UE 50 performs the retention when an instruction to retrain (store) the AS configuration is given through the RRC connection Reject. Otherwise (when there is no retention instruction), the AS configuration is released.

FIG. 19 illustrates a specification modification of a UE operation when the RRC connection Reject corresponding to the option 1 is received, and FIG. 20 illustrates a specification modification of a UE operation when the RRC connection Reject corresponding to the option 2 is received.

In FIG. 19, as stated in "1>if ue-AS-ConfigRelease is included and the UE stores the AS configuration into VarAS-Config specified in 7.1:2>Release the AS configuration stored into VarAS-Config;" the UE 50 releases the UE context when the release instruction (ue-AS-ConfigRelease) is received. As stated in "1>else if ue-AS-ConfigRelease is not included and the UE stores the AS configuration into VarAS-Config:2>keep storing the AS configuration into VarAS-Config;" the UE 50 continuously retains the UE context when there is no release instruction.

Further, when there is no release instruction, as stated in "2>if ue-AS-ConfigValidityTime is included:3>overwrite the AS configuration Validity time with the received value in ue-AS-ConfigValidityTime;" a validity time of the UE context is overwritten with a value of ue-AS-ConfigValidity-Time. Thus, the retention time of the UE context (to be described later) can be changed.

In FIG. 20, as stated as "1>if ue-AS-ConfigStoring is included and the UE stores the AS configuration into VarAS-Config specified in 7.1:2>keep the AS configuration stored into VarAS-Config;" in the option 2, the UE 50 continuously retains the UE context when the retention instruction (ue-AS-ConfigStoring) is received. Further, when there is the retention instruction, as stated in "2>if ue-AS-ConfigValidityTime is included:3>overwrite the AS configuration Validity time with the received value in ue-AS-ConfigValidity-Time;" the validity time of the UE context is overwritten with a value of ue-AS-ConfigValidityTime.

Further, as stated in "1>else if ue-AS-ConfigStoring is not included and the UE stores the AS configuration into VarAS-Config:2>Release the AS configuration into VarAS-Config;" the UE 50 releases the UE context when there is no retention instruction.

FIGS. 21A and 21B illustrate a specification modification of the RRC connection Reject message corresponding to the option 1, and FIGS. 22A and 22B illustrate a specification modification of the RRC connection Reject message corresponding to the option 2. As illustrated in FIGS. 21A, 21B, 22A, and 22B, ue-AS-ConfigValidityTime indicates an updated maximum retention time of the UE context in the RRC idle state.

<RRC Connection Release Procedure According to First Modification>

The RRC connection release procedure according to the first modification is the same as the procedure described with reference to FIG. 8. For content of the message, the content illustrated in FIGS. 13 and 14 may be used, or another example may be used, as described below.

FIG. 23A illustrates an example 3 of the RRC Connection Release message transmitted from the eNB 10 in step 301 of FIG. 8. As illustrated in FIG. 23A, ue-AS-ConfigDeactive is included. ue-AS-ConfigDeactive corresponds to the UE context retention instruction. Further, ue-AS-ConfigValidityTime indicating a period (time) in which the UE context is retained is added. As illustrated in FIG. 23B, ue-AS-ConfigDeactive indicates that UE 50 retains the UE context in the RRC idle state. Ue-AS-ConfigValidityTime indicates a maximum time (a retention time limit) in which the UE 50 retains the UE context in the RRC idle state.

FIG. 24 illustrates a modification example of the specification in which the operation of the UE 50 when the RRC Connection Release message illustrated in FIGS. 23A and 23B is used is specified. As indicated by underlined parts of FIG. 24, when that ue-AS-ConfigDeactive is checked to be included in the RRC Connection Release message (ue-AS-ConfigDeactive is set to true), the UE 50 operating according to the specification stores the current radioResourceConfigDedicated (radio resource configuration information), securityAlgorithmConfig (security algorithm configuration information), and measConfig (measurement configuration information) in VarAS-Config as the UE context. Further, the UE 50 stores physCellId of PCell in VarAS-Config, and stores current ue-Identity in VarAS-Config.

<UE Context Retention Period>

The UE 50 (and the eNB 10) that has received the RRC Connection Release message including the UE context retention instruction and transitioned to the RRC idle state basically continues to retrain the UE context in the RRC idle state. However, for example, when a period in the RRC idle state is very long, if the UE 50 and the eNB 10 continuously retain the UE context, a load on that UE 50 and the eNB 10 increases.

In this regard, in the first modification, a finite time (a UE context retention time limit) in which the UE 50 retains the UE context is set. As described above, ue-AS-ConfigValidityTime indicates the time.

For example, if the time is indicated by T, the UE 50 receives the RRC Connection Release message including the UE context retention instruction and transitions to the RRC idle state, and the UE 50 determines the UE context to have been deactivated at a point in time when T elapses from a time at which the UE context starts to be retained (=a time at which the RRC Connection Release message including the UE context retention instruction is received) even when the RRC idle state is continued while retaining the UE context and releases (deletes) the UE context. The same time T is also set in the eNB 10, and the eNB 10 determines the UE context to have been deactivated at a point in time when T elapses from a time at which the UE context starts to be retained (=a time at which the RRC Connection Release message including the UE context retention instruction is received) and releases (deletes) the UE context, similarly to the UE 50.

FIG. 25 illustrates a modified example of the specification (Non-Patent Document 3) when the UE context retention time limit is set as described above. FIG. 25 illustrates that VarAS-Config which is a variable for retention of the UE context is added to "7.1 UE variables" in the specification. As illustrated in FIG. 25, VarAS-Config includes the UE context (AS configuration) stored in the UE 50 in the RRC idle state. Further, the UE 50 determines that the UE context has be deactivated when a predetermined period (T) elapses after transitions from the RRC connected state is performed.

Further, as illustrated in FIG. 25, VarAS-Config includes RadioResourceConfigDedicated, SecurityAlgorithmConfig, MeasConfig, NextHopChainingCount, PhysCellId, S-TMSI, and C-RNTI as the UE context (AS configuration). However, these are examples, and some of them may not be retained. Further, other information may be retained.

A predetermined period (T) for retention of the UE context may be set fixedly in accordance with the specification or may be set in the UE 50 by the eNB 10 using ue-AS-ConfigValidityTime, similarly to the example of FIG. 25.

The setting of the UE context retention time limit as described above can be also applied to the basic example.

(Second Modification: Context Fetch)

As described above in the example of FIG. 9, even when the UE 50 moves to the cell of the eNB 20 having no UE context, the eNB 20 can specify the eNB 10 on the basis of information reported from the UE 50, acquire the UE context of the UE 50 from the eNB 10, and performs the RRC connection using the UE context. As described above, the acquisition of the UE context from another eNB by a certain eNB is referred to as "Context Fetch."

A process in which the eNB 20 acquires the UE context when the UE 50 transitions from the RRC connected state to the RRC idle state under the control of the eNB 10, and then the UE 50 moves the cell subordinate to the eNB 20 different from the eNB 10 (for example, the example illustrated in FIG. 9) is described below. Each of the eNB 10 and the eNB 20 has a context retention function and a function for performing the context acquisition procedure as described below.

Figure 26:
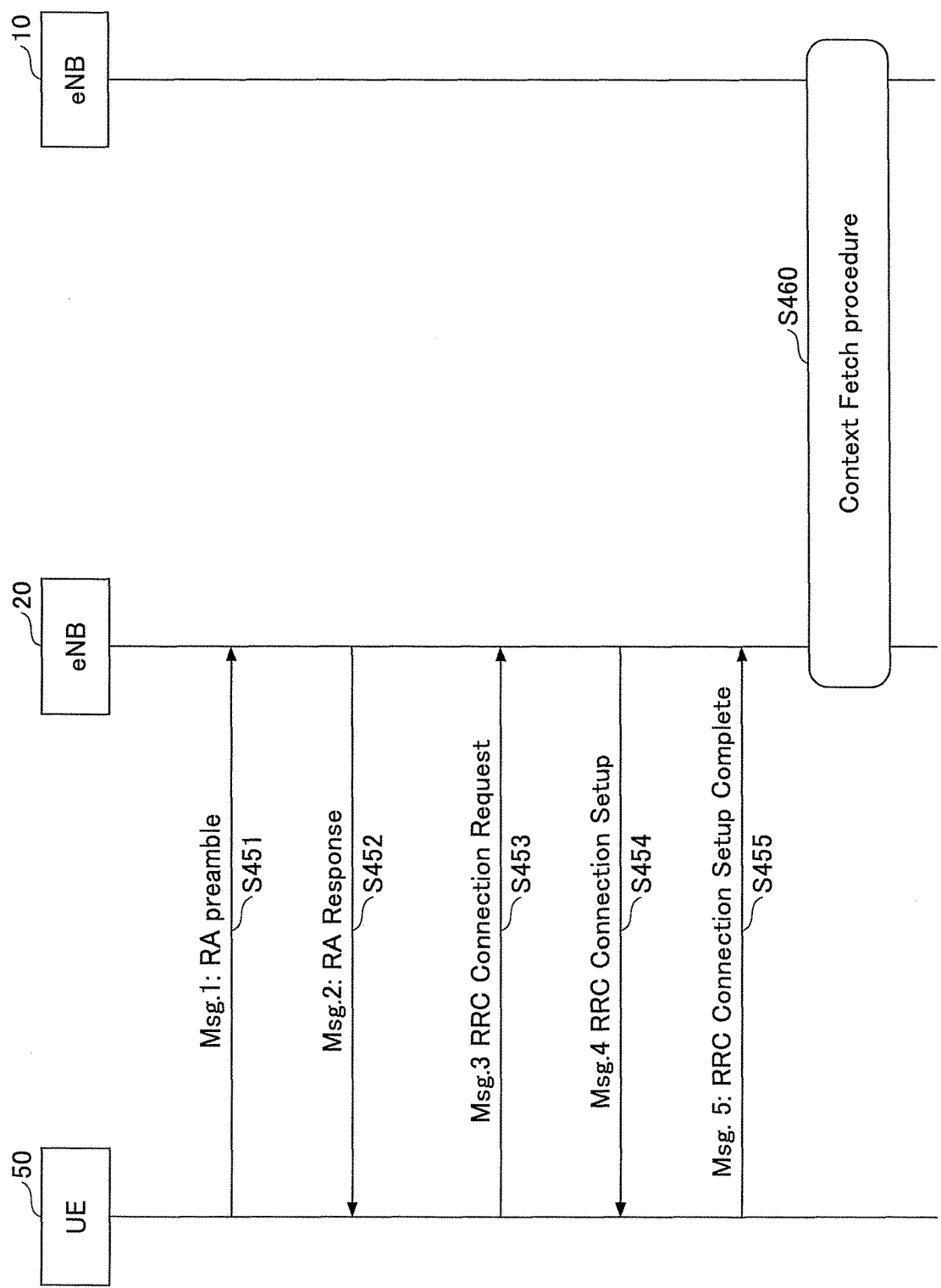
FIG. 26 is a diagram illustrating an example of a method of notifying of eNB specifying information.

First, the process between the UE 50 and the eNB 20 is described with reference to FIG. 26. The process illustrated in FIG. 26 is under the assumption that the UE 50 is in the RRC idle state, and retains the UE context at the time of connection with the eNB 10. Further, a situation in which the UE 50 moves to the cell subordinate to the eNB 20 in the RRC idle state, and a transition procedure to the RRC connected state is activated when a call is originated or when an incoming call is received.

In step 451, the Random Access Preamble is transmitted from the UE 50 to the eNB 20, and in Step 452, the Random Access Response is transmitted from the eNB 20 to the UE 50.

In step 453, the UE 50 transmits the RRC Connection Request message to the eNB 20. Information identifying the eNB (here, the eNB 10) that retains the eNB side UE context corresponding to the UE context retained in the UE 50 and information specifying that the UE context is associated with the UE 50 (information specifying the UE context of the UE 50) are included in the message transmitted in step 453. Further, the RRC Connection Request message includes the authentication information for authenticating the UE context of the UE 50. The authentication information includes, for example, the C-RNTI, the PCI, and the Short-MAC-I at the time of previous RRC connection.

In this example, an ID having information specifying the eNB and information specifying the UE context (here, referred to as a "resume ID") is included in the RRC Connection Request message.

A bit length of the resume ID transmitted through the RRC Connection Request message is, for example, 24 bits. Further, for example, the eNB and the UE context are indicated by several upper bits and several lower bits of the resume ID. As an example, upper 8 bits in the resume ID transmitted through the RRC Connection Request message may be used to indicate information identifying the eNB, and lower 16 bits may be used to indicate information specifying the UE context. The numerical values are merely examples.

However, since a plurality of eNBs are generally considered to retrain a plurality of UE contexts, there may be a case in which it is unable to specify an eNB that retains the UE context of a specific UE in the 24-bit resume ID. In other words, for example, when the eNB 20 has information (an address or the like) of a plurality of eNBs (eNBs of destination candidates to which Context Fetch is performed) corresponding to the eNB specifying information in the resume ID of the RRC Connection Request message, it is unable to determine an eNB to which Context Fetch is performed.

In this regard, in this example, in this case, a resume ID (referred to as a "long resume ID") having a longer bit length than the resume ID (referred to as a "short resume ID") is requested from the eNB to the UE. The following steps are an example of making such a request. The short resume ID is an example of the context retention information indicating that the UE retains the UE context.

In step 454, the eNB 20 transmits the RRC Connection Setup message including information for requesting the UE 50 to transmit the long resume ID to the UE 50. Further, information for activating the UE context is included in the RRC Connection Setup message. In step 455, the UE 50 transmits the RRC Connection Setup Complete message including the long resume ID to the eNB 20.

A bit length of the long resume ID is, for example, 40 bits. Then, for example, upper 24 bits in the long resume ID may be used to indicate information identifying the eNB, and lower 16 bits may be used to indicate information specifying the UE context. The numerical values are merely examples.

Further, a combination of the short resume ID and the long resume ID may be used. For example, the UE context may be specified by first 16 bits of the short resume ID, and the eNB may be specified by the remaining 8 bits of the short resume ID+40 bits of the long resume ID (=48 bits). Further, the resume ID may have a predetermined bit length (for example, 40 bits), first predetermined bits (for example, 24 bits) may be included in the RRC Connection Request message, and the remaining predetermined bits (for example, 16 bits) may be included in the RRC Connection Setup Complete message.

Further, for example, 40 bits may be set as the short resume ID included in the RRC Connection Request message, and in addition to the eNB specifying information and the UE context specifying information, the information for authenticating the UE corresponding to the UE context (information corresponding to shortMAC-I) may be included in the short resume ID. Similarly, for example, in addition to the eNB specifying information and the UE context specifying information, the information for authenticating the UE corresponding to the UE context (information corresponding to shortMAC-I) may be included in a 56-bit long resume ID. Further, when it is possible to specify the eNB and the UE context through the short Resume ID, the transmission of the RRC Connection Setup in step 454 and the transmission of RRC Connection Setup Complete in step 455 are performed, but when the request for the long resource ID and the transmission of the long resource ID Transmission are not included. Further, when the short Resume ID indicates its own device (the eNB 20), that is, when the eNB 20 retains the UE context, Context Fetch to other eNBs is not performed. However, even when the eNB and the UE context can be specified through the short Resume ID, the request for the long Resume ID and the transmission of the long resume ID may be included.

In step 460, the eNB 20 specifies the eNB 10 as an eNB that retains the UE context on the basis of the resume ID received from the UE 50 (only the short resume ID, only the long resume ID, or a combination of the long resume ID and the short resume ID), and performs the context acquisition procedure with the eNB 10.

Next, the context acquisition procedure example is described with reference to FIG. 27. In step 455, the UE 50 transmits the RRC Connection Setup Complete message to the eNB 20.

In step 461, the eNB 20 transmits a context request message to the eNB 10 identified by the resume ID. The context request message includes the resume ID and the authentication information. Further, as described below, when the authentication information is included in the resume ID, the authentication information different from the resume ID may not be included.

In step 461, the eNB 10 that has received the context request message specifies and acquires the UE context of the UE 50 among a plurality of UE contexts retained in the storage unit in the eNB 10 on the basis of the information specifying the UE context of the UE 50
(for example, lower 16 bits of the short resume ID, lower 16 bits of the long resume ID, or the like), and performs authentication on the basis of the authentication information. Here, the authentication is assumed to succeed.

In step 462, the eNB 10 transmits a context response message including the acquired UE context to the eNB 20.

In step 471, the eNB 20 that has acquired the UE context of the UE 50 transmits, for example, the RRC Connection Reconfiguration message to the UE 50. Further, in step 472, the UE 50 transmits the RRC Connection Reconfiguration Complete message to the eNB 20. As a result, the UE 50 and the eNB 20 establish the connection between the UE 50 and the eNB 20 reusing the UE context and cause the state to transition to the RRC connected state.

Further, since the UE 50 and the eNB 20 can establish the RRC connection between the UE 50 and the eNB 20 reusing the retained or acquired UE context, step 471 and step 47 may not be performed. Alternatively, the UE 50 may ignore part or all of the configuration information received through the RRC Connection Reconfiguration message. Further, the configuration information received through the RRC Connection Reconfiguration message may be applied without ignoring it.

Further, when the eNB 20 performs the context acquisition procedure but fails to acquire a desired UE context (step 473), the eNB 20 transmits, for example, the RRC Connection Release message and causes the UE 50 to enter the RRC idle state (step 474).

<Specification Modification of Second Modification>

Next, description examples (excerpt) of the 3GPP specification (3GPP TS 36.331 and Non-Patent Document 3) according to a second modification are illustrated in FIGS. 28 to 30. In FIG. 28 to FIG. 30, parts changed from Non-Patent Document 3 are underlined.

FIG. 28A illustrates an example of the RRC Connection Request message transmitted from the UE 50 in step 453 of FIG. 26.

As illustrated in FIG. 28A, shortResumeIdentity corresponding to the short resume ID is added in addition to UE-AS-ConfigIdenity which is the authentication information. As illustrated in FIG. 28B, shortResumeIdentity in this example is a 24-bit length identifier identifying the UE context (AS configuration) and the eNB in which the UE context is stored.

FIG. 29A illustrates an example of the RRC Connection Setup message transmitted from the eNB 20 in step 454 of FIG. 26. As illustrated in FIG. 29A, requestLongResumeIdentity is illustrated in addition to ue-AS-ConfigActivate and nextHopChainingCount. requestLongResumeIdentity corresponds to the request for the long resume ID request. As illustrated in FIG. 29B, requestLongResumeIdentity indicates that the UE is requested to provide longResumeIdentity (the long resume ID).

FIG. 30A illustrates an example of the RRC Connection Setup Complete message transmitted from the UE 50 in step 455 of FIG. 26.

As illustrated in FIG. 30A, longResumeIdentity corresponding to the long resume ID is added. As illustrated in FIG. 30B, longResumeIdentity in this example is a 40-bit length identifier identifying the UE context (AS configuration) and the eNB in which the UE context is stored.

The RRC Connection Request message and the RRC Connection Setup Complete message may have content illustrated in FIGS. 31A and 31B and content illustrated in FIGS. 32A and 32B, respectively. In this case, the RRC Connection Setup message is the same as that illustrated in FIGS. 29A and 29B.

FIG. 31A illustrates an example of the RRC Connection Request message transmitted from the UE 50 in step 453 of FIG. 26.

As illustrated in FIG. 31A, shortResumeIdentity corresponding to the short resume ID is added in addition to UE-AS-ConfigIdenity which is the authentication information. As illustrated in FIG. 31B, shortResumeIdentity in this example is a 40-bit identifier for identifying the UE context (AS configuration) and the eNB in which the UE context is stored and further authenticating the UE corresponding to the UE context. Further, in the present embodiment, the "authenticating of the UE corresponding to the UE context" indicates authenticating that the UE is associated with the retained UE context." Further, in this example, short MAC-I may not be included in UE-AS-ConfigIdency.

FIG. 32A illustrates an example of the RRC Connection Setup Complete message transmitted from the UE 50 in step 455 of FIG. 26.

As illustrated in FIG. 32A, longResumeIdentity corresponding to the long resume ID is added. As illustrated in FIG. 32B, longResumeIdentity in this example is a 56-bit identifier for identifying the UE context (AS configuration) and the eNB in which the UE context is stored and authenticating the UE corresponding to the UE context.

Further, the RRC Connection Request message and the RRC Connection Setup Complete message may have content illustrated in FIGS. 33A and 33B and content illustrated FIGS. 34A and 34B, respectively. Further in this case, the RRC Connection Setup message is the same as that illustrated in FIGS. 29A and 29B. In the examples illustrated in FIGS. 33A and 33B and FIGS. 34A and 34B, the resume ID has 40 bits in total, first 24 bits are included in the RRC Connection Request message, and the remaining 16 bits are included in the RRC Connection Setup Complete message. In this case, for the sake of convenience, first 24 bits included in the RRC Connection Request message are referred to as the "short resume ID," and an identifier obtained by adding the remaining 16 bits and the first 24 bits included in the RRC Connection Setup Complete message is referred to as the "long Resume ID."

FIG. 33A illustrates an example of the RRC Connection Request message transmitted from the UE 50 in step 453 of FIG. 26.

As illustrated in FIG. 33A, resumeIdentity-LSB corresponding to the short resume ID is added in addition to UE-AS-ConfigIdenity which is the authentication information. As illustrated in FIG. 33B, resumeIdentity-LSB is the least significant 24 bits in the resume identity for identifying the UE context (AS configuration) and the eNB in which the UE context is stored.

FIG. 34A illustrates an example of the RRC Connection Setup Complete message transmitted from the UE 50 in step 455 of FIG. 26.

As illustrated in FIG. 34A, resumeIdentity-MSB is added. As illustrated in FIG. 34B, resumeIdentity-MSB is the most significant 16 bits in the resume identity for identifying the UE context (AS configuration) and the eNB in which the UE context is stored.

Further, the RRC Connection Request message and the RRC Connection Setup Complete message may have content illustrated in FIGS. 35A and 35B and content illustrated FIGS. 36A and 36B, respectively. In this case, the RRC Connection Setup Complete message is the same as that illustrated in FIGS. 29A and 29B. In the examples illustrated in FIGS. 35A and 35B and FIGS. 36A and 36B, information for authenticating the UE corresponding to the UE context is added in the resume ID illustrated in FIGS. 33A and 33B and FIGS. 34A and 34B.

FIG. 35A illustrates an example of the RRC Connection Request message transmitted from the UE 50 in step 453 of FIG. 26.

As illustrated in FIG. 35A, resumeIdentity-LSB is added in addition to UE-AS-ConfigIdenity which is the authentication information. As illustrated in FIG. 35B, resumeIdentity-LSB of this example is the Least significant 40 bits in the resume identity for identifying the UE context (AS configuration) and the eNB in which the UE context is stored and further authenticating the UE corresponding to the UE context.

FIG. 36A illustrates an example of the RRC Connection Setup Complete message transmitted from the UE 50 in step 455 of FIG. 26.

As illustrated in FIG. 36A, resumeIdentity-MSB is added. As illustrated in FIG. 36B, resumeIdentity-MSB of this example is the most significant 16 bits in the resume identity for identifying the UE context (AS configuration) and the eNB in which the UE context is stored and further authenticating the UE corresponding to the UE context.

(Third Modification: UE Context Retention Function Determination)

As described above with reference to FIG. 7 or the like, in the present embodiment, a notification indicating that the UE 50 retains the UE context is given to the eNB 10. It is under the assumption that the eNB 10 supports UE context retention function (the function of performing the connection reusing the retained UE context or the function of performing the connection reusing the UE context acquired by Context Fetch).

However, all eNBs need not necessarily support the UE context retention function. For example, the UE 50 is assumed to enter the RRC idle state while retaining the UE context under the control of the eNB 10 and moves to a cell of an eNB-X which does not have the UE context retention function. Here, even when a notification of the information indicating that the UE 50 retains the UE context is given to the eNB-X, the eNB-X is unable to detect the information. In order to perform a stable operation, when the UE 50 is able to check that the eNB of the serving cell has the UE context retention function, it is desirable that the UE 50 perform the UE context retention notification operation described in FIG. 7 and the like.

The third modification is described in connection with an example in which the UE 50 determines whether or not the eNB 10 has the UE context retention function. Third modification is applicable to all of the first modification, the second modification, and the basic example. Examples 1 to 3 are described below. The "UE context retention function" in the third modification is a function for establishing the RRC connection from a state other than the RRC connected state using (or reusing) the retained UE context in the state. Further, when the eNB does not have the UE context retention function or when the eNB does not support the UE context retention function correspond to not only when the eNB does not retrain the UE context retention function as its capability but also when the eNB retains the UE context retention function as its capability but stops the function.

Example 1

In an example 1, the eNB 10 broadcasts information indicating whether or not the eNB 10 supports the UE context retention function to the UE 50 through broadcast information. As the broadcast information, for example, an MIB, an SIB1, or an SIB 2 may be used. As described above, criticalExtRRC-ConnEstReqAllowed broadcast through the SIB 2 is an example of the information.

Figure 37:
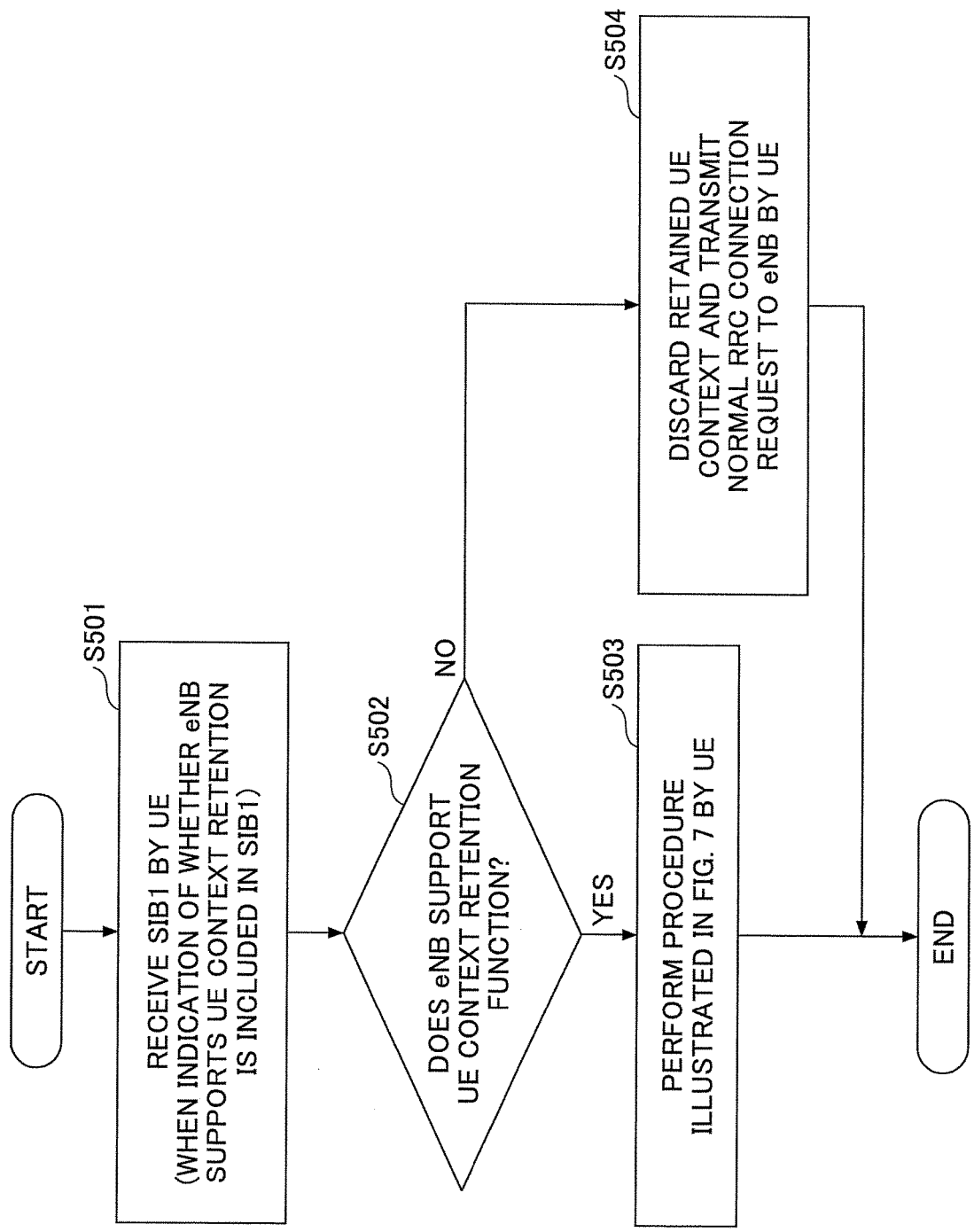
FIG. 37 is a flowchart for describing an exemplary operation of a UE.

An exemplary operation of the UE 50 related to determination of the UE context retention function is described with reference to a flowchart of FIG. 37. In the following example, the eNB 10 broadcasts information indicating whether or not the eNB 10 supports the UE context retention function using the SIB1.

In step S01, UE 50 receives the SIB1 from the eNB 10. In step S02, the UE 50 reads the information indicating whether or not the eNB 10 supports the UE context retention function from the SIB1, and the UE 50 determines whether or not the eNB 10 supports the UE context retention function on the basis of the information.

When the determination result of step S02 is Yes (supporting), the process proceeds to step S503, and when the UE 50 performs transition to the RRC connected state, the procedure described with reference to FIG. 7 and the like is performed. In other words, the UE 50 gives a notification of the information indicating that the UE context is retained. In S503 of FIG. 34, the procedure illustrated in FIG. 7 is performed, but this is an example, and for example, the procedure illustrated in FIG. 26 may be performed.

When the determination result of step S02 is No (not supporting), the process proceeds to step S504, and when the UE 50 performs transition to the RRC connected state, the UE 50 drops the retained UE context and transmits the normal RRC Connection Request which does not use a spare bit or the like (or does not include the authentication information or the like) to the eNB 10.

Example 2

In an example 2, the eNB 10 gives a notification indicating whether or not the eNB 10 supports the UE context retention function to the UE 50 through the Random Access Response in the random access procedure.

Figure 38:
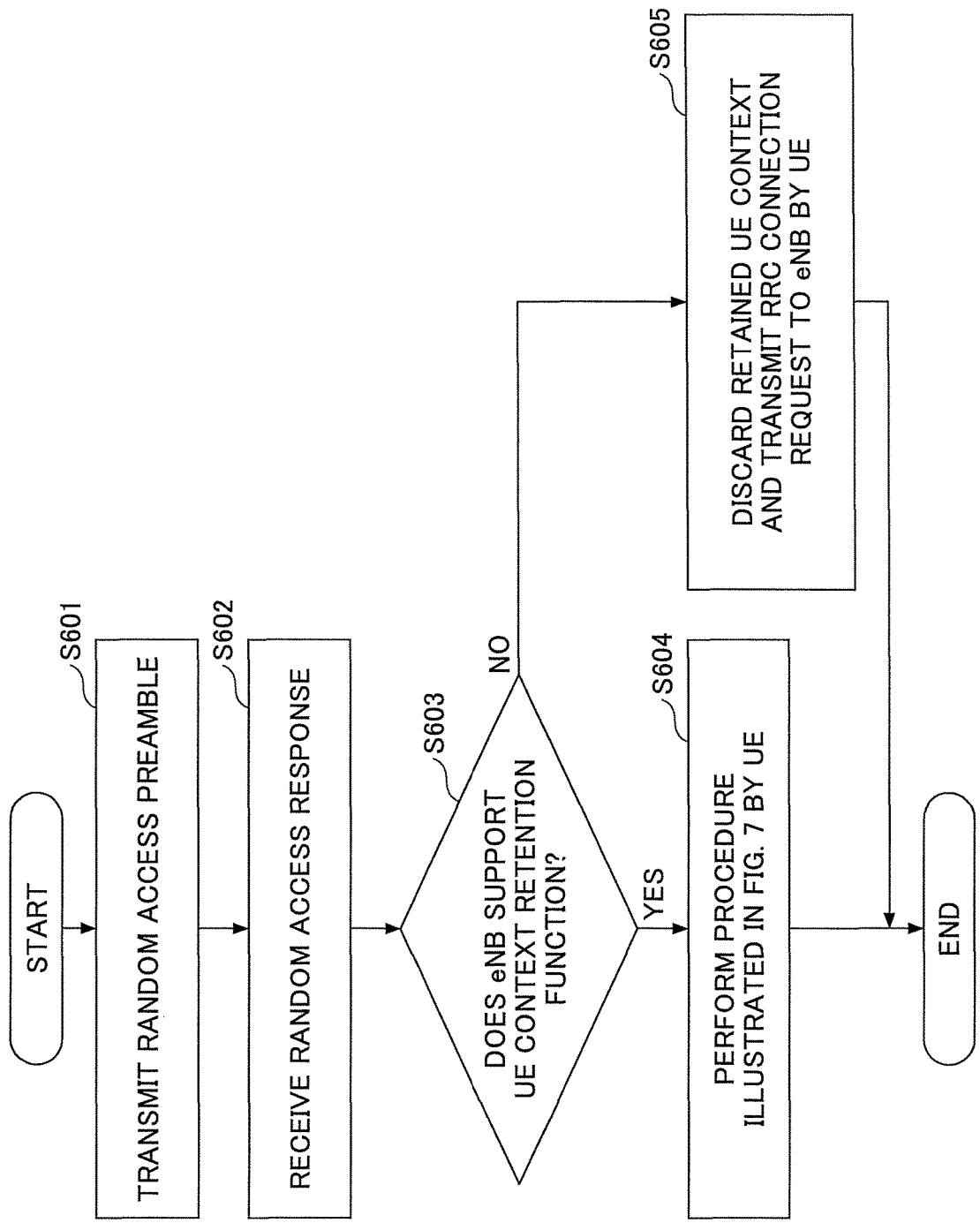
FIG. 38 is a flowchart for describing an exemplary operation of a UE.

An exemplary operation of UE 50 in the example 2 is described with reference to a flowchart of FIG. 38. Here, for example, a situation in which the UE 50 in the RRC idle state transitions to the RRC connected state upon receiving paging (or in order to originate a call) is illustrated.

In step 601, the UE 50 transmits a Random Access Preamble to the eNB 10. In step 602, the UE 50 receives a Random Access Response from the eNB 10. The Random Access Response includes information indicating whether or not the eNB 10 supports the UE context retention function.

In step 603, the UE 50 reads the information indicating whether or not the eNB 10 supports the UE context retention function from the Random Access Response, and the UE 50 determines whether or not the eNB 10 supports the UE context retention function on the basis of the information.

When the determination result of step 603 is Yes (supporting), the process proceeds to step S604, and the UE 50 performs the procedure described in FIG. 7 and the like. In other words, the UE 50 gives a notification of information indicating that the UE context is retained or the like. Further, the procedure illustrated in FIG. 7 is described as being performed in S604 of FIG. 38, but this is an example, and for example, the procedure illustrated in FIG. 26 may be performed.

When the determination result of step 603 is No (not supporting), the process proceeds to step S605, and the UE 50 drops the retained UE context and transmits the normal RRC Connection Request that does not use a spare bit to the eNB 10.

Figure 39:
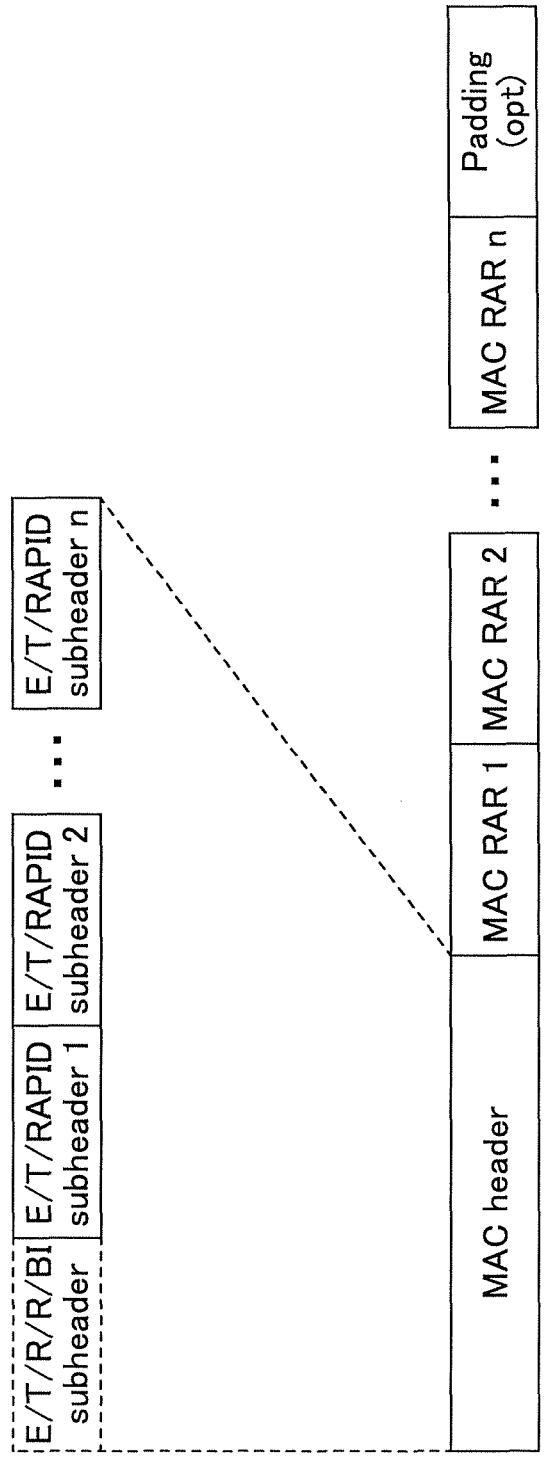
FIG. 39 is a diagram illustrating a message example of a RA response.
Figure 40:
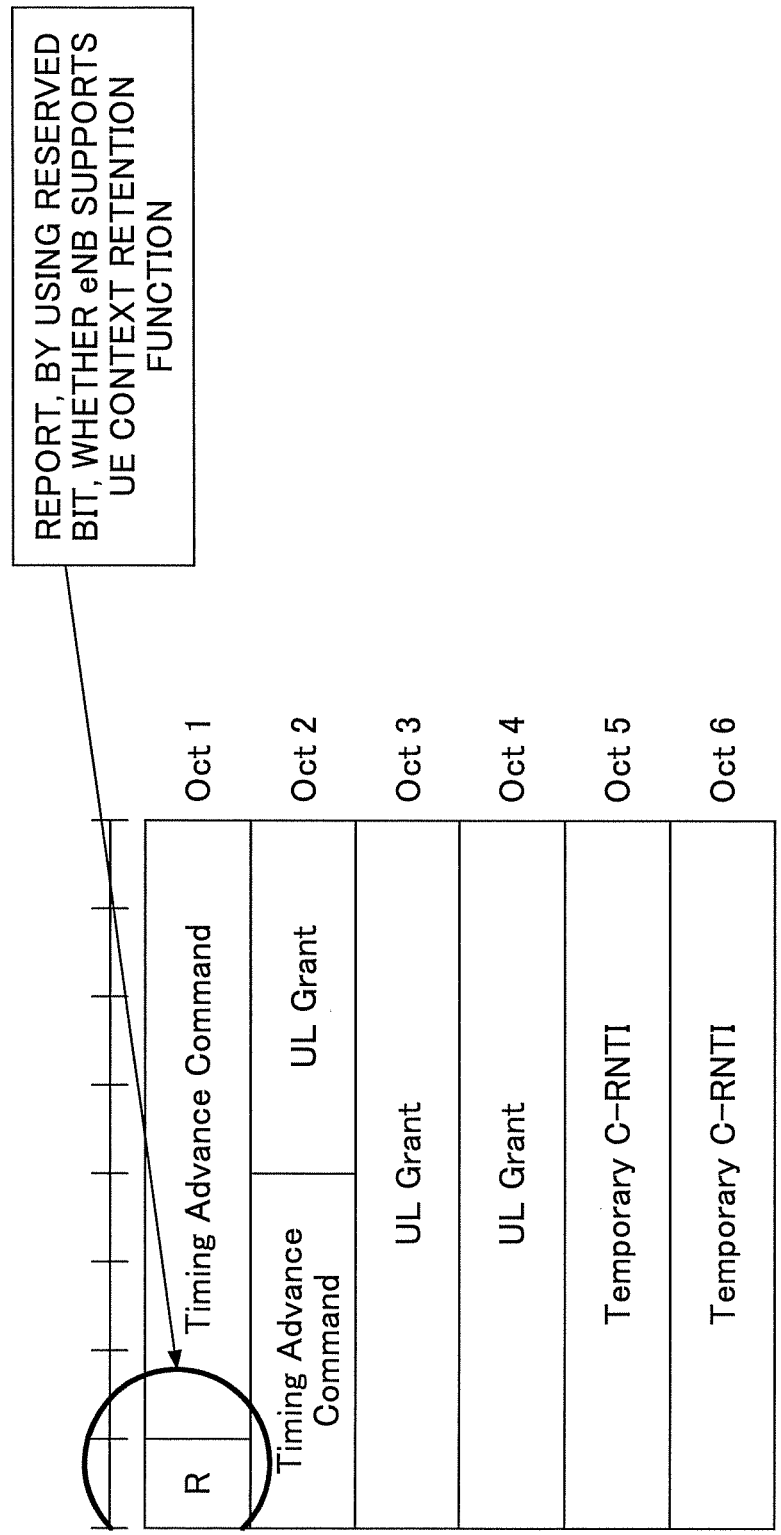
FIG. 40 is a diagram illustrating a message example of a RA response.

FIGS. 39 and 40 illustrate a messages example of the Random Access Response in the example 2 of the third modification (see Non-Patent Document 4 for an example of a related art). As illustrated in FIG. 39, an MAC RAR is included in an MAC PDU. As illustrated in FIG. 40, in the example 2, the notification of the information indicating whether or not the UE context retention function is supported is given using a reserved bit in the MAC RAR. As an example, a bit of 1 indicates that the UE context retention function is supported, and a bit of 0 indicates that the UE context retention function is not supported. 1 and 0 may be reversed.

Example 3

An example 3 relates to the basic example. In the example 3, the UE 50 determines whether or not the UE context retention function is supported in the eNB 10 in accordance with whether or not ue-ContextStored (the information indicating that the eNB 10 retains the UE context corresponding to the UE 50) is included in the RRC Connection Setup message.

In other words, in the example 3, the UE 50 constantly gives the notification indicating that the UE context is retained to the eNB through the RRC Connection Request, and performs the operation illustrated in FIG. 7. However, here, it is determined whether or not the UE context retention function is supported in the eNB 10 on the basis of the RRC Connection Setup message.

Figure 41:
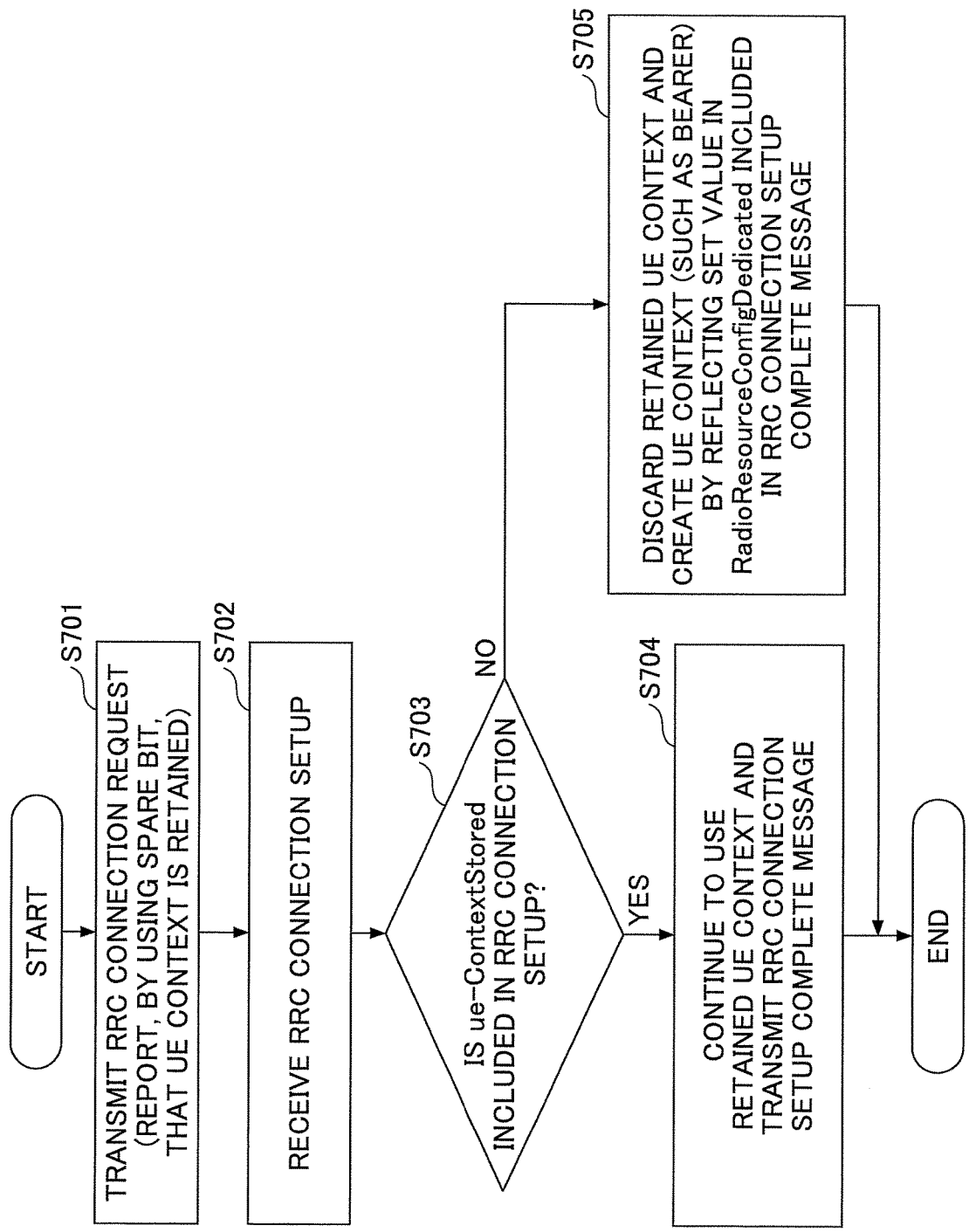
FIG. 41 is a flowchart for describing an exemplary operation of a UE.

An exemplary operation of UE 50 in the example 3 is described with reference to a flowchart of FIG. 41. For example, when the UE 50 in the RRC idle state desires to transition to the RRC connected state, in step 701, the UE 50 transmits the RRC Connection Request message including the information indicating that the UE context is retained to the eNB 10.

In step 702, the UE 50 receives the RRC Connection Setup message from the eNB 10. In step 703, the UE 50 determines whether ue-ContextStored is included in the RRC Connection Setup message, and when the determination result is Yes (included), the UE 50 proceeds to step 704, whereas when the determination result is No (not included), the process proceeds to step 705.

In step 704, the UE 50 continues to use the retained UE context, and transmits the RRC Connection Setup Complete message similar to step 203 in FIG. 7 to the eNB 10.

In step 705, the UE 50 drops the retained UE context, creates a UE context (the bearer, the MAC config, the PHY config, and the like) by reflecting a set value in the RadioResourceConfigDedicated included in the RRC Connection Setup message, and uses the UE context for the connection (communication) with the eNB 10. After step 705, the normal RRC connection procedure is performed.

(Modification Related to RRC Connection Setup Message: LCID Modification)

As described above, in the RRC connection establishment procedure according to the present embodiment, the UE 50 transmits the RRC Connection Request message including the information indicating that the UE context is retained.

Meanwhile, in the present embodiment, transmission and reception of data between the UE and the eNB are performed using a data radio bearer (DRB) basically. Here, this scheme is referred to as a "DRB scheme." On the other hand, a scheme in which data is transmitted and received through a signaling radio bearer (SRB) under the assumption of the application to Internet of things (IoT), machine type communication (MTC), and the like in which a small amount of data is transmitted and received has been proposed (Non-Patent Document 5). Here, this scheme is referred to as an "SRB scheme." The SRB scheme can be applied even in the present embodiment.

However, although the eNB side supports both the DRB scheme and the SRB scheme, the eNB is unable to appropriately operate unless the eNB side recognizes a scheme which is supported by a UE to be connected.

In this regard, in the present modification (referred to as an "LCID modification"), in the RRC connection establishment procedure illustrated in FIG. 7 (which may be FIG. 26), the UE 50 gives a notification indicating whether or not each of the DRB scheme and the SRB scheme is supported to the eNB 10 through the RRC Connection Request message. However, when information bits are added by increasing the size of the RRC Connection Request message, the eNB side reception quality of the RRC Connection Request message transmitted from the UE at the cell edge decreases, and as a result, the UE at the cell edge is likely to undergo a quality degradation, leading to a reduction in a cell radius. In the present modification, a notification is performed as follows.

The RRC Connection Request message is transmitted through the MAC PDU using the resources of the PUSCH allocated by the UL grant included in the Random Access Response. Further, the RRC Connection Request message is transmitted through a common control channel (CCCH) in terms of a logical channel.

In this regard, in the present modification, a notification indicating whether or not the UE 10 supports each of the DRB scheme and the SRB scheme is given to the eNB 10 using a logical channel ID (LCID) of a MAC header added to the MAC PDU. FIGS. 42A and 42B illustrate a specification (a modification from a current specification) in which an operation related to a MAC of a communication system according to the present modification. Parts changed from the current MAC specification (Non-Patent Document 4) are underlined.

As illustrated in FIGS. 42A and 42B, when the UE supports only the SRB scheme, the CCCH is designated using an LCID "01100." When the UE supports only the DRB scheme, the CCCH is designated using an LCID "01101." When the UE supports both the SRB scheme and the DRB scheme, the CCCH is designated using an LCID "01110." The values are examples.

For example, when the RRC Connection Request message is transmitted from the UE 50 through the MAC PDU designating the LCID "01100", and the eNB 10 receives the RRC Connection Request message, the eNB 10 detects that the UE 50 supports only the DRB scheme and performs data transmission/reception using the DRB.

Further, when the RRC Connection Request message is transmitted from the UE 50 through the MAC PDU designating the LCID "01101," and the eNB 10 receives the RRC Connection Request message, the eNB 10 detects that the UE 50 supports only the SRB scheme and performs data transmission/reception using the SRB.

Further, when the RRC Connection Request message is transmitted from the UE 50 with through the MAC PDU designating the LCID "01110," and the eNB 10 receives the RRC Connection Request message, the eNB 10 detects that the UE 50 supports both the DRB scheme and the SRB scheme. In this case, for example, the eNB 10 determines one of the DRB scheme and the SRB scheme to be performed in accordance with a capability of the UE 50 or the like.

Through the above schemes, it is possible to give the notification indicating whether or not the DRB scheme or the SRB scheme is supported without increasing the size of the RRC Connection Request message.

In the above example, when the RRC Connection Request message is transmitted, the notification indicating whether or not the DRB scheme or the SRB scheme is supported is given using the LCID, but this is an example, and the notification indicating whether or not the DRB scheme or the SRB scheme is supported may be given using the LCID in another message transmitted through the CCCH.

(Fourth Modification: Modification Related to UE Context Retention Period)

In the first modification described above, when the predetermined period T in which the UE context is retained elapses from a point in time at which the UE context starts to be retained, the UE 50 determines that the UE context has become deactivated and releases (deletes) the UE context. In other words, according to the first modification, the UE 50 operates to retain the UE context unless the predetermined period T expires regardless of a radio access technology (RAT) of a cell to be reselected. However, the present invention is not limited thereto, and the UE 50 may release (delete) the UE context in accordance with a condition to be described below. The cell reselection indicates an operation in which the UR 50 that has first transitioned from the RRC connected state to the RRC idle state selects (reselects) a cell in which the UE 50 transitions to the RRC connected state, for example, an operation in which the UE 50 moves to another cell and selects the cell and an operation of selecting one of overlapped cells.

Example 1-1

In the case in which the cell reselection is performed, when a cell to be reselected is a non-LTE cell (for example, when a cell of another RAT other than LTE such as UMTS, GSM (registered trademark), or the like)), the UE 50 may release (delete) the UE context. In this case, the UE 50 that retains the UE context may release (delete) the UE context when an attempt to establish the RRC connection in a cell to be reselected (through another RAT other than LTE) (that is, when the RRC connection establishment request is transmitted to the base station) or may release (delete) the UE context after the RRC connection is established in a cell to be reselected (through another RAT other than LTE).

Further, the UE 50 that retains the UE context may release (delete) the UE context until the RRC connection is established in a cell to be reselected (through another RAT other than LTE) (that is, at an arbitrary timing before the RRC connection is established in a cell to be reselected). In this case, the specification modification (TS 36.304) is illustrated in FIG. 43.

When the UE 50 first accesses a non-LTE cell, since a possibility that an LTE cell is immediately reselected is low, it is possible to reduce a memory usage amount of the UE 50.

Example 1-2

In the case in which the cell reselection is performed, when a cell to be reselected is a non-LTE cell (for example, when a cell of another RAT other than LTE such as UMTS, GSM (registered trademark), or the like)), the UE 50 may not release (delete) the UE context. In this case, although the UE 50 first accesses a non-LTE cell, when there is a possibility that an LTE cell is immediately reselected, it is possible to reuse the UE context.

Example 2-1

In the case in which the cell reselection is performed, when a cell to be reselected is an LTE cell, and information indicating that the eNB 10 supports the UE context retention function is not included in the broadcast information (the SIB2), the UE 50 may release (delete) the UE context. Further, in the case in which the cell reselection is performed, when a cell to be reselected is an LTE cell, and the information indicating that the eNB 10 supports the UE context retention function is included in the broadcast information (the SIB2), the UE 50 may not release (delete) the UE context. The information indicating that the eNB 10 supports the UE context retention function may be information indicating whether or not the eNB 10 supports the UE context retention function which is described in <Example 1> of the third modification or may be information indicating that "up-CIOT-EPS-Optimisation" is set in the SIB 2 (the same applies to the following example 2-2). Thus, the UE 50 can reduce the memory usage of the UE 50 when the eNB 10 does not support the UE context retention function in the cell to be reselected.

Even in the third modification, the information indicating whether or not the eNB 10 supports the UE context retention function may be indicated by whether or not "up-CIOT-EPS-Optimisation" is set in the SIB 2.

Example 2-2

In the case in which the cell reselection is performed, when a cell to be reselected is an LTE cell, the UE 50 may not release (delete) the UE context regardless of whether or not the information indicating that the eNB 10 supports the UE context retention function is included in the broadcast information of the cell. As a result, although the eNB 10 does not support the UE context retention function, if the eNB 10 of the cell to be reselected later supports the UE context retention function, the UE context can be reused. FIG. 44 illustrates a specification modification (TS 36.304) corresponding to <Example 2-2>.

As described above, according to the fourth modification, the condition in which the UE context is retained or released when the UE 50 in the RRC idle state performs the cell reselection is clarified.

In <Example 1-1>, <Example 1-2>, <Example 2-1>, and <Example 2-2> of the first and fourth modifications, "UE context" may be replaced with "UE context and Resume ID." Further, the fourth modification can be applied to all of the basic example, the first modification, the second modification, and the third modification. Further, <Example 1-1> or <Example 1-2> of the fourth modification may be combined with <Example 2-1> or <Example 2-2>.

(Exemplary Device Configuration)

Next, an exemplary configuration of each of the devices according to an embodiment of the present invention is described. In a configuration of each of the respective devices to be described below, only functional units particularly related to the embodiment of the invention are illustrated, and functions (not illustrated) for operating as a device in a communication system conforming to at least LTE (LTE of a meaning including an EPC) are also provided. Further, functional configurations illustrated in the respective drawing are merely examples. Any classification or any name may be used as a function classification or a name of a functional unit as long as the operation according to the preset embodiment can be performed.

<Exemplary Configurations of MME and S-GW>

Figure 45:
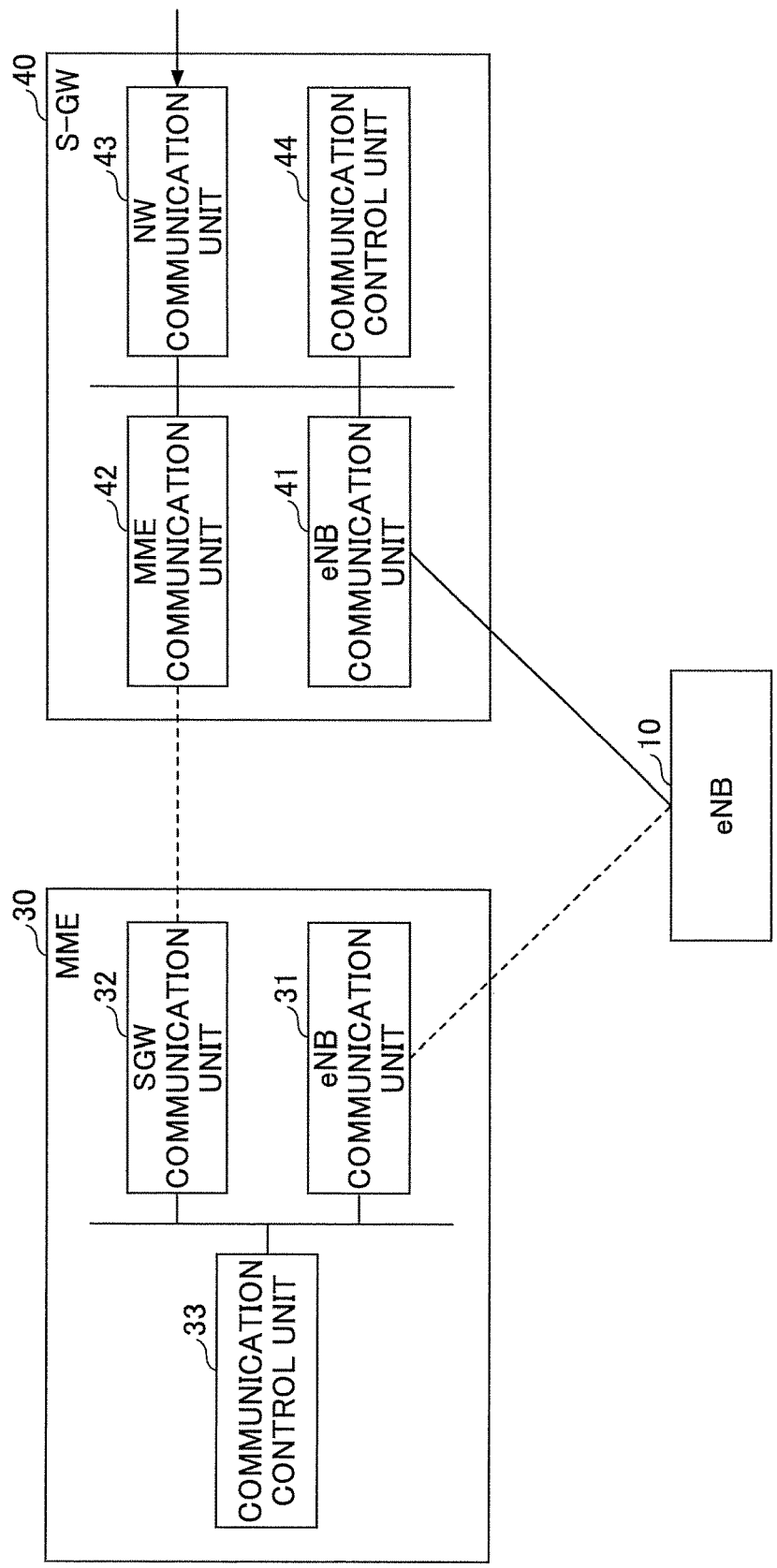
FIG. 45 is a configuration diagram of an MME and an S-GW.

First, exemplary configurations of the MME 30 and the S-GW 40 is described with reference to FIG. 45. As illustrated in FIG. 45, the MME 30 includes an eNB communication unit 31, an SGW communication unit 32, and a communication control unit 33.

The eNB communication unit 31 has a function for transmitting or receiving control signals to or from the eNB through an S1 MME interface. The SGW communication unit 32 includes a function for transmitting or receiving a control signals to or from the S-GW through an S11 interface.

The communication control unit 33 has a function for instructing the SGW communication unit 32 to transmit the connection retention instruction signal to the S-GW when the connection retention instruction signal is received from the eNB and instructing the SGW communication unit 32 to transmit the acknowledge response to the eNB when the acknowledge response is received from the S-GW.

As illustrated in FIG. 45, the S-GW 40 includes an eNB communication unit 41, an MME communication unit 42, an NW communication unit 43, and a communication control unit 44.

The eNB communication unit 41 has a function for transmitting or receiving control signals to or from the eNB through an S1-U interface. The MME communication unit 42 41 a function for transmitting or receiving control signals to or from the MME through an S11 interface. The NW communication unit 43 has a function for performing transmission and reception of control signals and transmission and reception of data with a node device on a core NW side.

The communication control unit 44 has a function for instructing the MME communication unit 42 to transmit an acknowledge response to the MME when the connection retention instruction signal is received from the MME. Further, in the case in which the connection retention instruction signal is received from the MME, the communication control unit 44 has a function for instructing the NW communication unit 43 to retain the downlink data in the buffer when downlink data to the corresponding UE is received and instructing the NW communication unit 43 to transmit the downlink data to transmit the downlink data when the RRC connection establishment complete is received from the eNB.

The MME 30 and the S-GW 40 can be configured as a single device. In this case, communication of the S11 interface communication between the SGW communication unit 32 and the MME communication unit 42 is communication inside the device.

Next, exemplary configurations of UE 50 and eNB 10 according to the embodiment of the present invention's embodiment (including the basic example, the first modification, the second modification, the third modification, and the LCID modification) are described. Each of the UE 50 and the eNB 10 to be described below may have the functions of the basic example and the functions of all the modifications, may have any one of the functions of the basic example and the functions of all the modifications, or may have a plurality of functions among the functions of the basic example and the functions of all the modifications.

<User Equipment UE>

Figure 46:
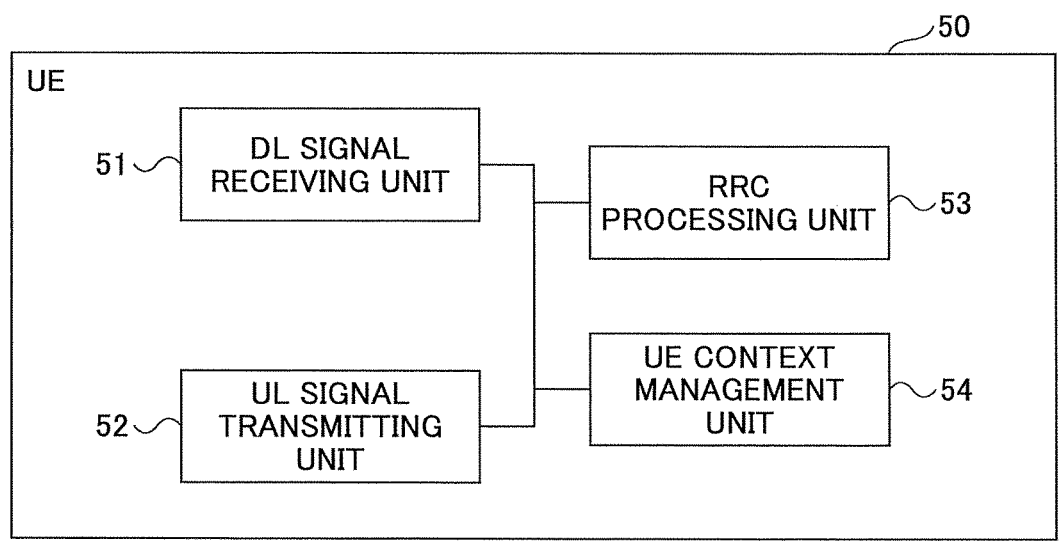
FIG. 46 is a configuration diagram of a UE 50.

FIG. 46 illustrates a functional configuration diagram of the user equipment (UE 50). As illustrated in FIG. 46, the UE 50 includes a DL signal receiving unit 51, an UL signal transmitting unit 52, an RRC processing unit 53, and a UE context management unit 54. FIG. 46 illustrates only functional units of the UE 50 particularly related to the present invention, and the UE 50 also has functions (not illustrated) of performing at least operations conforming to LTE.

The DL signal receiving unit 51 has a function for receiving various kinds of downlink signals from the base station eNB and acquiring information of a higher layer from received signals of the physical layer, and the UL signal transmitting unit 52 has a function for generating various kinds of signals of the physical layer from information of the higher layer to be transmitted from the UE 50 and transmitting the generated signals to the base station eNB. Further, the UL signal transmitting unit 52 has a function for giving the notification indicating whether or not the DRB scheme or the SRB scheme is supported using the LCID when the RRC Connection Request message or the like is received to the eNB 10.

The RRC processing unit 53 performs the UE side determination process, the generation and transmission of the RRC message (the transmission is transmission via the UL signal transmitting unit 52), interpretation of the RRC message received by the DL signal receiving unit 51, an operation based on the interpretation, and the like which have been described above with reference to FIGS. 7, 8, and 10 to 41. Further, the transmission and reception of the MAC signal in the random access procedure described with reference to FIGS. 38 to 40 may be performed through the DL signal receiving unit 51 and the UL signal transmitting unit 52. The RRC processing unit 53 has a function for resuming the RRC connection using the UE context retained in the UE context management unit 54. As the resuming function, for example, in the first modification, there is a processing function of activating the UE context when the activation instruction is received from the eNB.

The UE context management unit 54 includes a storage unit such as a memory and, for example, retains the UE context and the UE identifier (the S-TMSI or the like) in the RRC idle state on the basis of the instruction described above with reference to FIG. 8. Further, in the procedure illustrated in FIG. 7, FIG. 26, and the like, the UE context management unit 54 determines whether or not the UE context is retained, and when the UE context is retained, the UE context management unit 54 gives an instruction to give the notification of the information indicating that the UE context is retained to the RRC processing unit 53. Further, the UE context management unit 54 has a function for regarding that the retained UE context has been deactivated when a predetermined time (T) elapses in the RRC idle state from a time at which transition from the RRC connected state to the RRC idle state is performed and then releasing the UE context. Further, the UE context management unit 54 has a function for selecting whether or not the UE context is released because it is regarded as having been deactivated in accordance with the radio access technology of a cell to be reselected (for example, GSM (registered trademark), UMTS, LTE, or the like). Further, the UE context management unit 54 has a function for regarding that the UE context has been deactivated and releasing the UE context on the basis of whether or not the eNB 10 supports the function of releasing the UE context in the case in which the radio access technology of the cell to be reselected is LTE. Further, the UE context management unit 54 has a function for releasing (deleting) the UE context until the RRC connection is established through a different RAT (in a cell to be reselected) when the cell reselection is performed through the different RAT from the current RAT while retaining the UE context.

The entire configuration of the UE 50 illustrated in FIG. 46 may be implemented by a hardware circuit (for example, one or more IC chips), or a part of the configuration of the UE 50 may be implemented by a hardware circuit, and the remaining parts may be implemented by a CPU and a program.

Figure 47:
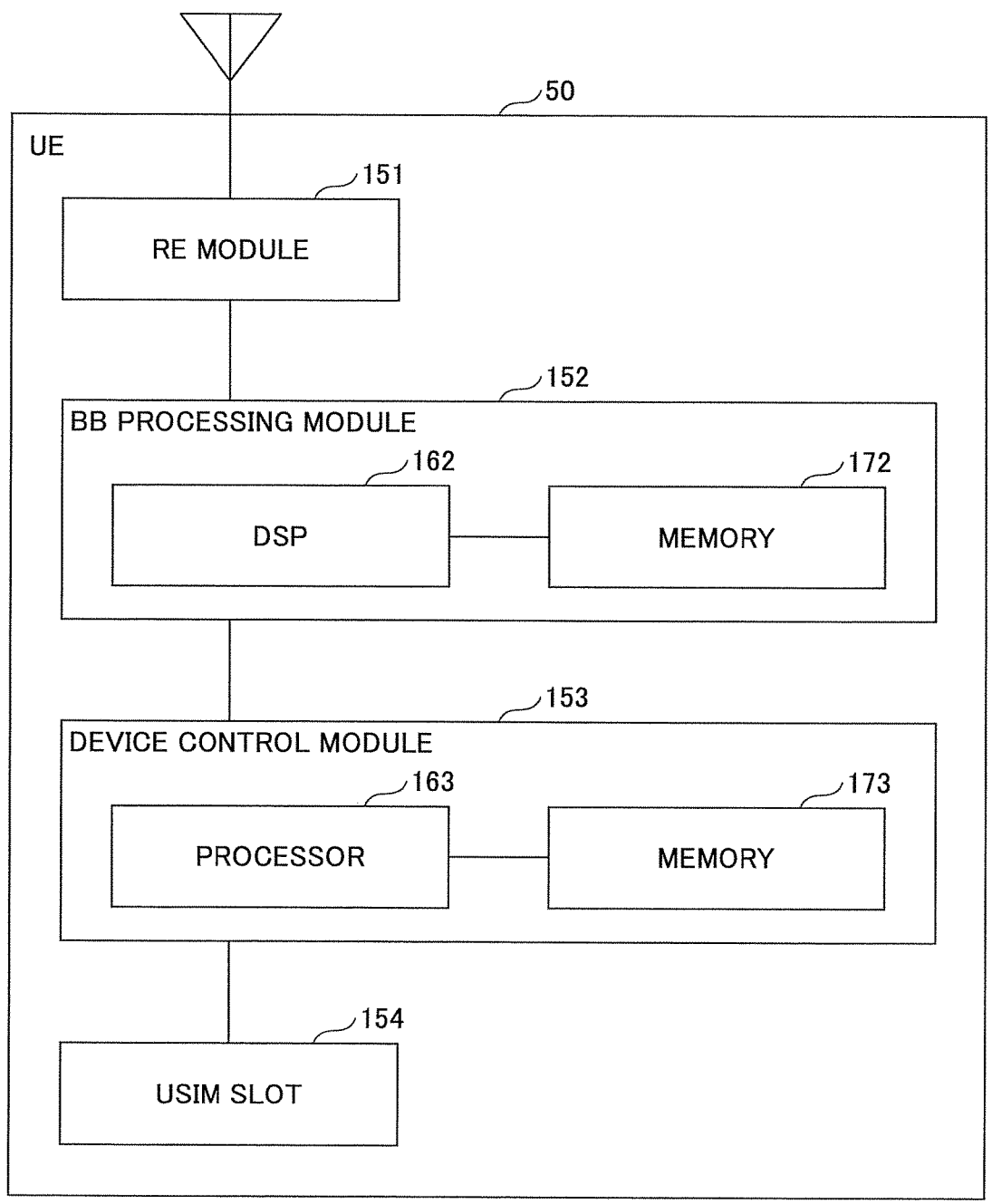
FIG. 47 is a HW configuration diagram of the UE 50.

FIG. 47 is a diagram illustrating an example of a hardware (HW) configuration of the UE 50. FIG. 47 illustrates a configuration which is closer to an implementation example than that of FIG. 46. As illustrated in FIG. 47, the UE includes a radio equipment (RE) module 151 that performs processing related to a radio signal, a baseband (BB) processing module 152 that performs baseband signal processing, a device control module 153 that performs processing of a higher layer or the like, and a USIM slot 154 which is an interface for accessing a USIM card.

The RE module 151 performs digital-to-analog (D/A) conversion, modulation, frequency transform, power amplification, and the like on a digital baseband signal received from the BB processing module 152, and generates a radio signal to be transmitted from an antenna. Further, the RE module 151 performs frequency transform, analog to digital (A/D) conversion, demodulation, and the like on a received radio signal, generates a digital baseband signal, and transfers the digital baseband signal to the BB processing module 152. The RE module 151 includes, for example, the functions of the physical layer of the UL signal transmitting unit 52 and the DL signal receiving unit 51 in FIG. 46.

The BB processing module 152 performs a process of converting an IP packet into a digital baseband signal and vice versa. A digital signal processor (DSP) 162 is a processor that performs signal processing in the BB processing module 152. A memory 172 is used as a work area of the DSP 162. The BB processing module 152 has, for example, functions of the layer 2 and the like in the DL signal receiving unit 51 and the UL signal transmitting unit 52 of FIG. 46, the RRC processing unit 53, and the UE context management unit 54. All or some of the RRC processing unit 53 and the UE context management unit 54 may be included in the device control module 153.

The device control module 153 performs protocol processing of the IP layer, various kinds of application processing, and the like. A processor 163 is a processor that performs processing performed by the device control module 203. A memory 173 is used as a work area of the processor 163. Further, the processor 163 reads or writes data from or in the USIM via the USIM slot 154.

<Base Station eNB>

Figure 48:
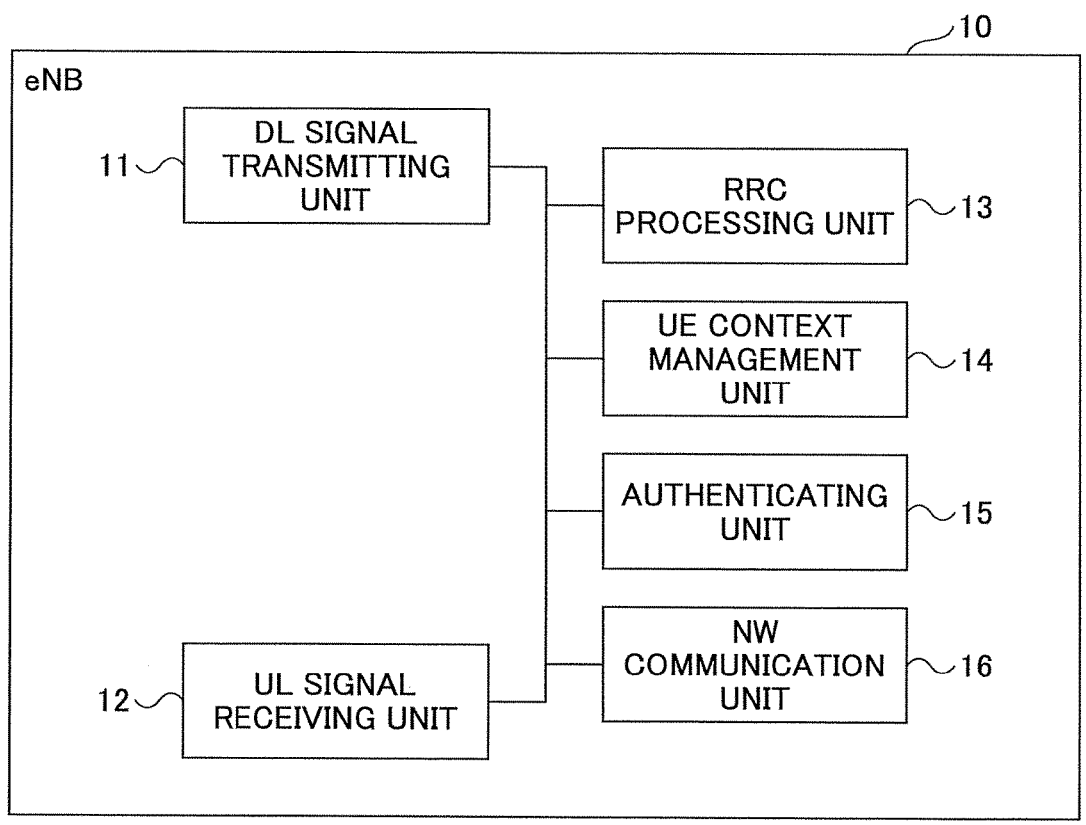
FIG. 48 is a configuration diagram of an eNB 10.

FIG. 48 illustrates a functional configuration diagram of the base station eNB (eNB 10). Here, FIG. 48 does not illustrate the Context fetch function of the second modification. As illustrated in FIG. 48, the eNB 10 includes a DL signal transmitting unit 11, a UL signal receiving unit 12, an RRC processing unit 13, a UE context management unit 14, an authenticating unit 15, and an NW communication unit 16. FIG. 48 illustrates only functional units of the eNB particularly related to the embodiment of the present invention, and the eNB 10 also has functions (not illustrated) of performing at least operations conforming to the LTE scheme.

The DL signal transmitting unit 11 has a function for generating various kinds of signals of the physical layer from signals of a higher layer to be transmitted from the eNB 10 and transmitting the signals. The UL signal receiving unit 12 has a function for receiving various kinds of uplink signals from the user equipment UE and acquiring information of the higher layer from the received signal of the physical layer. The UL signal receiving unit 12 has a function for deciding whether or not the DRB scheme or the SRB scheme is supported in the UE 50 on the basis of the LCID in the MAC header of the MAC PDU received from the UE 50.

The RRC processing unit 13 performs the eNB side determination process, the generation and transmission of the RRC message and the broadcast information (the transmission is transmission via the DL signal transmitting unit 11), interpretation of the RRC message received by the UL signal receiving unit 12, an operation based on the interpretation, and the like which have been described above with reference to FIGS. 7, 8, and 10 to 41. Further, the transmission and reception of the MAC signal in the random access procedure described with reference to FIGS. 38 to 40 may be performed through the DL signal transmitting unit 11 and the UL signal receiving unit 12. The RRC processing unit 13 has a function for resuming the RRC connection using the UE context retained in the UE context management unit 14.

The UE context management unit 14 includes a storage unit such as a memory and, for example, retains the UE context and the UE identifier (the S-TMSI or the like) in the RRC idle state on the basis of the instruction described above with reference to FIG. 8. Further, in the procedure illustrated in FIG. 7, the UE context management unit 14 searches for the UE context on the basis of the UE identifier received from the UE, and when the UE context is checked to be retained, the UE context management unit 14 gives the notification indicating that the UE context is retained and the authentication information request to the RRC processing unit 13. In the first modification, the UE context management unit 14 instructs the authenticating unit 15 to perform the authentication on the basis of the authentication information received from the UE, searches for the UE context of the UE 50 when the authentication succeeds, and instructs the RRC processing unit 13 to generate and transmit a message for instructing the UE 50 to activate the UE context when the UE context is checked to be retained. Further, the UE context management unit 14 has a function for regarding that the UE context has been deactivated when a predetermined time (T) elapses in the RRC idle state from a time at which the UE 50 transitions from the RRC connected state to the RRC idle state and then releasing the UE context.

In the basic example, the authenticating unit 15 has a function for receiving the authentication information from the UE and authenticating the UE in step 203 illustrated in FIG. 7. In the first modification, the authenticating unit 15 authenticates the UE on the basis of the authentication information transmitted from the UE in step 201 illustrated in FIG. 7.

The NW communication unit 16 has a function for transmitting or receiving control signals to or from the MME through the S1-MME interface, a function for transmitting or receiving data to or from the S-GW through the S1-U interface, a function for transmitting the connection retention instruction signal, a function for transmitting the RRC connection establishment complete, and the like.

Figure 49:
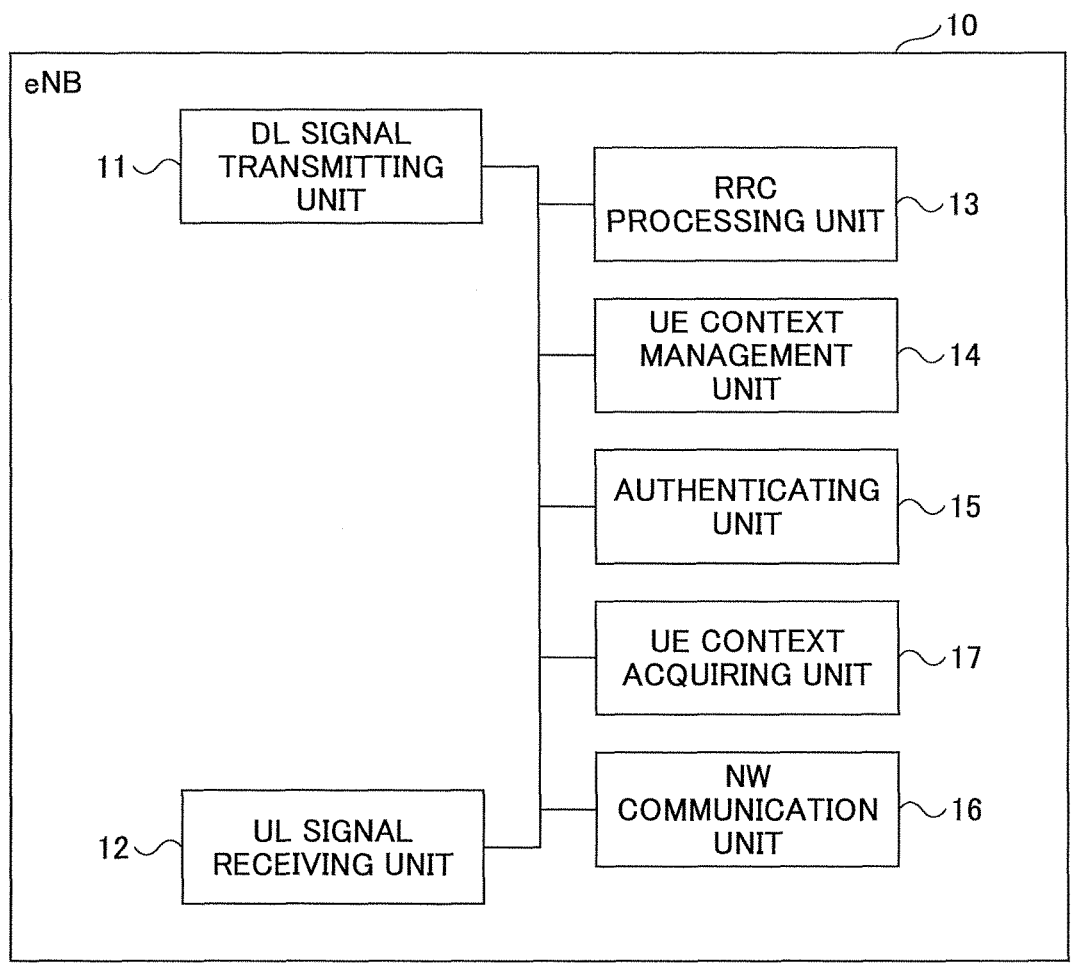
FIG. 49 is a configuration diagram of the eNB 10.

FIG. 49 illustrates a functional configuration diagram of the base station eNB (eNB 10) in the second modification. The difference with the eNB 10 of FIG. 48 will mainly be described below. In the eNB 10 of FIG. 49, a UE context acquiring unit 17 is added to the configuration of FIG. 48.

Figure 27:
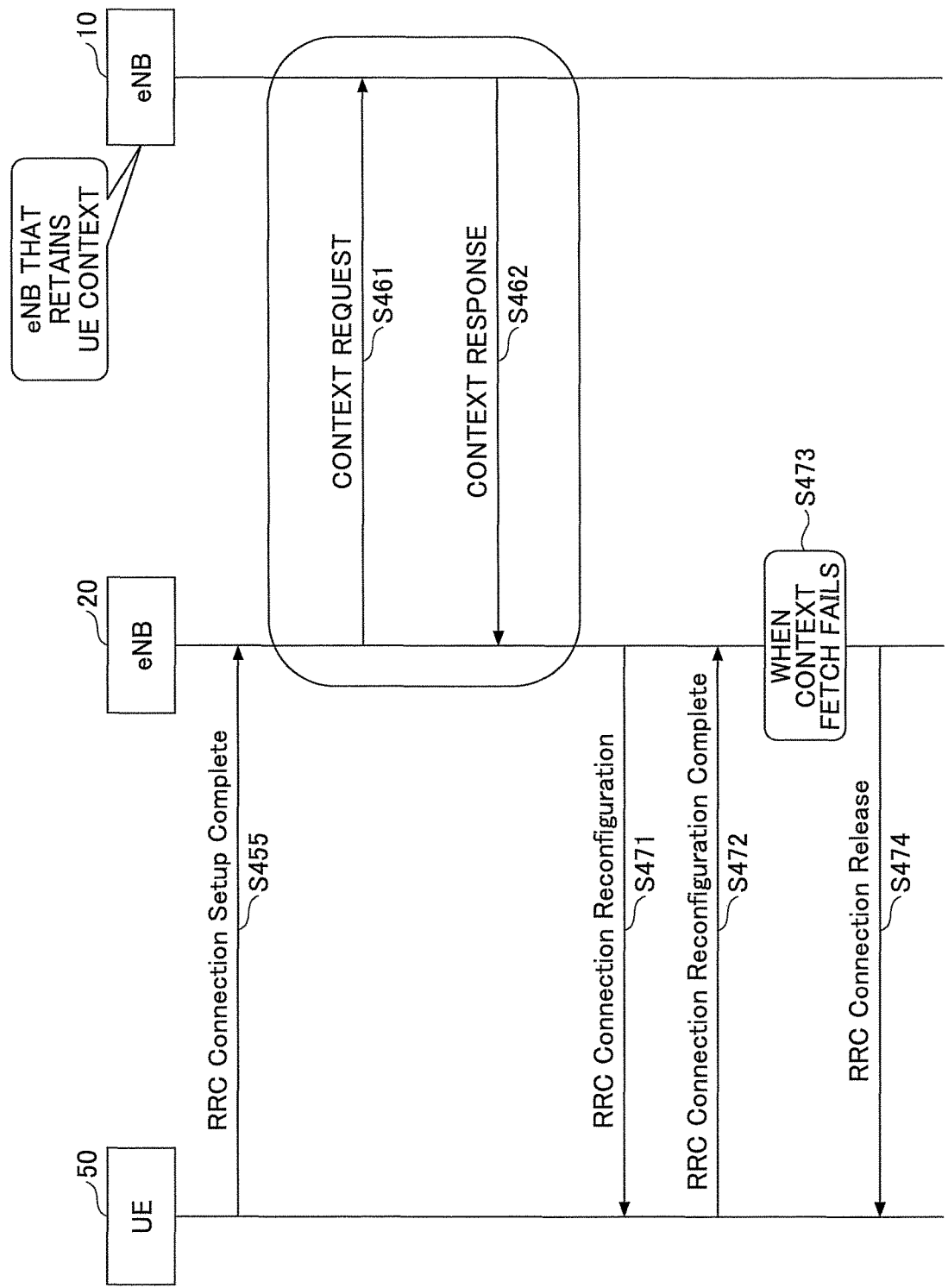
FIG. 27 is a diagram illustrating a context acquisition procedure example.

The RRC processing unit 13 performs the message transmission/reception operation of steps 453 to 455 and 471 to 474 illustrated in FIGS. 26 and 27 together with the DL signal transmitting unit 11 and the UL signal receiving unit 12.

The UE context acquiring unit 17 performs the context acquisition procedure when the UE context necessary for establishing the RRC connection with the UE that retains the UE context is not stored in the UE context management unit 14 (steps 460 of FIG. 26 and steps 461 and 462 of FIG. 27). Further, the UE context acquiring unit 17 has a function for acquiring the UE context from the UE context management unit 14 on the basis of the information specifying the target UE context and transmitting the UE context to the base station when the context request message is received from another base station.

The entire configuration of the eNB 10 illustrated in FIGS. 48 and 47 may be implemented by a hardware circuit (for example, one or more IC chips), or a part of the configuration of the UE 50 may be implemented by a hardware circuit, and the remaining parts may be implemented by a CPU and a program.

Figure 50:
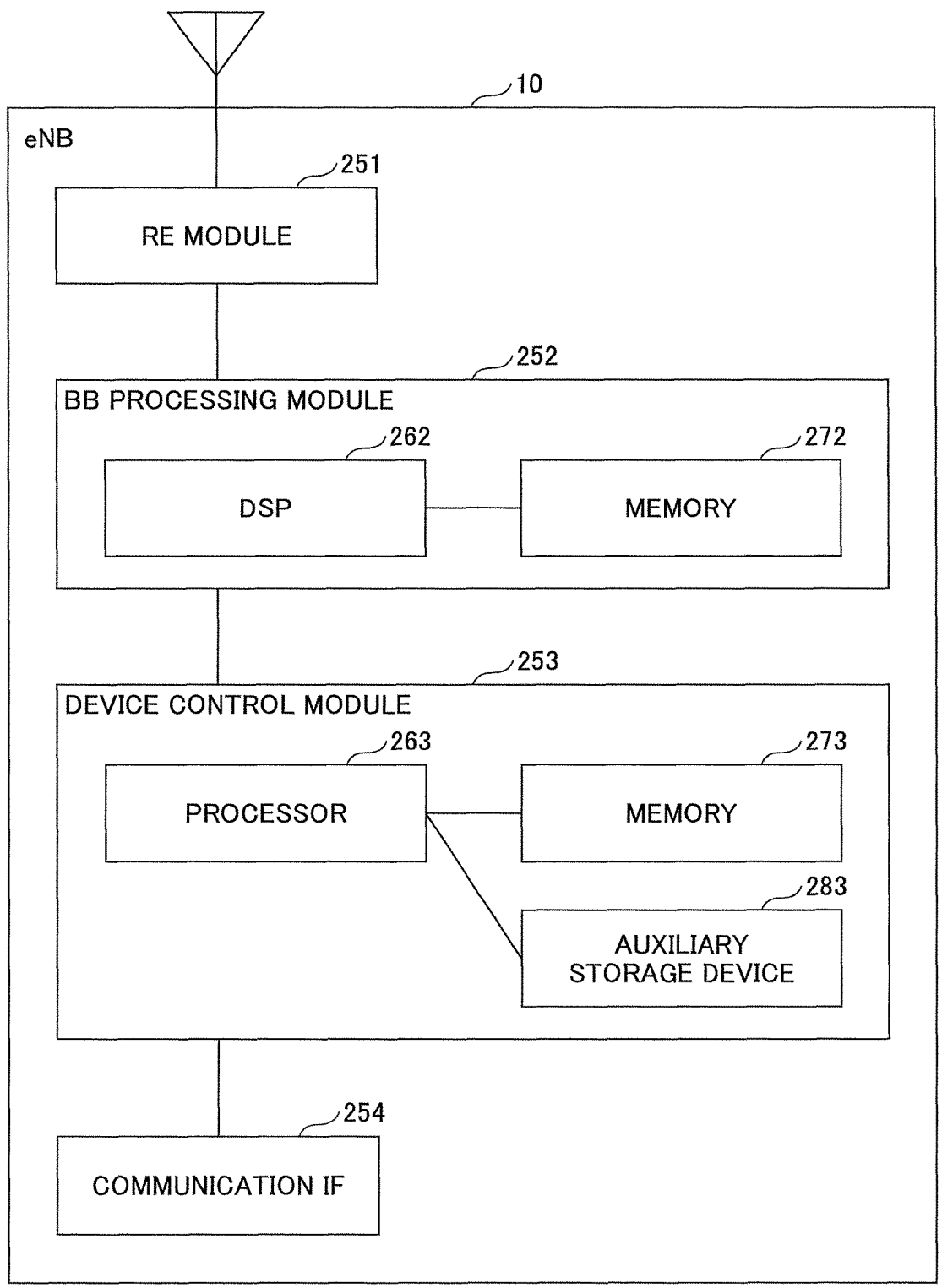
FIG. 50 is a HW configuration diagram of the eNB 10.

FIG. 50 is a diagram illustrating an example of the hardware (HW) configuration of the eNB 10. FIG. 50 illustrates a configuration which is closer to an implementation example than that of FIGS. 48 and 47. As illustrated in FIG. 50, the base station eNB includes an RE module 251 that performs processing related to a radio signal, a BB processing module 252 that performs baseband signal processing, a device control module 253 that performs processing of a higher layer or the like, and a communication IF 254 which is an interface of a connection with a network.

The RE module 251 performs D/A conversion, modulation, frequency transform, power amplification, and the like on a digital baseband signal received from the BB processing module 252, and generates a radio signal to be transmitted from an antenna. Further, the RE module 251 performs frequency transform, analog to digital (A/D) conversion, demodulation, and the like on a received radio signal, generates a digital baseband signal, and transfers the digital baseband signal to the BB processing module 252. The RE module 251 has, for example, the functions of the physical layer in the DL signal transmitting unit 11 and the UL signal receiving unit 12 of FIGS. 48 and 47.

The BB processing module 252 performs a process of converting an IP packet into a digital baseband signal and vice versa. A DSP 262 is a processor that performs signal processing in the BB processing module 252. A memory 272 is used as a work area of the DSP 252. The BB processing module 252 includes, for example, functions of the layer 2 in the DL signal transmitting unit 11 and the UL signal receiving unit 12, the RRC processing unit 13, the UE context management unit 14, the authenticating unit 15, and the UE context acquiring unit 17 in FIGS. 48 and 47. All or some of the functions of the RRC processing unit 13, the UE context management unit 14, the authenticating unit 15, and the UE context acquiring unit 17 may be included in the device control module 253.

The device control module 253 performs protocol processing of the IP layer, OAM processing, and the like. A processor 263 is a processor that performs processing performed by the device control module 253. A memory 273 is used as a work area of the processor 263. An auxiliary storage device 283 is, for example, an HDD or the like, and stores various kinds of configuration information and the like for the operation of the base station eNB.

The configuration (function classification) of each of the devices illustrated in FIGS. 45 to 50 are merely an example of a configuration for implementing the process described in the present embodiment (including the basic example and the first and second modifications). An implementation method thereof (a specific arrangement of functional units, names thereof, and the like) is not limited to a specific implementation method as long as the process described in the present embodiment (including the basic example and the first and second modifications) can be implemented.

(Conclusion of Embodiment)

As described above, according to the present embodiment, provided is user equipment in a mobile communication system that supports a function for performing connection establishment reusing context information retained in each of the user equipment and a base station, including: a transmitting unit that transmits a connection request message including first context retention information indicating that the user equipment retains user equipment side context information to the base station; a receiving unit that receives a connection setup message including second context retention information indicating that the base station retains base station side context information associated with the user equipment from the base station; and a connecting unit that establishes a connection with the base station using the user equipment side context information after receiving the connection setup message.

Through the above configuration, in the mobile communication system that supports the function of performing connection establishment reusing context information retained in each of the user equipment and the base station, the base station can determine whether or not the user equipment retains the context information.

The connection setup message may include a transmission request of authentication information for the user equipment in addition to the second context retention information, and the transmitting unit may transmit the authentication information to the base station on the basis of the transmission request. Through this configuration the base station can establish the connection after authenticating the user equipment.

For example, the transmitting unit transmits a connection setup complete message including the authentication information to the base station. Through this configuration, it is unnecessary to transmit the authentication information through a special message, and the message can be reduced.

The transmitting unit may transmit the connection request message including the authentication information of the user equipment as the first context retention information to the base station. Through this configuration, the authentication information can be transmitted before the connection setup is performed (before the RRC connection is performed).

The receiving unit may receive the connection setup message including the instruction information for activating the user equipment side context information as the second context retention information from the base station. Through this configuration, the user equipment can determine whether or not the base station retains the context information in accordance with whether or not the instruction information for activating the user equipment side context information is received.

The receiving unit may receive a connection release message for causing the user equipment to transition from a connected state to an idle state from the base station and retain the user equipment side context information in a storage unit in the idle state when information for giving an instruction to retain the user equipment side context information is detected from the connection release message. Through this configuration, when the instruction is not received, the user equipment may not retain the user equipment side context information, and it is possible to prevent the user equipment side context information from being retained in vain.

The user equipment may further include a management unit that deactivates the user equipment side context information retained in the storage unit when a predetermined time elapses in the idle state from a point in time at which the user equipment transitions from the connected state to the idle state. Through this configuration, for example, when the idle state continues for a long time, it is possible to prevent the user equipment side context information from being continuously retained.

The user equipment may further include a management unit that selects whether or not the user equipment side context information retained in the storage unit is deactivated in accordance with a radio access technology of a cell to be selected for transitioning to the connected state again when the user equipment has transitioned from the connected state to the idle state. Through this configuration, it is possible to prevent the user equipment side context information from being continuously retained, for example, when the cell to be reselected is not LTE.

Further, according to the present embodiment, provided is user equipment in a mobile communication system that supports a function for performing connection establishment reusing context information retained in each of the user equipment and a base station, including: a transmitting unit that transmits a connection request message including a first identifier indicating that the user equipment retains user equipment side context information to the base station and a receiving unit that receives a connection setup message including a request for a second identifier, wherein the transmitting unit transmits a connection setup complete message including the second identifier to the base station. For example, the first identifier or the second identifier is an identifier used for identifying the context information of the user equipment and the base station that retains the context information. The first identifier or the second identifier may include information for authenticating the user equipment corresponding to the context information.

Further, according to the present embodiment, provided is a base station in a mobile communication system that supports a function for performing connection establishment reusing context information retained in each of user equipment and the base station, including: a receiving unit that receives a connection request message including first context retention information indicating that the user equipment retains user equipment side context information from the user equipment; a transmitting unit that transmits a connection setup message including second context retention information indicating that the base station retains base station side context information associated with the user equipment in accordance with reception of the first message to the user equipment; and a connecting unit that establishes a connection with the user equipment using the base station side context information after the connection setup message is transmitted.

Through the above configuration, in the mobile communication system that supports the function of performing connection establishment reusing context information retained in each of the user equipment and the base station, the base station can determine whether or not the user equipment retains the context information.

For example, the receiving unit acquires an identifier of the user equipment from the connection request message and searches for the base station side context information corresponding to the identifier from a plurality of pieces of retained base station side context information. As described above, it is possible to reliably detect the base station side context information associated with the user equipment using the identifier.

The connection setup message may include a transmission request of authentication information for the user equipment in addition to the second context retention information, and an authenticating unit that authenticates the user equipment using the authentication information transmitted from the user equipment on the basis of the transmission request may be further provided. Through this configuration, the base station can establish the connection after authenticating the user equipment.

The receiving unit may receive the connection request message including the authentication information of the user equipment as the first context retention information from the user equipment. Through this configuration, it is possible to receive the authentication information and authenticate the user equipment before the connection setup is performed (before the RRC connection is performed).

The transmitting unit may transmit the connection setup message including the instruction information for activating the user equipment side context information as the second context retention information to the user equipment. Through this configuration, the user equipment can determine whether or not the base station retains the context information in accordance with whether or not the instruction information for activating the user equipment side context information is received.

The transmitting unit may include information for giving an instruction to retain the user equipment side context information in the connection release message for causing the user equipment to transition from a connected state to an idle state and transmit the connection release message to the user equipment. Through this configuration, when the instruction is not received, the user equipment may not retain the user equipment side context information, and it is possible to prevent the user equipment side context information from being retained in vain.

Further, according to the present embodiment, provided is a base station in a mobile communication system that supports a function for performing connection establishment reusing context information retained in each of user equipment and the base station, including: a receiving unit that receiving a connection request message including a first identifier from the user equipment that retains user equipment side context information; a transmitting unit that transmits a connection setup message including a request for a second identifier to the user equipment; and a context acquiring unit that receives a connection setup complete message including the second identifier from the user equipment, specifies a retention base station that retains base station side context information of the user equipment on the basis of the second identifier, transmits a context request message to the retention base station, and acquires the base station side context information transmitted from the retention base station in accordance with the context request message. Further, according to the present embodiment, provided is user equipment in a mobile communication system that supports a function for performing connection establishment reusing context information retained in each of the user equipment and a base station, including: a receiving unit that receives instruction information indicating whether or not the base station has a context retention function from the base station; a determining unit that determines whether or not the base station has the context retention function on the basis of the instruction information received by the receiving unit; and a transmitting unit that transmits a message including context retention information indicating that the user equipment retains the user equipment side context information to the base station when the determination unit determines that the base station has the context retention function.

Through the above configuration, in the mobile communication system that supports the function of performing the connection establishment reusing context information retained in each of the user equipment and the base station, the user equipment can determine whether or not the base station has the function of reusing the context information.

The receiving unit receives, for example, the instruction information included in the broadcast information or the random access response. Through this configuration, the user equipment can receive the instruction signal without introducing a new signal.

The transmitting unit may transmit the connection request message including the context retention information to the base station. Through this configuration, it is possible to transmit the connection request message to the base station which is confirmed to have the function of reusing the context information, and it is possible to reliably perform the connection establishment reusing the context information.

Further, according to the present embodiment, provided is user equipment in a mobile communication system that supports a function for performing connection establishment reusing context information retained in each of the user equipment and a base station, including: a transmitting unit that transmits a connection request message including first context retention information indicating that the user equipment retains user equipment side context information to the base station; a determination unit that determines whether or not second context retention information indicating that the base station retains base station side context information associated with the user equipment is included in a connection setup message received from the base station; and a connecting unit that establishes a connection with the base station using the user equipment side context information when the determining unit determines that the second context retention information is included in the connection setup message.

Through the above configuration, in the mobile communication system that supports the function of performing the connection establishment reusing context information retained in each of the user equipment and the base station, the user equipment can determine whether or not the base station has the function of reusing the context information.

Further, according to the present embodiment, provided is a base station in a mobile communication system that supports a function for performing connection establishment reusing context information retained in each of user equipment and the base station, including: a transmitting unit that transmits instruction information indicating whether the base station has a context retention function to the user equipment; and a receiving unit that receives a message including context retention information indicating that the user equipment retains user equipment side context information from the user equipment when the user equipment determines that the base station has the context retention function on the basis of the instruction information.

Through the above configuration, in the mobile communication system that supports the function of performing the connection establishment reusing context information retained in each of the user equipment and the base station, the user equipment can determine whether or not the base station has the function of reusing the context information.

For example, the transmitting unit transmits the broadcast information or the random access response including the instruction information to the units of user equipment. Through this configuration, the user equipment can receive the instruction signal without introducing a new signal.

The receiving unit may receive the connection request message including the context retention information from the user equipment. Through this configuration, it is possible to transmit the connection request message to the base station which is confirmed to have the function of reusing the context information, and it is possible to reliably perform the connection establishment reusing the context information.

Further, "means" in the configuration of each of the above devices may be replaced with "unit", "circuit", "device", or the like.

(Additional Notes)

For the above-described embodiments, the following additional notes may be further described.

[Additional Note 1]

User equipment of a mobile communication system that supports a function for performing connection establishment reusing context information retained in each of the user equipment and a base station, including:

a transmitting unit that transmits a connection request message including first context retention information indicating that the user equipment retains user equipment side context information to the base station;

a receiving unit that receives a connection setup message including second context retention information indicating that the base station retains base station side context information associated with the user equipment from the base station; and a connecting unit that establishes a connection with the base station using the user equipment side context information after receiving the connection setup message.

[Additional Note 2]

The user equipment according to additional note 1, wherein The connection setup message includes a transmission request of authentication information for the user equipment in addition to the second context retention information, and the transmitting unit transmits the authentication information to the base station on the basis of the transmission request.

[Additional Note 3]

The user equipment according to additional note 2, wherein the transmitting unit transmits a connection setup complete message including the authentication information to the base station.

[Additional Note 4]

The user equipment according to additional note 1, wherein the transmitting unit transmits a connection request message including authentication information of the user equipment as the first context retention information to the base station.

[Additional Note 5]

The user equipment according to additional note 1, wherein the receiving unit receives the connection setup message including the instruction information for activating the user equipment side context information as the second context retention information from the base station.

[Additional Note 6]

The user equipment according to any one of additional notes 1 to 5, wherein the receiving unit receives a connection release message for causing the user equipment to transition from a connected state to an idle state from the base station and retain the user equipment side context information in a storage unit in the idle state when information for giving an instruction to retain the user equipment side context information is detected from the connection release message.

[Additional Note 7]

The user equipment according to additional note 6, further comprising, a management unit that deactivates the user equipment side context information retained in the storage unit when a predetermined time elapses in the idle state from a point in time at which the user equipment transitions from the connected state to the idle state.

[Additional Note 8]

The user equipment according to additional note 6 or 7, further comprising, a management unit that selects whether or not the user equipment side context information retained in the storage unit is deactivated in accordance with a radio access technology of a cell to be selected for transitioning to the connected state again when the user equipment has transitioned from the connected state to the idle state.

[Additional Note 9]

A base station of a mobile communication system that supports a function for performing connection establishment reusing context information retained in each of user equipment and the base station, including:

a receiving unit that receives a connection request message including first context retention information indicating that the user equipment retains user equipment side context information from the user equipment;

a transmitting unit that transmits a connection setup message including second context retention information indicating that the base station retains base station side context information associated with the user equipment in accordance with reception of the first message to the user equipment; and a connecting unit that establishes a connection with the user equipment using the base station side context information after the connection setup message is transmitted.

[Additional Note 10]

The base station according to additional note 9, wherein the receiving unit acquires an identifier of the user equipment from the connection request message and searches for the base station side context information corresponding to the identifier from a plurality of pieces of retained base station side context information.

[Additional Note 11]

The base station according to additional note 9 or 10, wherein the connection setup message may include a transmission request of authentication information for the user equipment in addition to the second context retention information, and the base station further includes an authenticating unit that authenticates the user equipment using the authentication information transmitted from the user equipment on the basis of the transmission request may be further provided.

[Additional Note 12]

The base station according to additional note 9, wherein the receiving unit receives the connection request message including the authentication information of the user equipment as the first context retention information from the user equipment.

[Additional Note 13]

The base station according to additional note 9, wherein the transmitting unit transmits the connection setup message including the instruction information for activating the user equipment side context information as the second context retention information to the user equipment.

[Additional Note 14]

The base station according to any one of additional notes 9 to 13, wherein the transmitting unit includes information for giving an instruction to retain the user equipment side context information in the connection release message for causing the user equipment to transition from a connected state to an idle state and transmits the connection release message to the user equipment.

[Additional Note 15]

A connection establishment method to be performed by user equipment of a mobile communication system that supports a function for performing connection establishment reusing context information retained in each of the user equipment and a base station, the connection establishment method including:

a transmission step of transmitting a connection request message including first context retention information indicating that the user equipment retains user equipment side context information to the base station;

a reception step of receiving a connection setup message including second context retention information indicating that the base station retains base station side context information associated with the user equipment from the base station; and a connection step of establishing a connection with the base station using the user equipment side context information after receiving the connection setup message.

[Additional Note 16]

A connection establishment method to be performed by a base station of a mobile communication system that supports a function for performing connection establishment reusing context information retained in each of user equipment and the base station, the connection establishment method including:

a reception step of receiving a connection request message including first context retention information indicating that the user equipment retains user equipment side context information from the user equipment;

a transmission step of transmitting a connection setup message including second context retention information indicating that the base station retains base station side context information associated with the user equipment in accordance with reception of the first message to the user equipment; and a connection step of establishing a connection with the user equipment using the base station side context information after the connection setup message is transmitted.

The exemplary embodiment of the present invention is described above, but the disclosed invention is not limited to the above embodiment, and those skilled in the art would understand that various modified examples, revised examples, alternative examples, substitution examples, and the like can be made. In order to facilitate understanding of the invention, specific numerical value examples are used for description, but the numerical values are merely examples, and certain suitable values may be used unless as otherwise indicated. A classification of items in the above description is not essential to the present invention, matters described in two or more items may be combined and used as necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be performed physically by a plurality of parts. For the sake of convenience of description, each device has been described using the functional block diagrams, but each device may be implemented by hardware, software, or a combination thereof. Software executed by the processor included in the user equipment UE according to the embodiment of the present invention and software executed by the processor included in the base station eNB according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

The present invention is not limited to the above embodiments, and various modified examples, revised examples, alternative examples, substitution examples, and the like are included in the present invention without departing from the spirit of the present invention.

This application is based upon and claims the benefit of Japanese Patent Application JP 2015-218014 filed on Nov. 5, 2015; Japanese Patent Application JP 2016-002129 filed on Jan. 7, 2016; Japanese Patent Application JP 2016-020321 filed on Feb. 4, 2016; Japanese Patent Application JP 2016-046348 filed on Mar. 9, 2016; Japanese Patent Application JP 2016-153979 filed on Aug. 4, 2016; and Japanese Patent Application JP 2016-165170 filed on Aug. 25, 2016, the entire contents of each of which are incorporated herein by reference.

LIST OF REFERENCE SYMBOLS 10, 20 eNB
11 DL signal transmitting unit
12 UL signal receiving unit
13 RRC processing unit
14 UE context management unit
15 authenticating unit
16 NW communication unit
17 UE context acquiring unit
30 MME
31 eNB communication unit
32 SGW communication unit
33 communication control unit
40 S-GW
41 eNB communication unit
42 MME communication unit
43 NW communication unit
44 communication control unit
50 UE
51 DL signal receiving unit
52 UL signal transmitting unit
53 RRC processing unit
54 UE context management unit
151 RE module
152 BB processing module
153 device control module
154 USIM Slot
251 RE module
252 BB processing module
253 device control module
254 communication IF

The invention claimed is:

1. A user equipment of a mobile communication system that supports a function for establishing a connection by reusing a user equipment side context information and a base station side context information retained in the user equipment and in a base station, respectively, the user equipment comprising:

a transmitter that transmits, to the base station, a first message indicating that the user equipment retains the user equipment side context information;

a receiver that receives, from the base station, a second message indicating that the base station retains the base station side context information associated with the user equipment;

a processor that establishes, by using the user equipment side context information, a connection with the base station after receiving the second messages; and a memory, wherein the first message includes authentication information of the user equipment, wherein the receiver receives, from the base station, a connection release message for causing the user equipment to transition from a connected state to an idle state, and, wherein upon detecting information in the connection release message indicating that the user equipment side context information is to be retained, the receiver retains the user equipment side context information in the memory during the idle state, and wherein the processor, upon detecting that a cell reselected by the user equipment is another RAT, releases the user equipment side context information retained in the memory.

2. The user equipment according to claim 1, wherein the processor, upon detecting that a predetermined time has elapsed in the idle state from a time point at which the user equipment transitions from the connected state to the idle state, invalidates the user equipment side context information retained in the memory.

3. A base station of a mobile communication system that supports a function for establishing a connection by reusing a user equipment side context information and a base station side context information retained in a user equipment and in the base station, respectively, the base station comprising:

a receiver that receives, from the user equipment, a first message indicating that the user equipment retains the user equipment side context information;

a transmitter that transmits, to the user equipment, a second message indicating that the base station retains the base station side context information associated with the user equipment, in response to receiving the first message; and a processor that establishes, after transmitting the second message, a connection with the user equipment using the base station side context information, wherein:
the first message includes authentication information of the user equipment, the processor obtains an identifier of the user equipment from the first message, the processor retrieves the base station side context information corresponding to the identifier from a plurality of retained base station side context information, the transmitter transmits a connection release message to the user equipment, the connection release message comprises information indicating that the user equipment side context information is to be retained and the connection release message causes the user equipment to transition from a connected state to an idle state.

4. A connection establishment method executed by user equipment in a mobile communication system that supports a function for establishing a connection by reusing a user equipment side context information and a base station side context information retained in the user equipment and in a base station, respectively, the connection establishment method comprising:

transmitting, to the base station, a first message indicating that the user equipment retains the user equipment side context information;

receiving, from the base station, a second message indicating that the base station retains the base station side context information associated with the user equipment; and establishing, after receiving the second message, a connection with the base station using the user equipment side context information, wherein the first message includes authentication information of the user equipment, receiving, from the base station, a connection release message for causing the user equipment to transition from a connected state to an idle state, and, upon detecting information in the connection release message indicating that the user equipment side context information is to be retained, retaining the user equipment side context information in memory during the idle state, and releasing the user equipment side context information upon detecting that a cell reselected by the user equipment is another RAT.

5. A connection establishment method executed by a base station of a mobile communication system that supports a function for establishing a connection by reusing a user equipment side context information and a base station side context information retained in a user equipment and in the base station, respectively, the connection establishment method comprising:

receiving, from the user equipment, a first message indicating that the user equipment retains the user equipment side context information;

transmitting, to the user equipment, a second message indicating that the base station retains the base station side context information associated with the user equipment, in response to receiving the first message; and establishing, after transmitting the second message, a connection with the user equipment using the base station side context information, wherein the first message includes authentication information of the user equipment, the method further comprising:
obtaining an identifier of the user equipment from the first message, retrieving the base station side context information corresponding to the identifier from a plurality of retained base station side context information, and transmitting a connection release message to the user equipment, the connection release message comprising information for indicating that the user equipment side context information is to be retained and the connection release message causing the user equipment to transition from a connected state to an idle state.

* * * * *